United States Patent [19]
Heredia et al.

[11] Patent Number: 5,443,339
[45] Date of Patent: *Aug. 22, 1995

[54] METHOD AND APPARATUS FOR ALIGNING AND CUTTING SINGLE-SIDED AND DOUBLE SIDED KEYS

[75] Inventors: George L. Heredia, Paradise Valley, Ariz.; Robert E. Almblad, Mundelein; Mike A. Mueller, Lindenhurst, both of Ill.

[73] Assignee: Axxess Entry Technologies, Tempe, Ariz.

[ * ] Notice: The portion of the term of this patent subsequent to May 24, 2011 has been disclaimed.

[21] Appl. No.: 207,837

[22] Filed: Mar. 8, 1994

Related U.S. Application Data

[63] Continuation of Ser. No. 769,921, Sep. 30, 1991, Pat. No. 5,314,274, which is a continuation-in-part of Ser. No. 425,731, Oct. 19, 1989, abandoned, which is a continuation-in-part of Ser. No. 260,815, Oct. 21, 1988, abandoned.

[51] Int. Cl.6 .................................................. B23C 3/35
[52] U.S. Cl. ........................................ 409/81; 76/110; 269/153; 269/234; 409/84
[58] Field of Search ...................... 409/81, 82, 83, 84, 409/903; 76/110; 269/34, 153, 217, 224, 234

[56] References Cited

U.S. PATENT DOCUMENTS

| | | |
|---|---|---|
| 2,582,012 | 1/1952 | Currier . |
| 3,430,535 | 3/1969 | Haggstrom . |
| 4,821,393 | 4/1989 | Spigarelli ........................ 29/238 |
| 5,314,274 | 5/1994 | Heredia et al. ........................ 409/81 |

FOREIGN PATENT DOCUMENTS

| | | |
|---|---|---|
| 1414033 | 9/1964 | France . |
| 2448404 | 9/1979 | France . |
| 2951065 | 12/1979 | Germany ............................ 409/81 |

OTHER PUBLICATIONS

Instruction sheet by the Sagar Corporation, 43 Chandler Street, Worcester 9, Mass., Phone PL 3-4751 re the Model 500 Machine.

Multi-part parts list and instruction manual for the Sagar Model 500 key machine by the Sagar Corporation, 43 Chandler Street, Worcester 9, Mass., Phone PL 3-4751 re the Model 500 Machine.

Serial of photographs illustrating various angles of a modified embodiment of the Sagar key cutting machine.

*Primary Examiner*—Z. R. Bilinsky
*Attorney, Agent, or Firm*—Cahill, Sutton & Thomas

[57] ABSTRACT

The present invention relates to the simultaneous duplication of both the bit notch pattern and shoulder position of a master key onto a key blank. The key blank is longitudinally and laterally aligned relative to a key cutter. A master key is longitudinally and laterally aligned relative to a key follower. The key follower is then longitudinally and laterally displaced relative to the master key to trace the contour of the key master. The key cutter is simultaneously displaced relative to the key blank in an identical manner to reproduce the traced contour of the master key on the key blank and to longitudinally reposition the key blank shoulder to coincide with the relative longitudinal location of the master key shoulder by cutting away a portion of the shank to reduce the length of the shank.

70 Claims, 29 Drawing Sheets

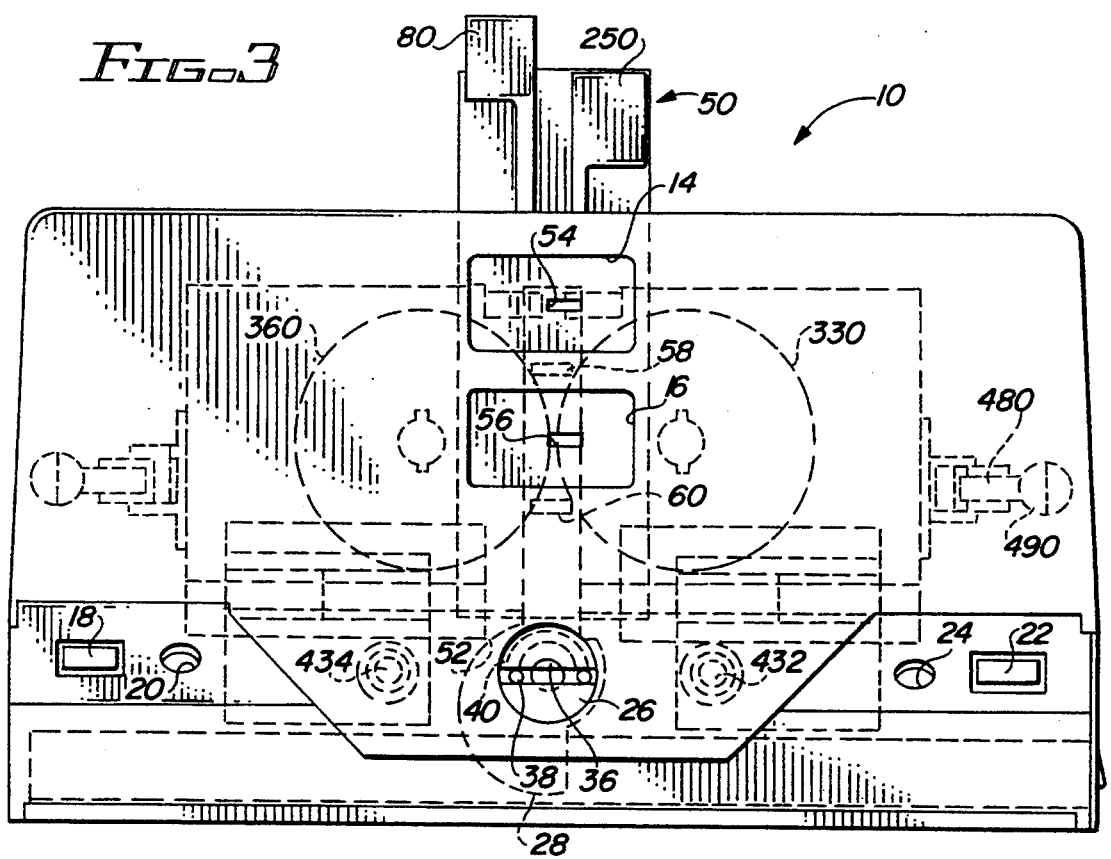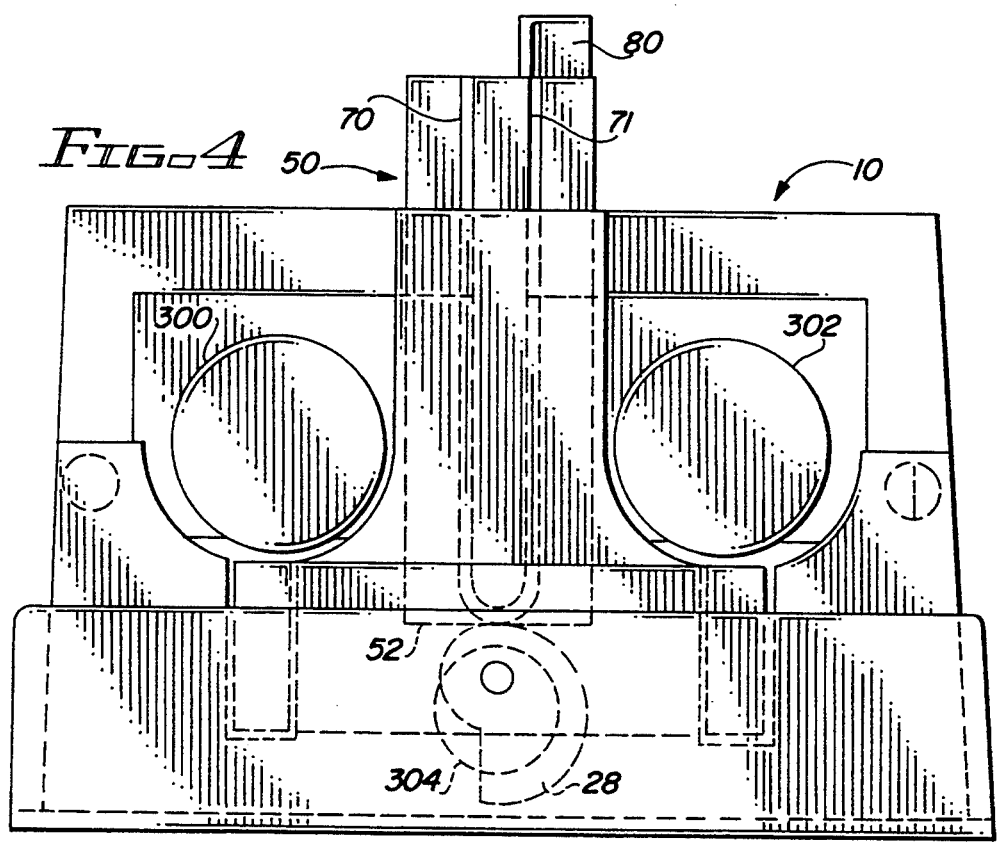

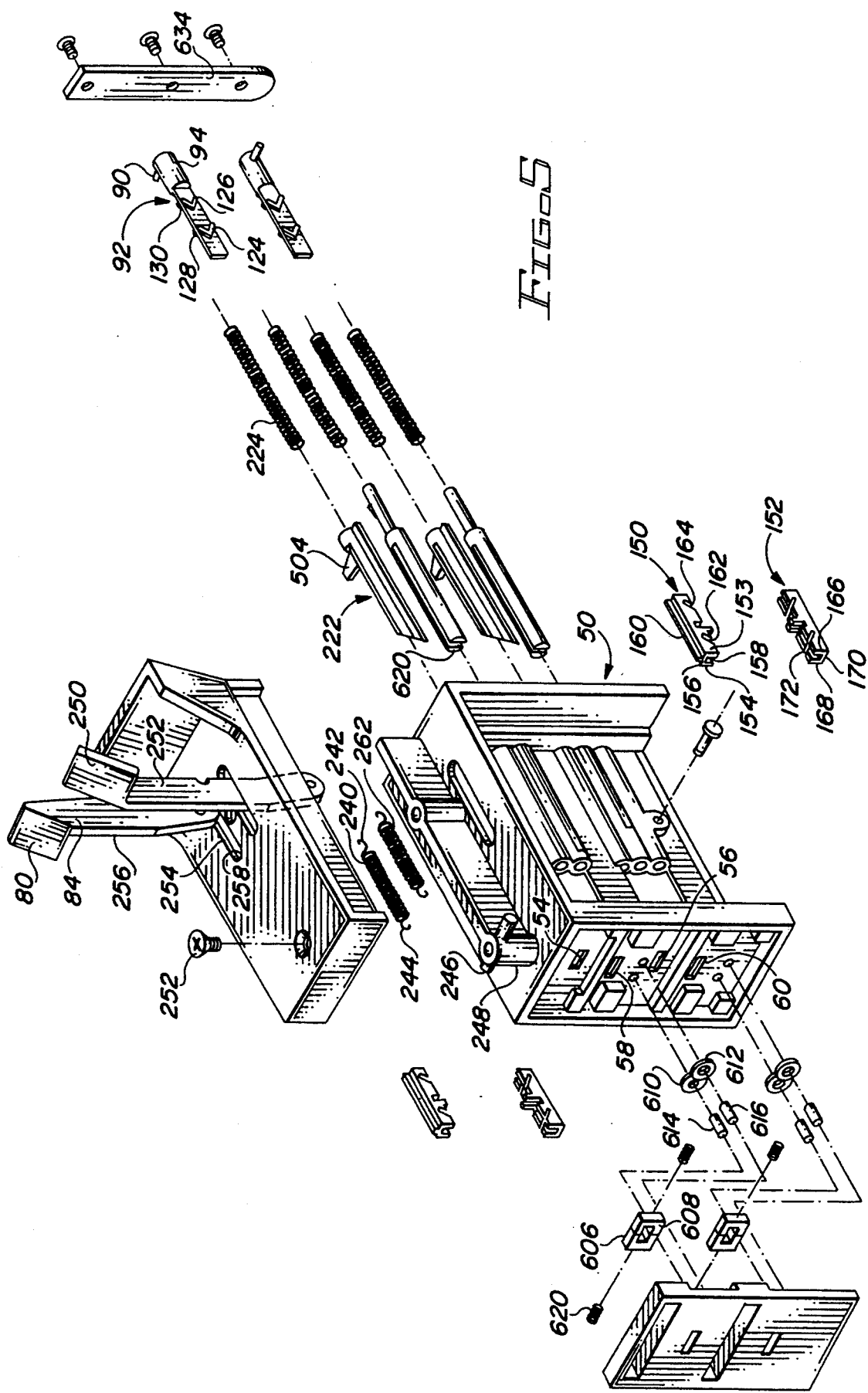

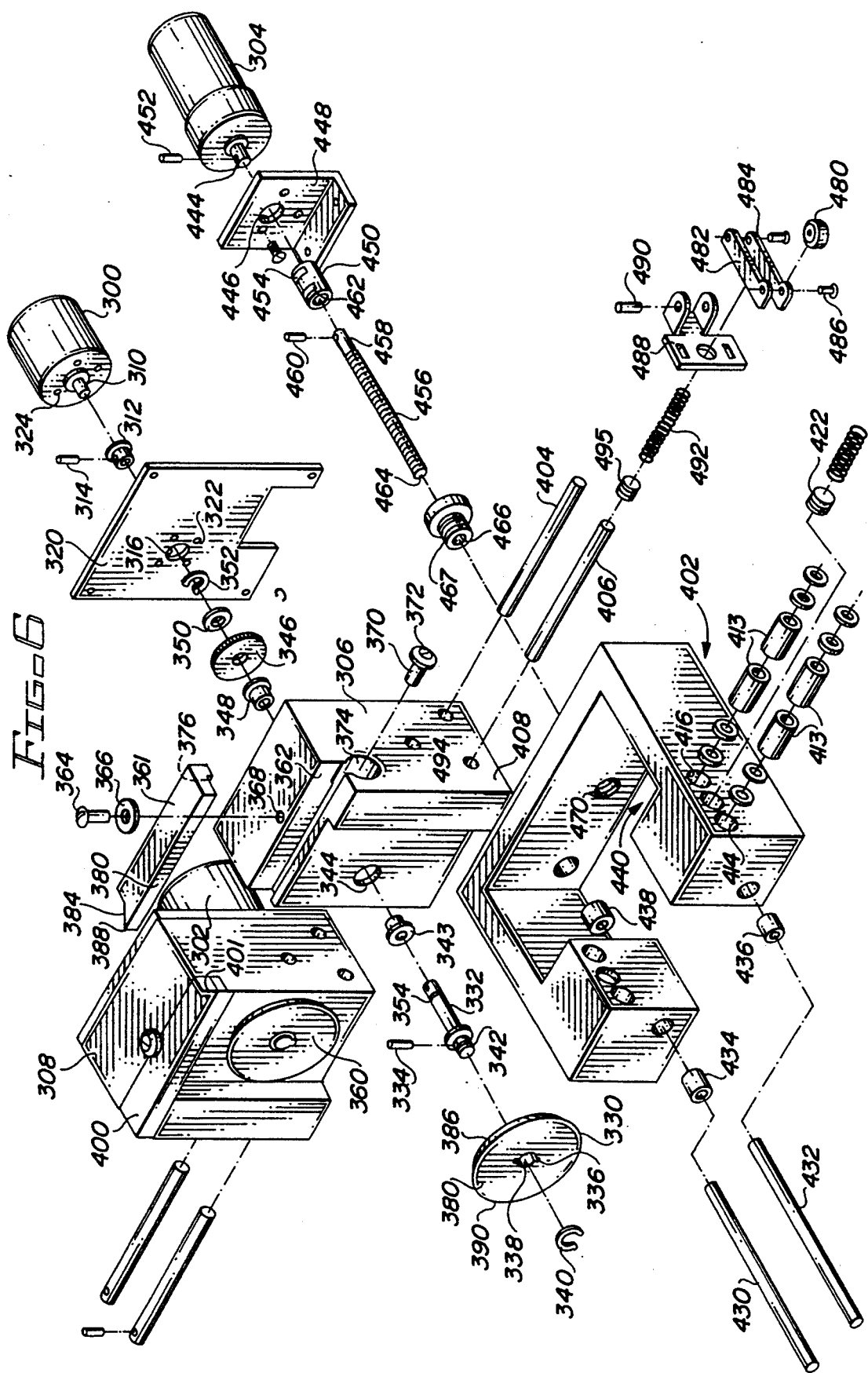

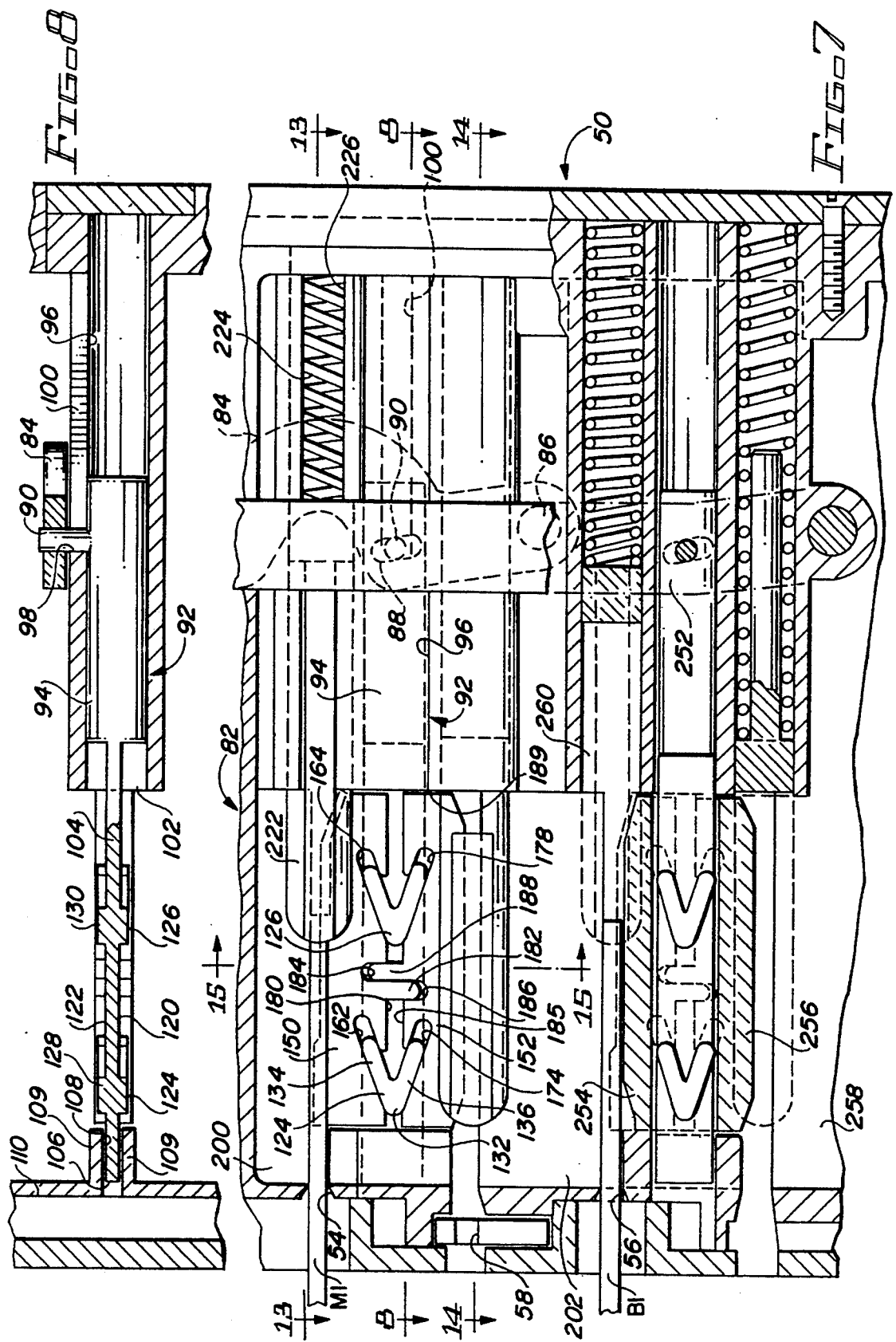

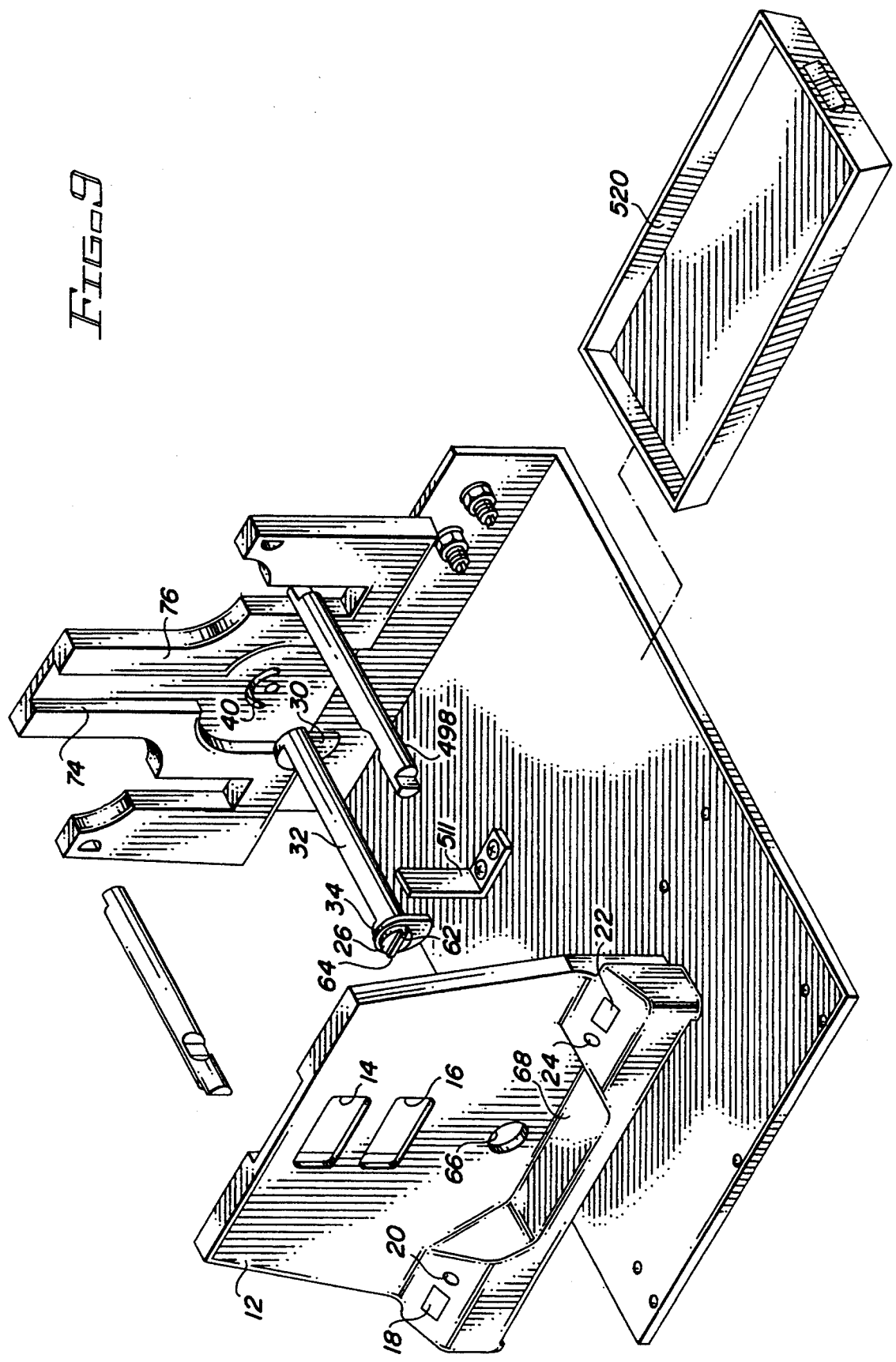

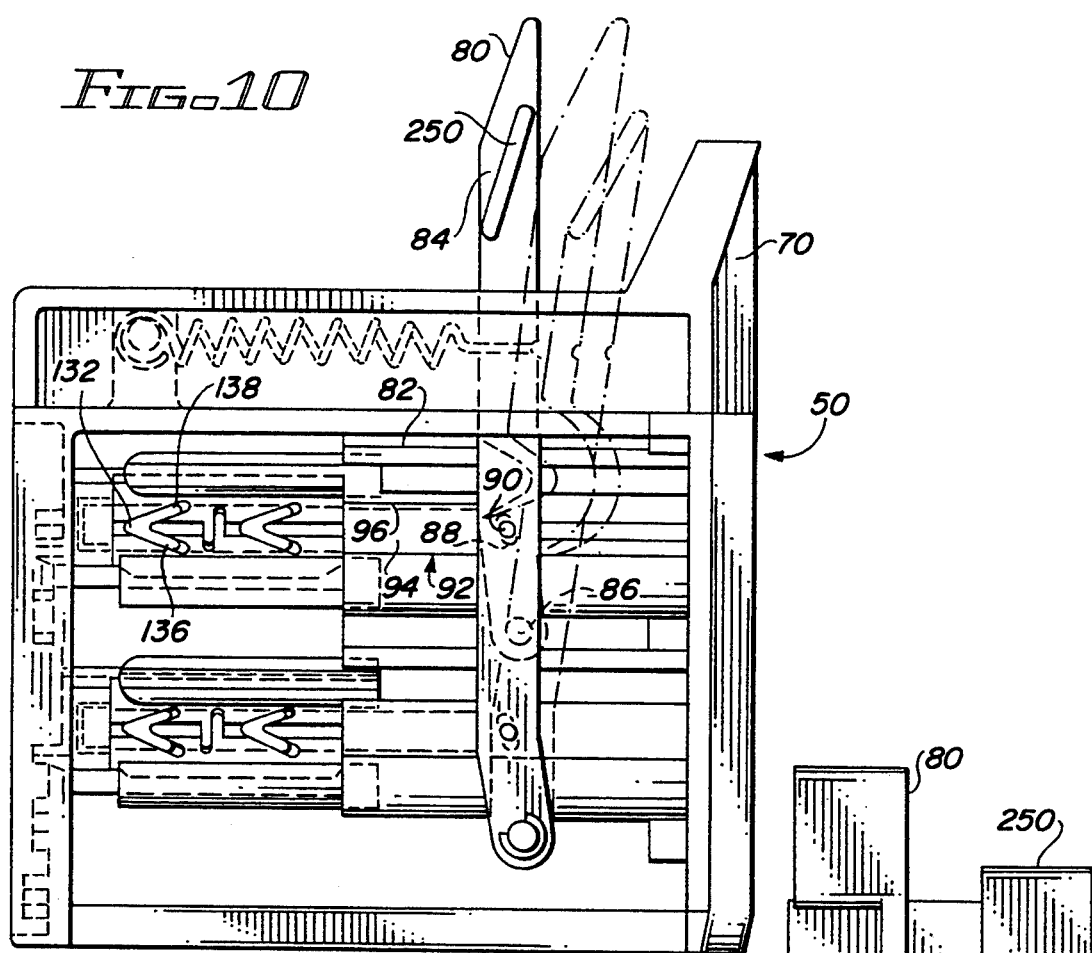
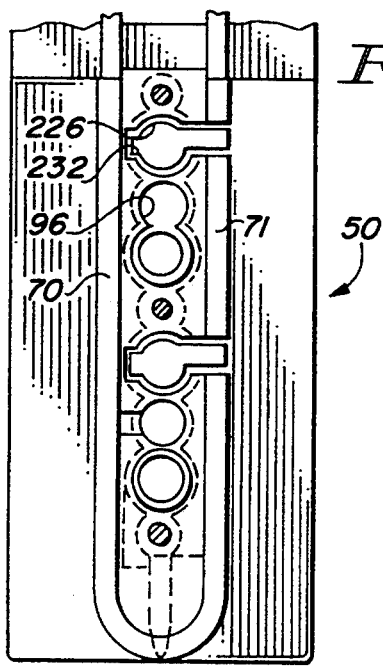
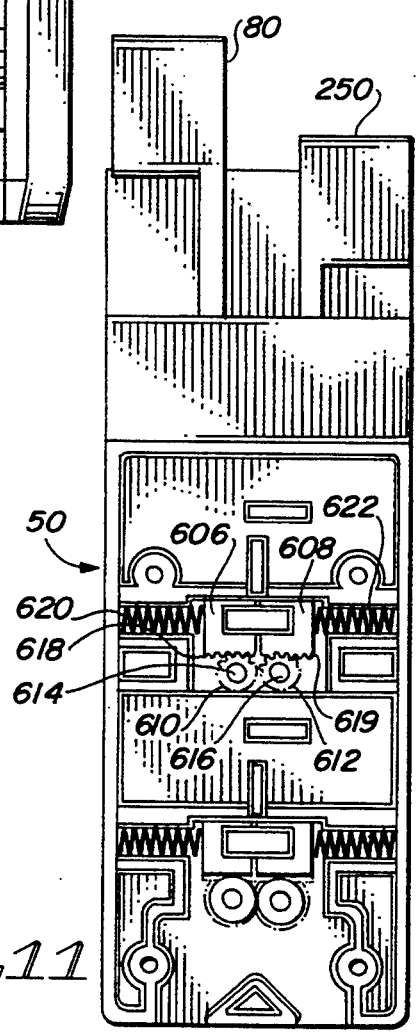

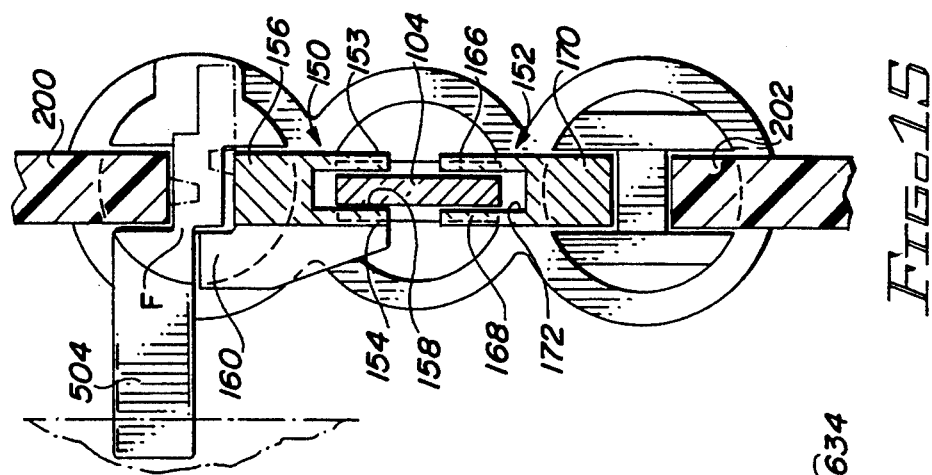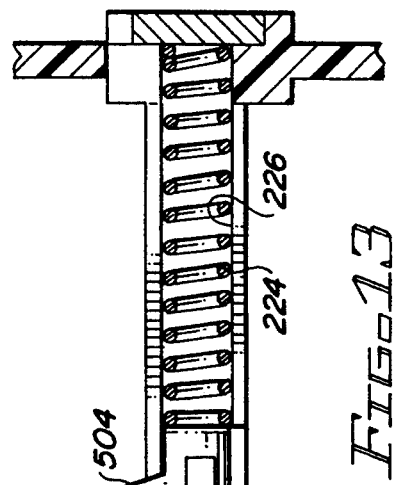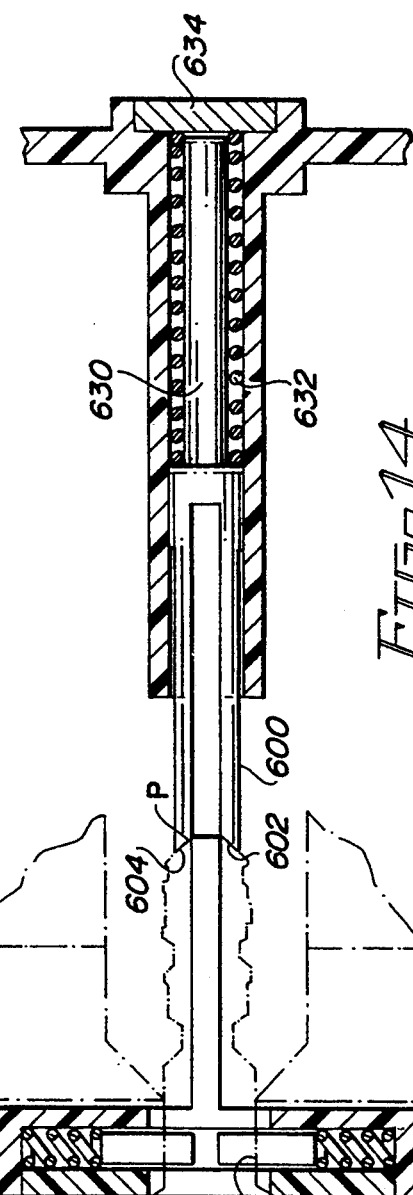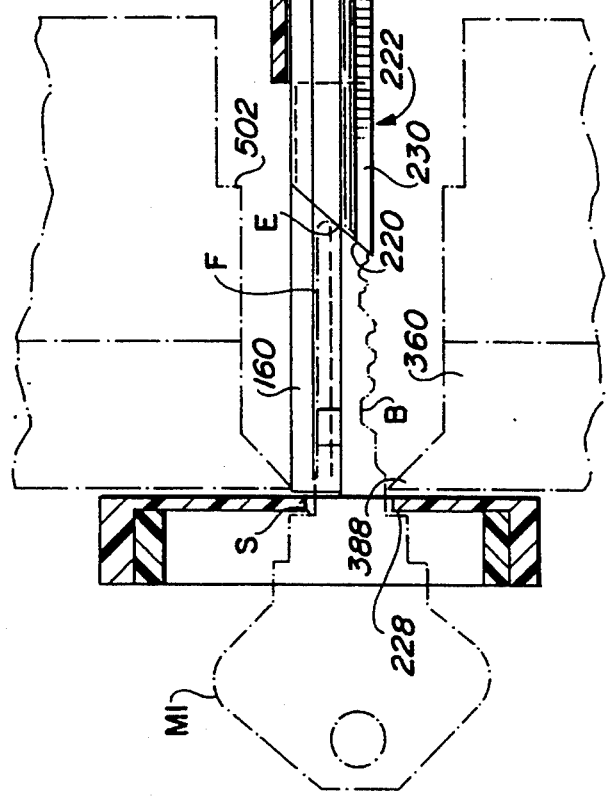

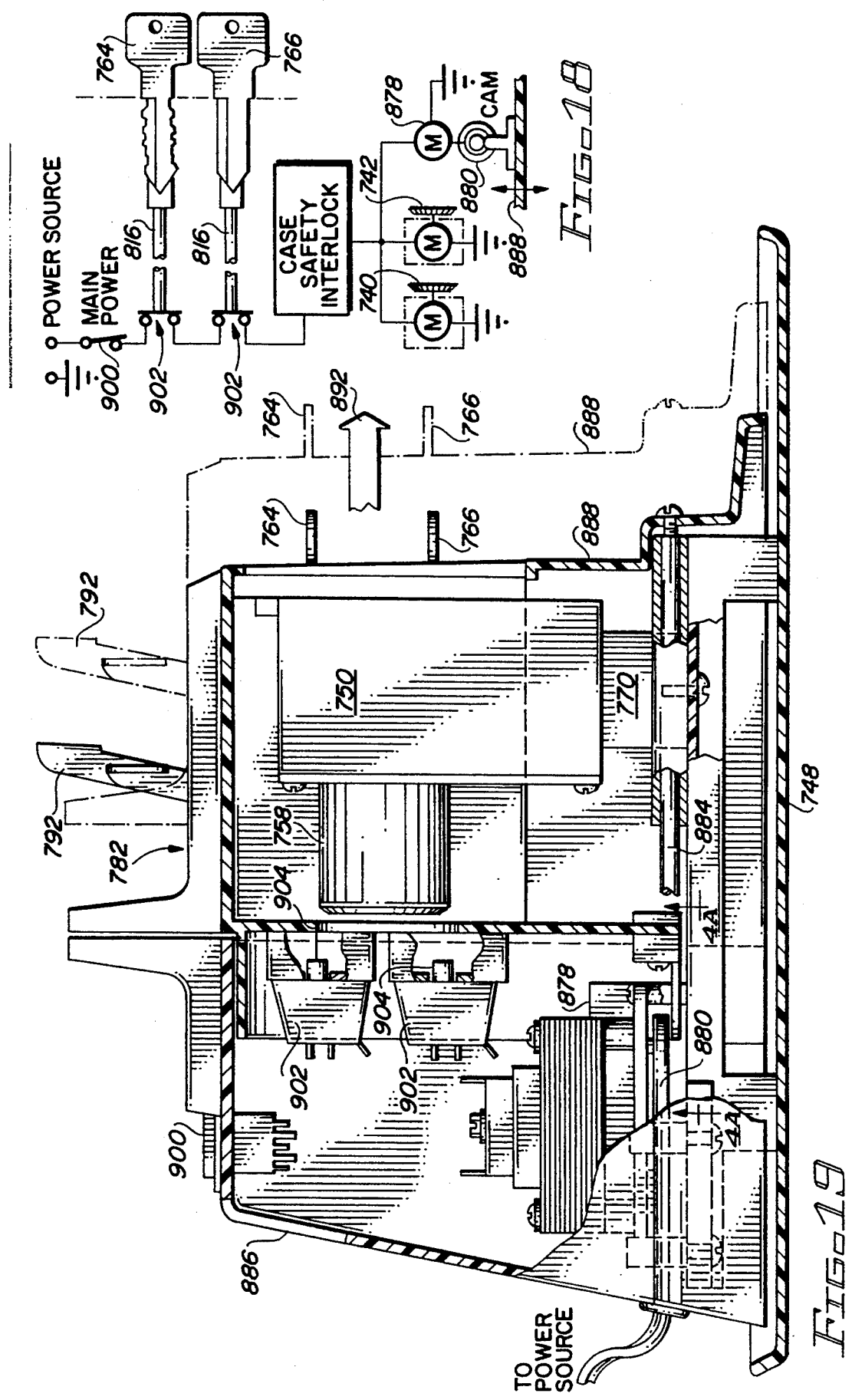

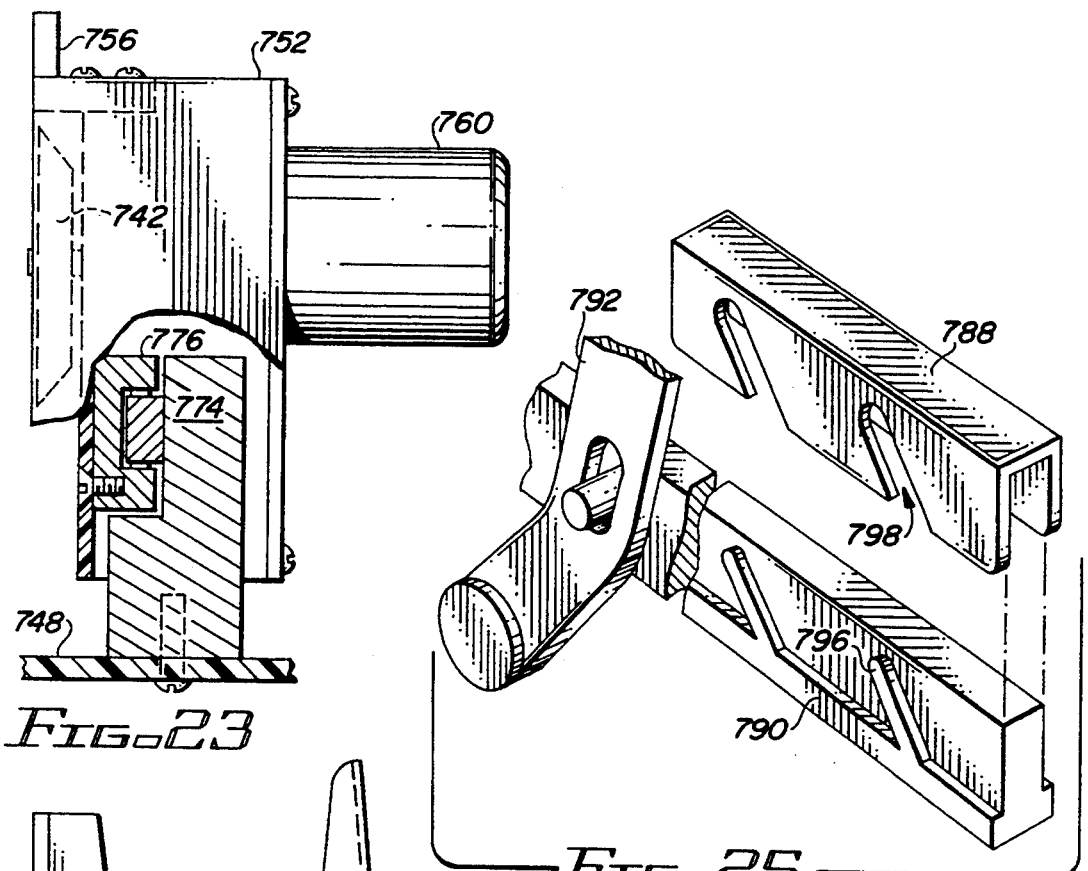
FIG.23
FIG.25
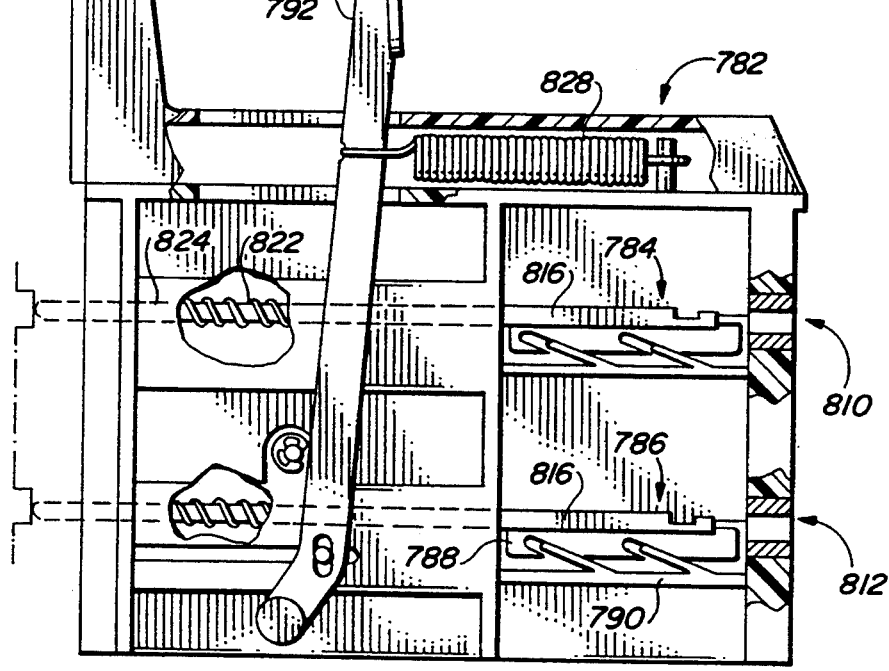
FIG.24

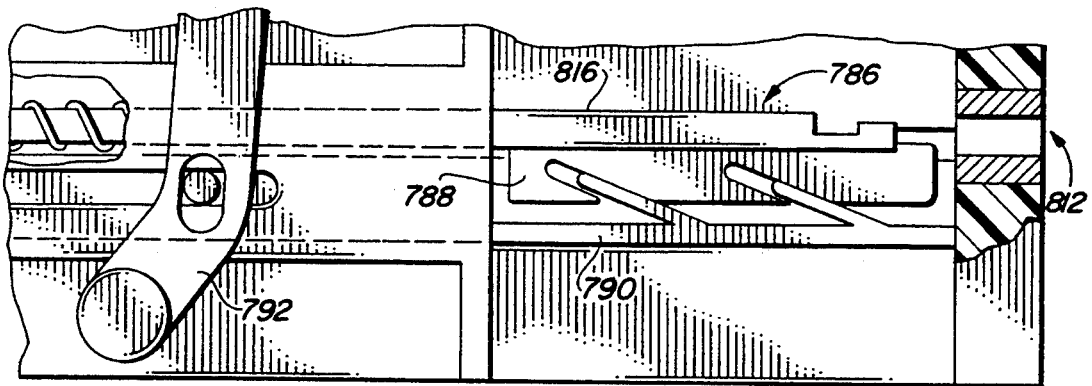
FIG.-26A
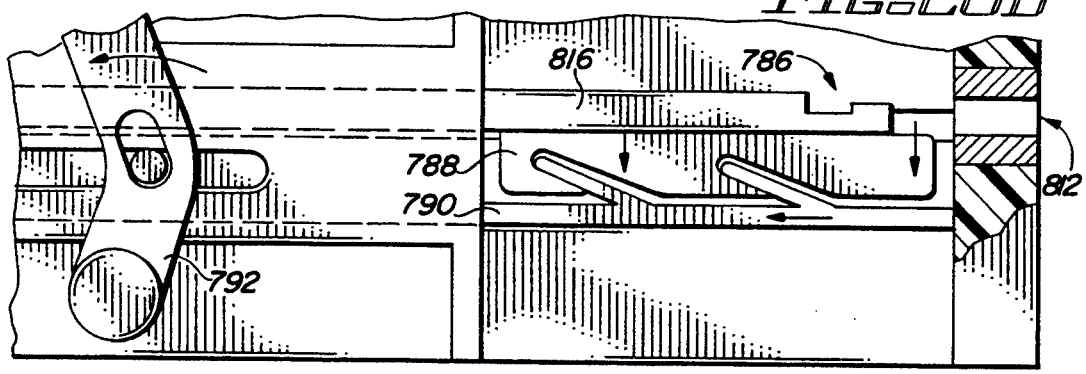
FIG.-26B
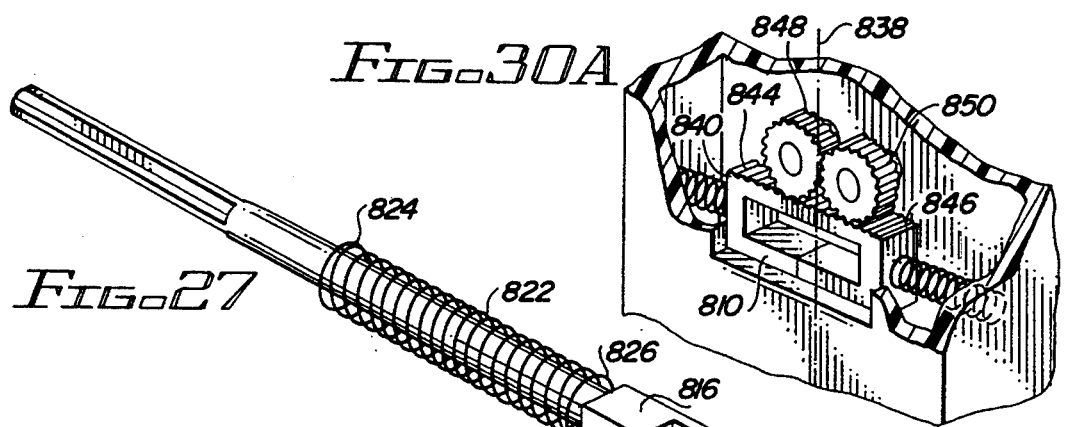
FIG.-30A
FIG.-27
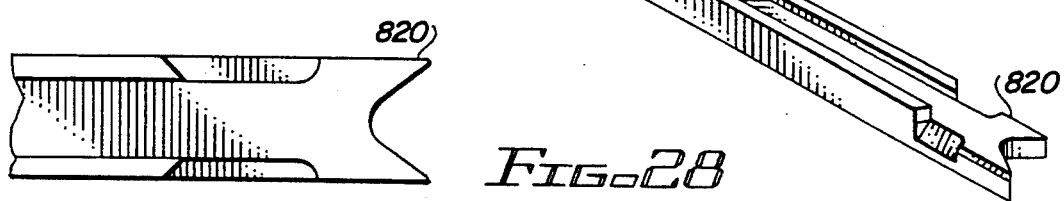
FIG.-28
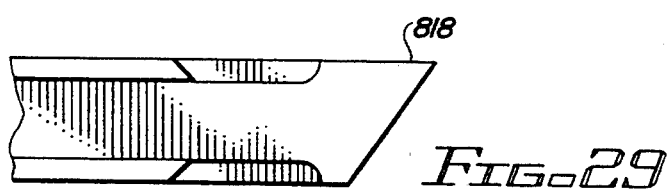
FIG.-29

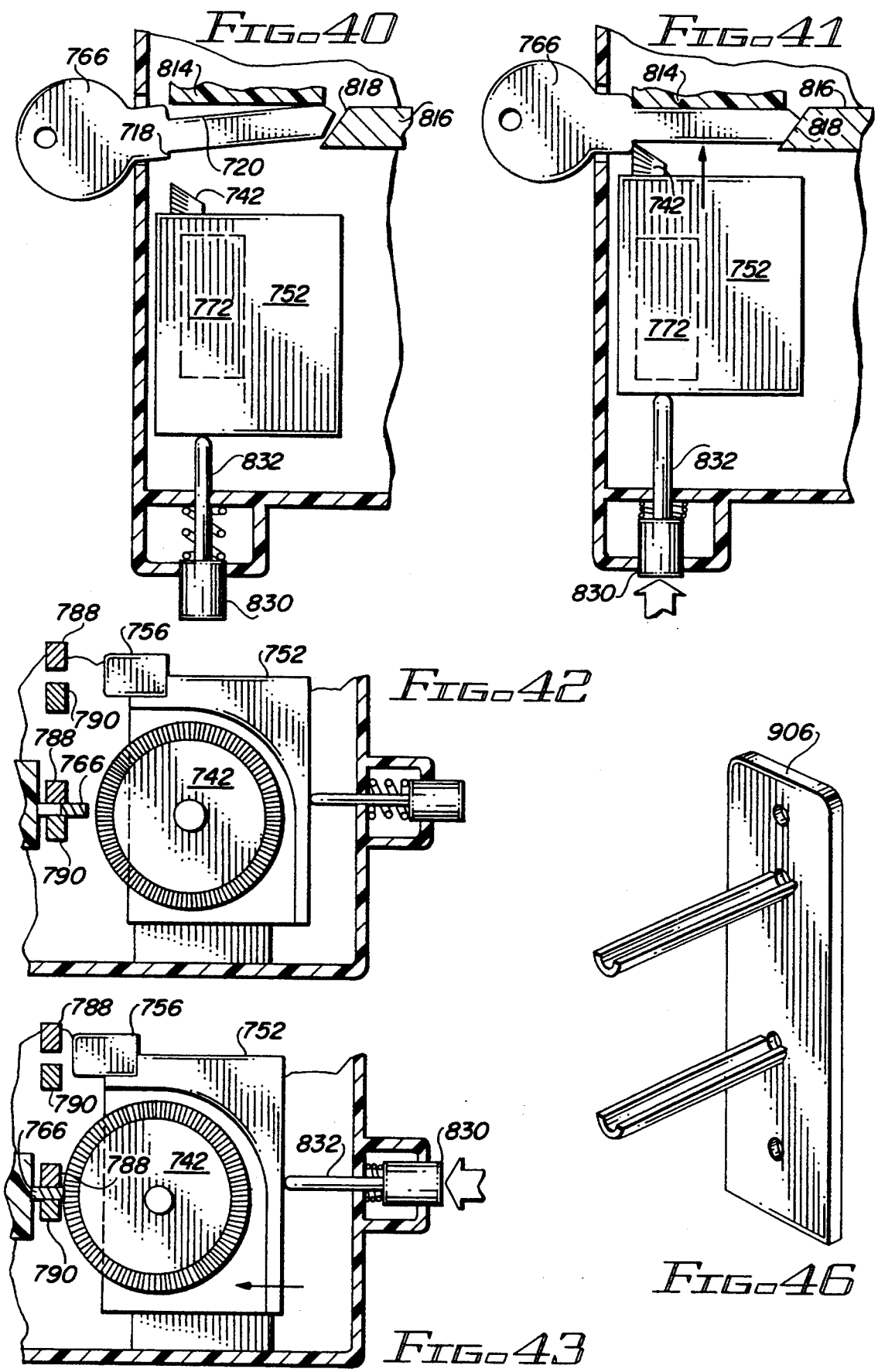

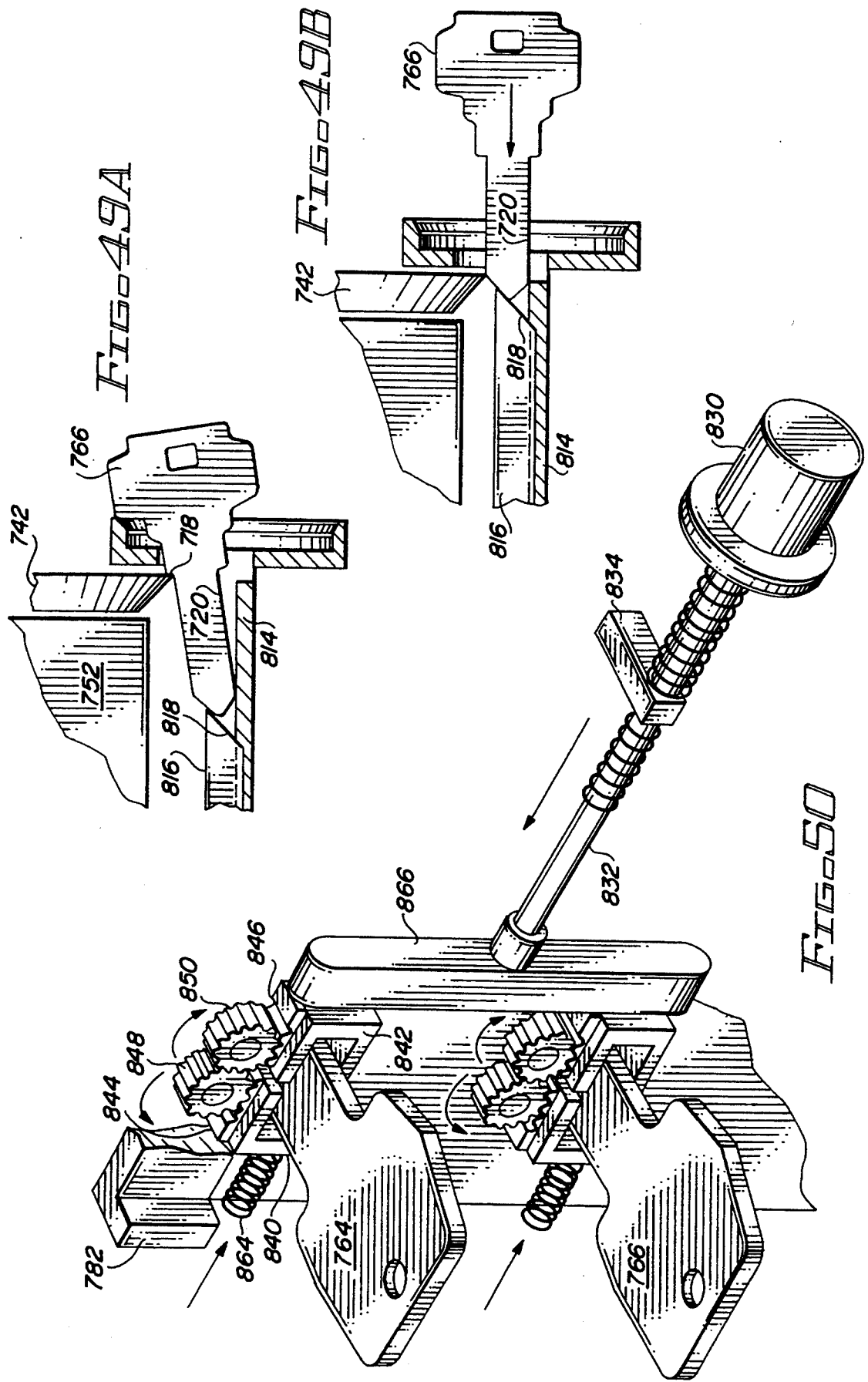

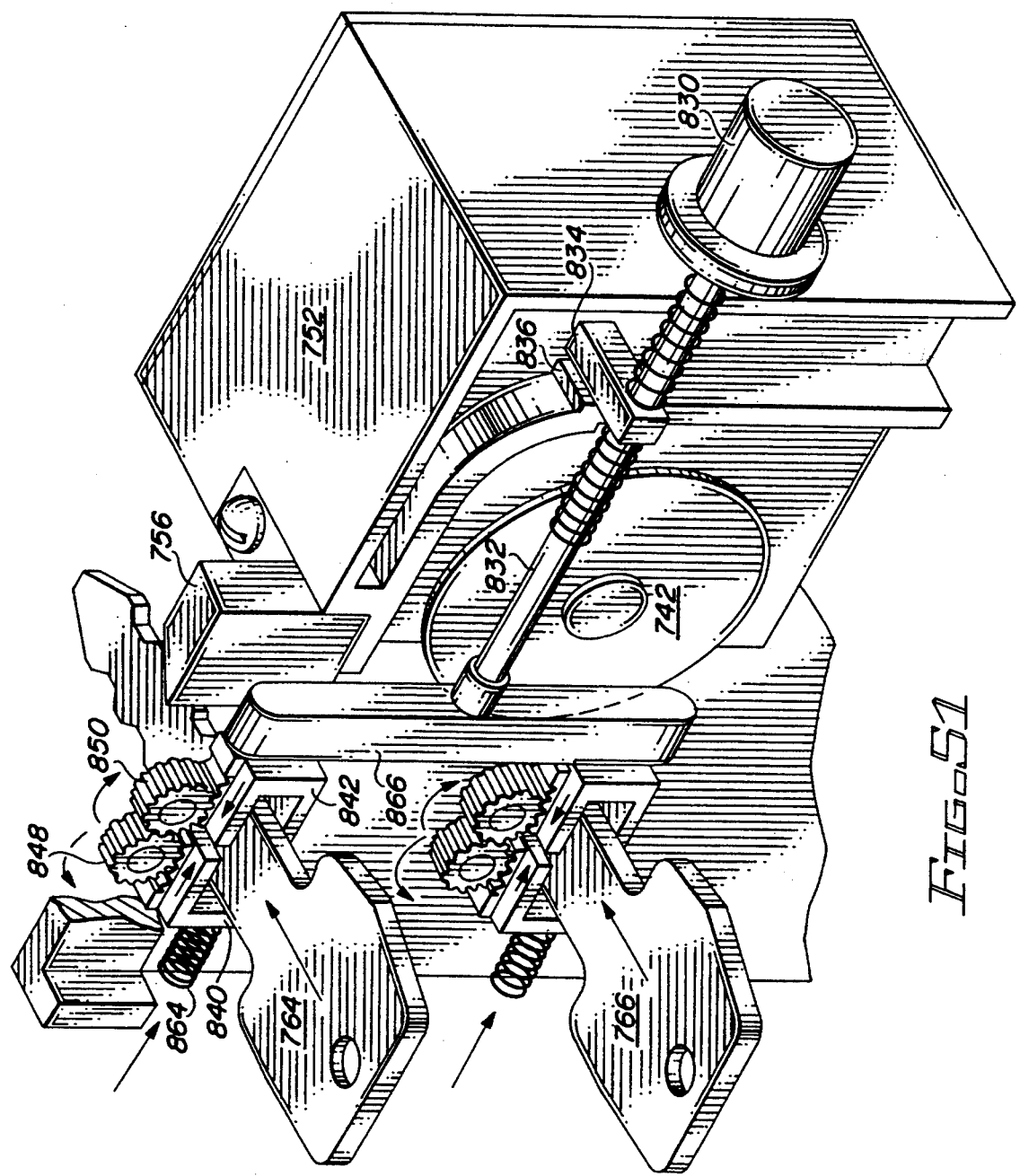

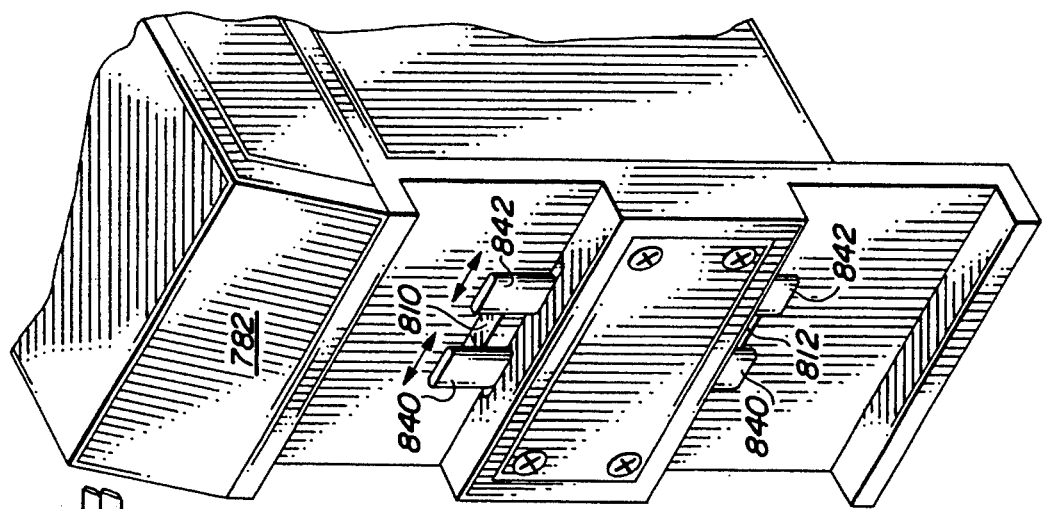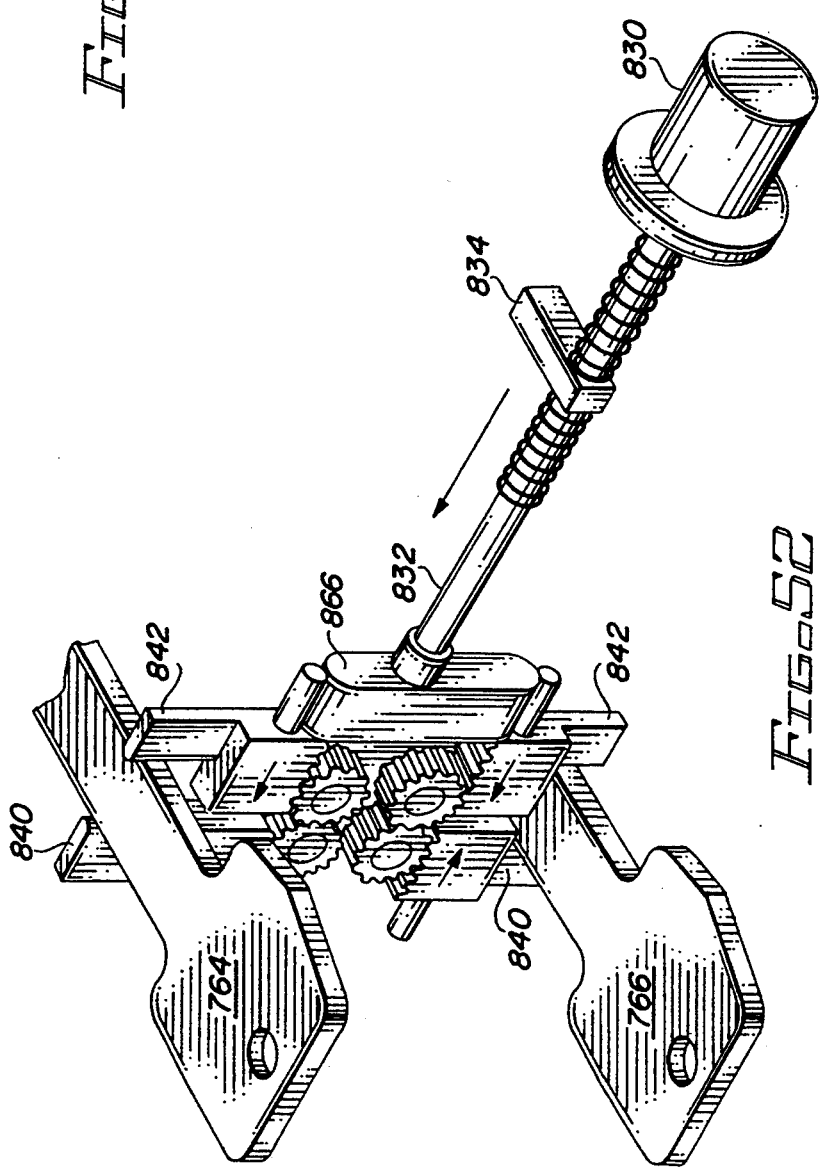

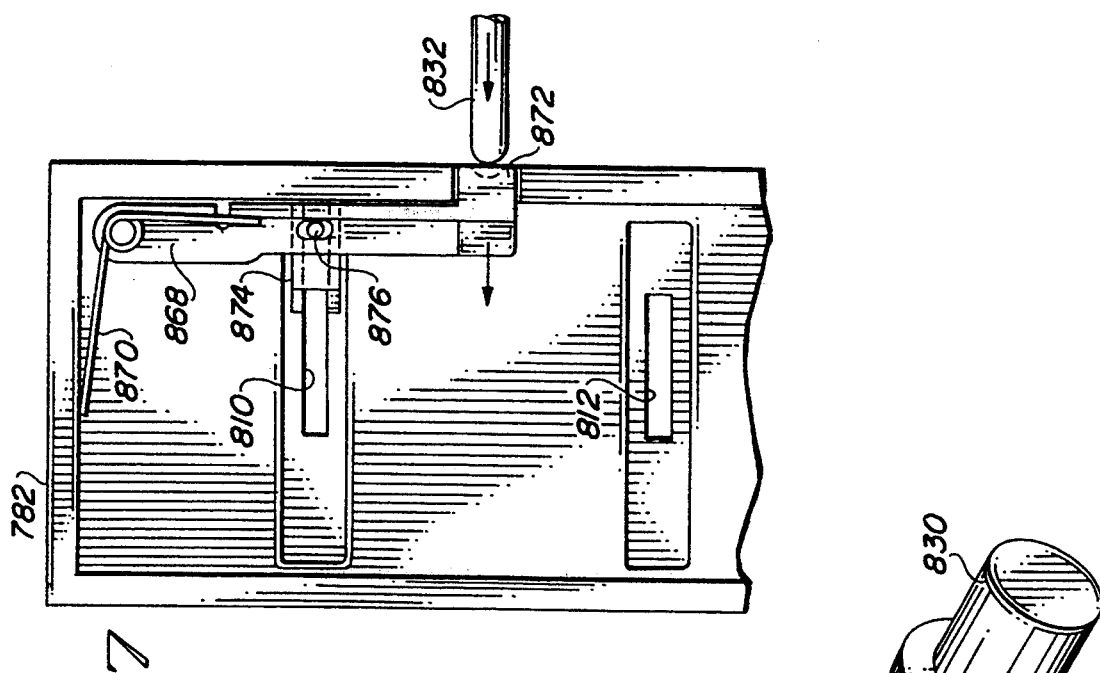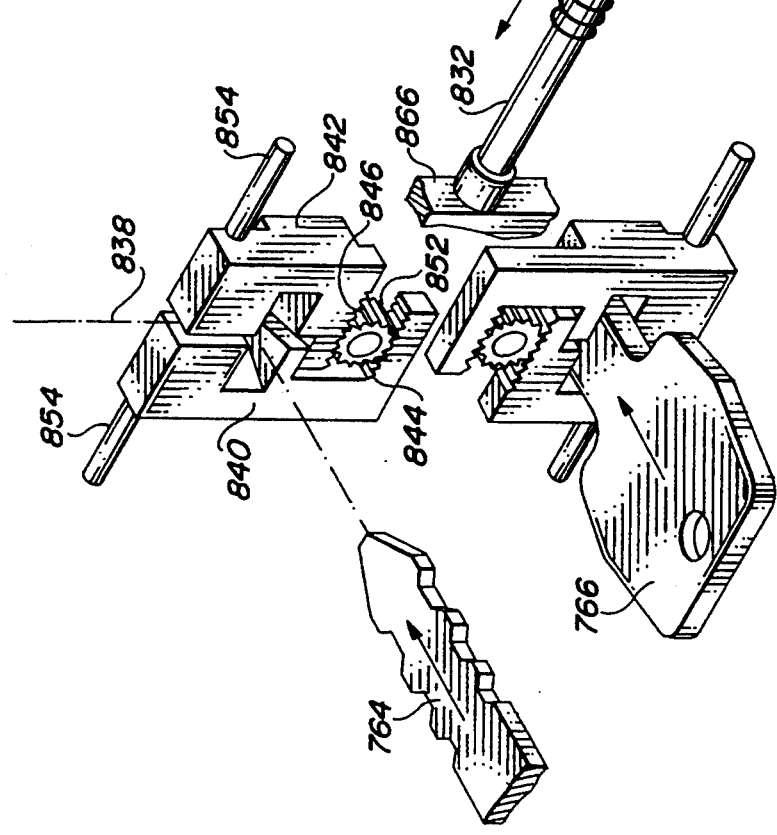

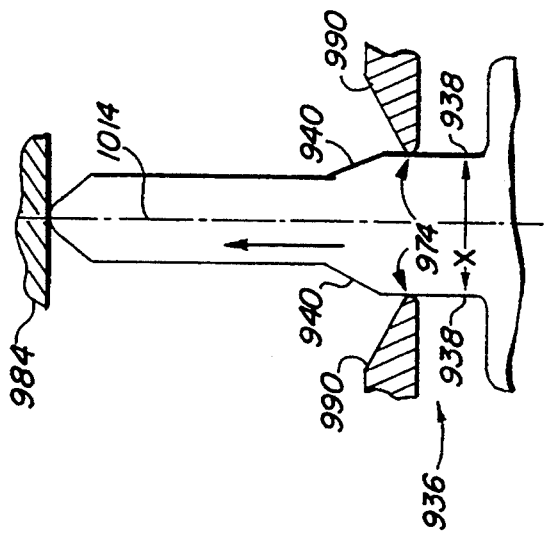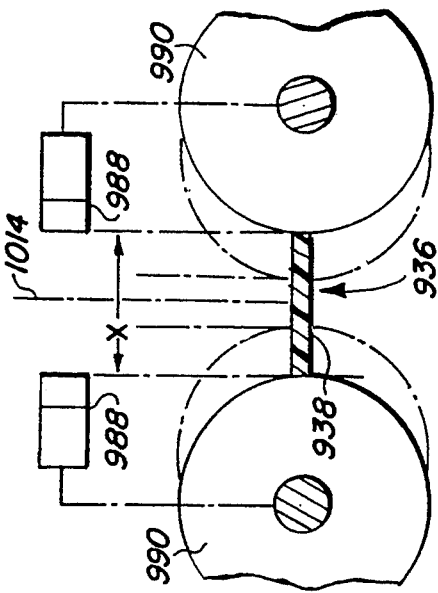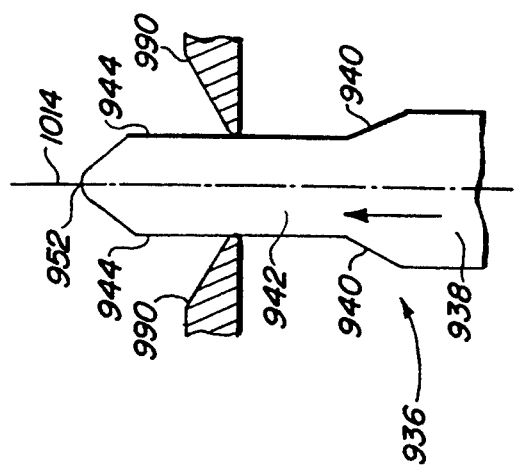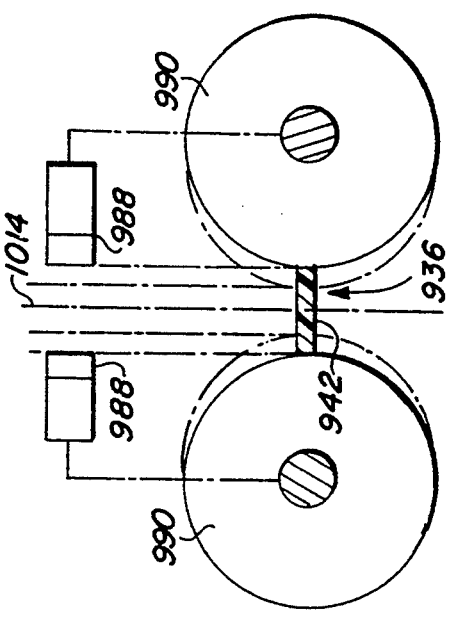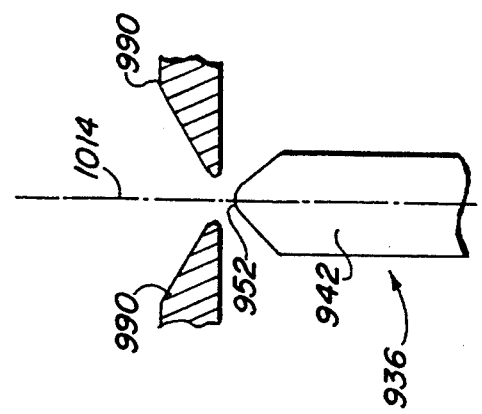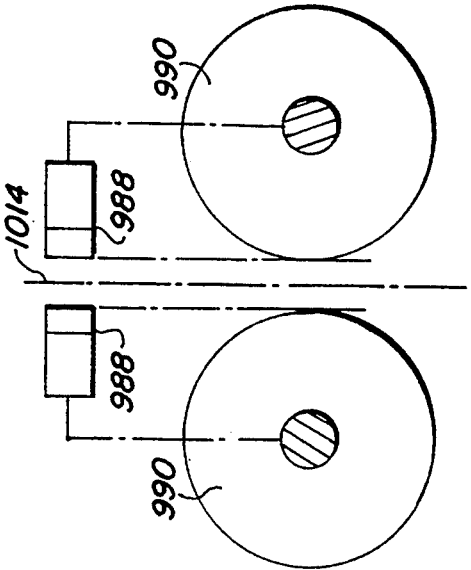

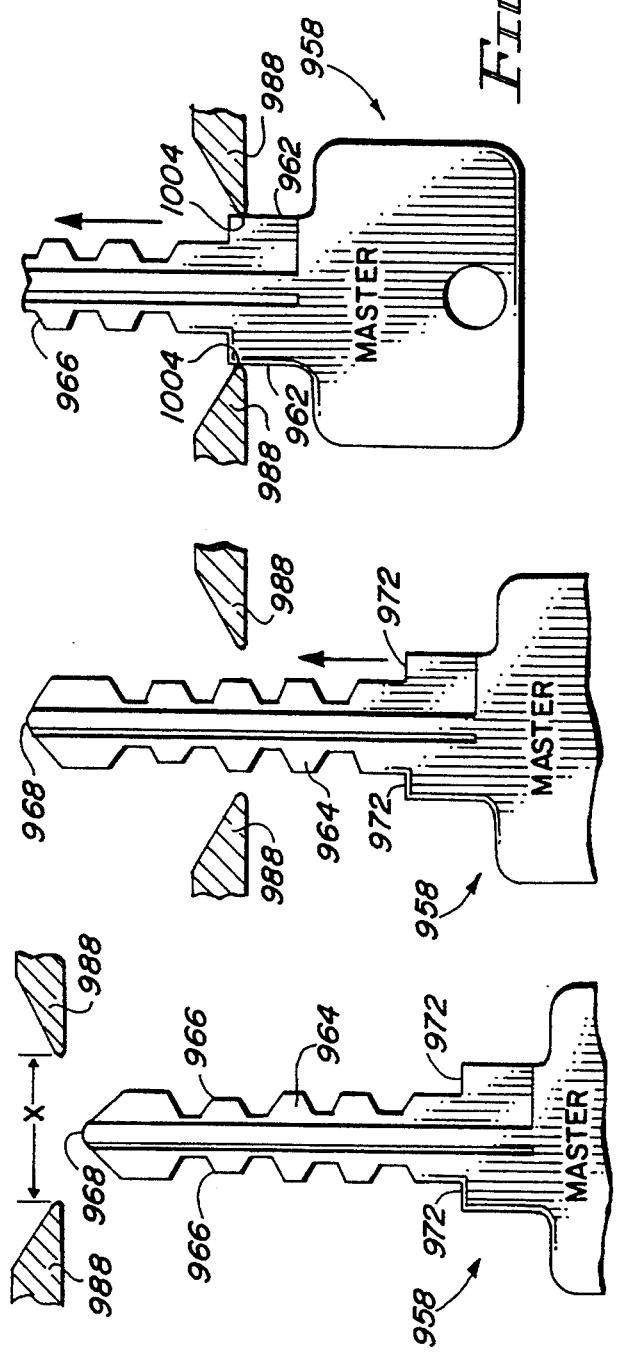
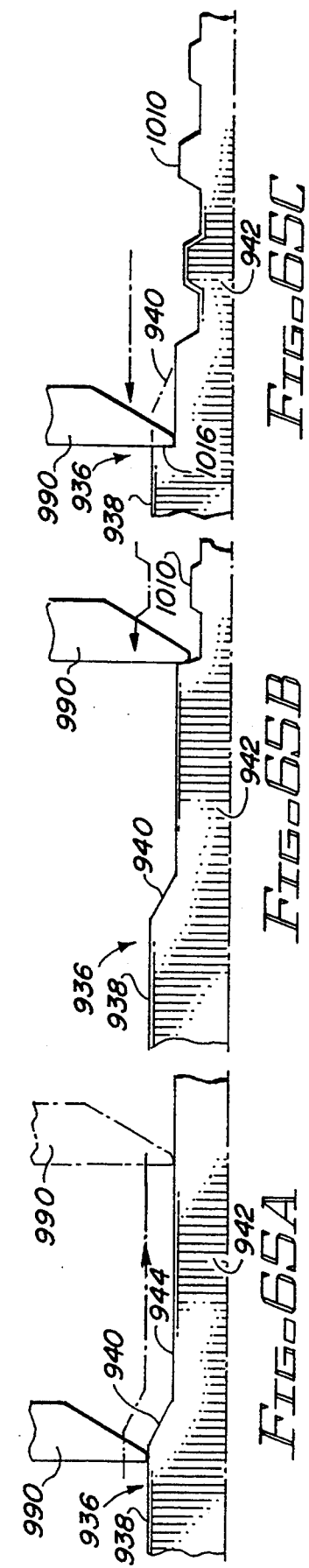
FIG-64A FIG-64B FIG-64C
FIG-65A FIG-65B FIG-65C

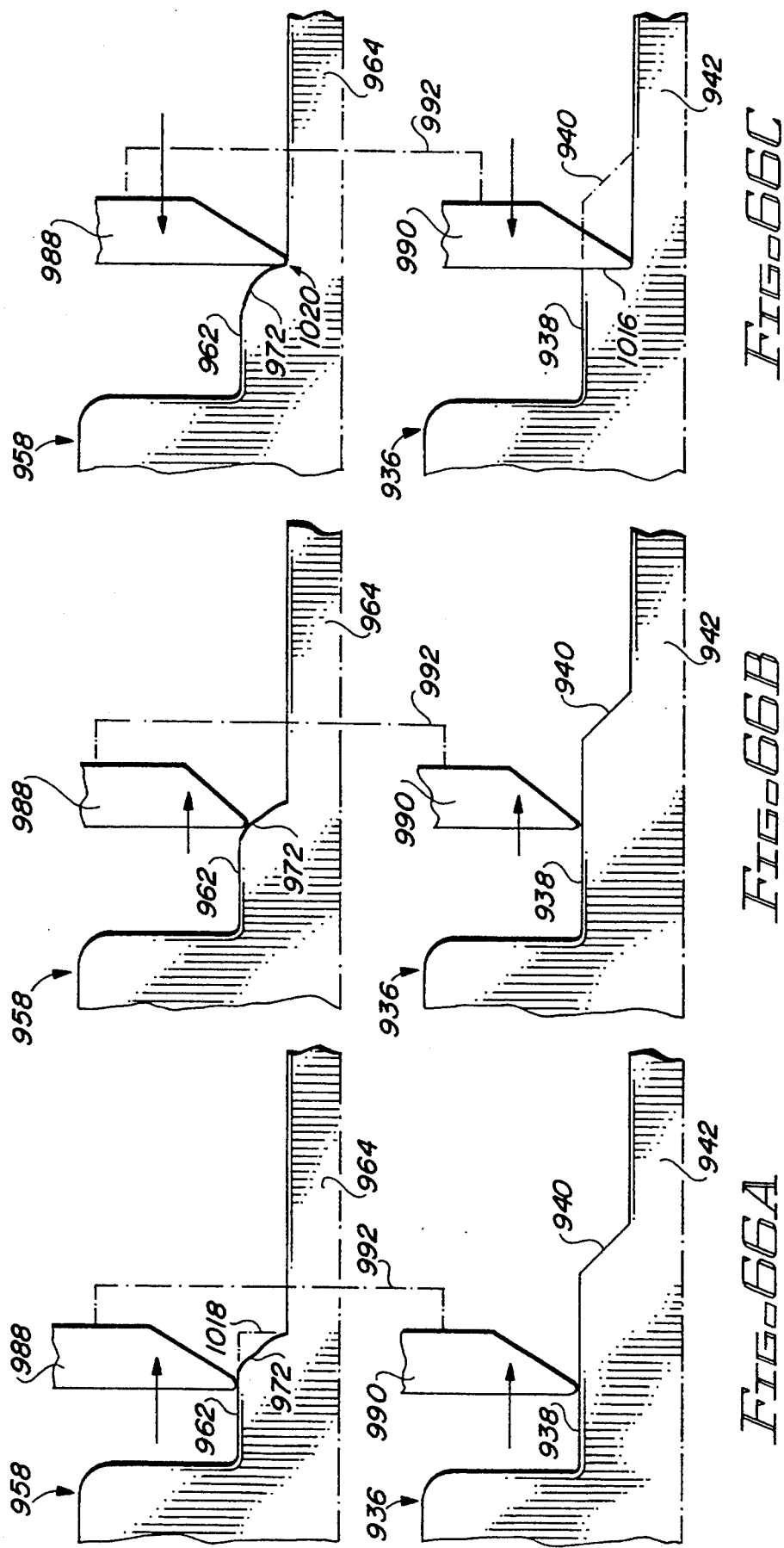

METHOD AND APPARATUS FOR ALIGNING AND CUTTING SINGLE-SIDED AND DOUBLE SIDED KEYS

This is a Continuation of U.S. patent application Ser. No. 07/769,921, filed Sep. 30, 1991, now issued U.S. Pat. No. 5,314,274, which is a Continuation-in-Part of U.S. patent application Ser. No. 425,731, filed on Oct. 19, 1989 (now abandoned), which is a Continuation-in-Part of U.S. patent application Ser. No. 260,815 (now abandoned), filed Oct. 21, 1988.

BACKGROUND OF THE INVENTION

1. Field of the Invention

This invention relates to key cutting machines, and more particularly, to key cutting machines which trace the bit notch pattern of a master key and duplicate the traced bit notch pattern onto the blade of a key blank.

2. Description of the Prior Art

U.S. Pat. No. 3,430,535 (Haggstrom) discloses a key cutting machine having a single vertically displaceable key follower/cutting wheel assembly. A vice-like key retaining assembly clamps a master key and a key blank in a fixed position. This vice-like key retaining assembly completely surrounds and blocks the opposite or rear surfaces of both the master key and key blank preventing tracing of the rear bitted surface of the master key as well as access to the rear bitted surface of the key blank. A cam-like mechanism displaces the master key and the key blank relative to the key follower and cutting wheel. An electric motor is coupled by a series of universal joints and a drive shaft to rotate the cutting wheel. Before either the key follower or the cutting wheel is moved into position to trace the single exposed bitted surface of the master key or to cut the single exposed bitted surface of the key blank, a gear driven key alignment plunger 36 mechanically contacts and forces the rear surface of the master key and key blank against the base of the vice-like key-holding device to appropriately align the master key and the key blank.

U.S. Pat. No. 1,243,810 (Christoph) discloses a key cutting machine having a pair of rotary key cutting wheels which radially pivot about a pair of spaced apart pivot assemblies to simultaneously cut bitted surfaces into a two-sided key blank. This key cutting machine follows a specially contoured, linear template 10 and is incapable of following the first and second bitted surfaces of a two-sided master key. The template includes a two-sided contour which at least in part represents the inverse of the desired duplicate key. This template is designed to compensate for the circular, non-linear displacements of the two rotary cutting wheels about pivot points 33 and 36.

Even if the errors arising from the circular or radial displacements of the two cutting wheels relative to the key blank were disregarded, positioning a master key at the key follower location of this key cutting device would reproduce cuts in the key blank exactly opposite or 180° out of phase with the bitted surface of the master key due to the location of the follower on the opposite side of a lever arm from the location of the cutting wheels. The use of this lever arm coupling system creates upward displacement caused by a master key bit to create a downward displacement or cut in the key blank and thus produces a mirror image of the master key bitted surfaces on the key blank. Such a mirror image key would be inoperative to actuate a lock configured to be opened by the master key. Only by duplicating a master key onto a key blank to produce a mirror image key blank, removing the mirror image key blank, relocating it in the master key position and duplicating the mirror image key blank onto a second key blank could an operative master key be produced. Since this operative master key would have been produced as a second generation master key two copies removed from the original master key and since the Christoph key cutting machine fails to compensate for the radial, non-linear deflections of the key cutting wheels relative to the key blank, the resulting duplicate master key would incorporate numerous, potentially significant reproduction errors.

U.S. Pat. No. 4,651,604 (Almblad) discloses a cassette-based key alignment device for a punch-activated key duplication system. The second bitted surface of a two-sided key can only be created by means of this cassette-based alignment system by removing the key blank, reversing it, reinserting it into the cassette and continuing to operate the punch mechanism while sequentially longitudinally displacing the key blank relative to the punch mechanism to generate the appropriate series of bits along the entire second bitted surface of the key blank.

SUMMARY OF THE INVENTION

It is therefore a primary object of the present invention to provide a key cutting machine capable of simultaneously following the first and second bitted surfaces of a two-sided master key and simultaneously duplicating those bitted surfaces onto the first and second bitted surfaces of a two-sided key blank.

Another object of the present invention is to provide a key cutting machine having a key alignment mechanism housed in a removable key-holding cassette where one type of cassette can be configured to align a single-sided master key and key blank while another type of cassette can be configured to align a two-sided master key and key blank.

Yet another object of the present invention is to provide a key cutting machine which accomplishes duplication of a master key onto a key blank during back and forth longitudinal displacements of both a master key and a key blank.

Briefly stated, an in accord with one embodiment of the invention, a method is provided for simultaneously duplicating both the bit notch pattern and shoulder position of the master key onto a key blank. The key blank includes a shank with an uncut length, a shoulder, a blade with an uncontoured surface and an original blade length, a tip and a first longitudinal axis. The master key includes a shank with a surface and a length, a shoulder, a blade with a contoured surface forming a bit notch pattern and a blade length, a tip and a second longitudinal axis. The second longitudinal axis is aligned relative to the master key as the first longitudinal axis is aligned relative to the key blank. The original key blank blade blade length is shorter than the master key blade length. The key blank is longitudinally aligned relative to a key cutter at a longitudinal index position spaced apart from the key tip by a first distance along the first longitudinal axis of the key blank. The key blank is laterally aligned relative to the key cutter to engage the key cutter with the shank or blade at the first distance to define a lateral reference distance relative to the first longitudinal axis. The master key is longitudinally aligned relative to a key follower at the longitudinal index position spaced apart from the key tip by the first distance along the second longitudinal axis of the master key. The master key is laterally aligned relative to the key follower to engage the key follower with the shank or blade surface at the first location at a distance offset from the second longitudinal axis by the lateral reference distance. The key follower is longitudinally and laterally displaced relative to the master key to trace the contour of the master key shank, shoulder and bit notch pattern while simultaneously displacing the key cutter relative to the key blank in an identical manner. The key cutter then reproduces the traced contour of the master key shank, shoulder and bit notch pattern on the key blank and longitudinally repositions the key blank shoulder to coincide with the relative longitudinal location of the master key shoulder by cutting away a portion of the shank to reduce the length of the shank. As a result, the key blank blade length is increased to a length greater than the original key blank blade length and equal to the master key blade length.

DESCRIPTION OF THE DRAWINGS

The invention is pointed out with particularity in the appended claims. However, other objects and advantages together with the operation of the invention will be better understood by reference to the following detailed description taken in connection with the following illustrations, wherein:

FIG. 3 is a front elevational view of the key cutting machine of FIG. 1 with the housing cover in place.

FIG. 4 is a rear elevational view of the key cutting machine of FIG. 3.

FIG. 5 is a perspective exploded view of the key receiving magazine.

FIG. 6 is an exploded perspective view of the cutter carriage.

FIG. 7 is a side sectional view showing the key receiving clamps of the key magazine.

FIG. 8 is a sectional view taken generally along the line VIII—VIII of FIG. 7.

FIG. 9 is an exploded perspective view of the key cutting machine housing.

FIG. 10 is a side elevational view of the key magazine.

FIG. 11 is a front view of the key magazine with a front cover removed.

FIG. 12 is a rear elevational view of the key magazine with a rear cover removed.

FIG. 13 is a top sectional view of the key receiving magazine taken at the single sided key clamp level, generally along the line XIII—XIII of FIG. 7.

FIG. 14 is a top view of the key receiving magazine taken at the double sided key clamp level generally along the line XIV—XIV of FIG. 7.

FIG. 15 is a sectional view through the key clamping portion of the key magazine taken generally along the line XV—XV of FIG. 7.

FIG. 18 represents a simplified partial electric schematic diagram of the key cutting machine of the present invention.

FIG. 19 represents a sectional view of the key cutting machine illustrated in FIG. 16, showing the relative movement of one part of the key cutting machine relative to the other part during the key cutting operation.

FIG. 23 represents a partially cutaway elevational view showing one linear bearing system of the present invention and the second cutter head assembly.

FIG. 24 represents a partially cutaway elevational view of a key alignment cassette.

FIG. 25 represents an enlarged perspective view of the upper and lower clamping surfaces of the cassette illustrated in FIG. 24.

FIGS. 26A and 26B illustrate the upper and lower clamping surfaces of the present invention being displaced between the open and closed positions.

FIG. 27 represents a perspective view of the tip alignment plunger of the present invention.

FIG. 28 represents a partially cutaway elevational view of the end of the tip alignment plunger intended for use with a two-sided key.

FIG. 29 represents a partially cutaway elevational view of the end of a tip alignment plunger intended for use with a single-sided key.

FIGS. 30A and B represent partially cutaway perspective views of a key alignment device of the present invention intended for use in connection with a two-sided key.

FIGS. 40 and 41 represent partially cutaway elevational views showing the manner in which a key alignment device of the present invention intended for use with single-sided keys can be operated.

FIGS. 42 and 43 represents a partially cutaway elevational views depicting the manner in which a key alignment device of the present invention is capable of laterally aligning a single-sided key.

FIG. 46 represents a perspective view of a shim for attachment to a cassette of the key cutting machine for properly longitudinally aligning a shoulderless key.

FIGS. 48, 49A and 49B represent partially cutaway elevational views further illustrating the manner in which a key alignment device of the present invention laterally aligns single-sided keys.

FIG. 50 illustrates a key alignment device for a two-sided key including a key set plunger assembly.

FIG. 51 represents a more detailed illustration of the FIG. 50 key alignment device, particularly illustrating the relative positioning of the cutter head, key follower, and cutter wheel assemblies.

FIGS. 52 and 53 illustrate yet another embodiment of the key alignment device for laterally aligning two-sided keys, specifically two-sided keys where the interior portion of the bitted surfaces is positioned close to the key head.

FIG. 54 illustrates another embodiment of the key aligning device of the present invention for aligning a two-sided key.

FIGS. 56 and 57 illustrate yet another key alignment device for laterally aligning a key.

FIG. 61A is a partially cutaway view from above illustrating initial insertion of a key blank between a pair of key cutters.

FIG. 61B is an elevational view sequentially related to FIG. 61A showing the relative location of key cutters and key followers prior to insertion of a key blank between the key cutters.

FIG. 62A represents an elevational view showing a key blank blade inserted between opposed key cutters where the sides of the key blade have laterally displaced the key cutters.

FIG. 62B is sequentially related to FIG. 62A and represents an elevational view of the key cutters illustrated in FIG. 62A and the interconnected key followers.

FIG. 63A represents a view from above illustrating a key blank fully inserted into a key cutting machine where the sides of the key shank have engaged and laterally displaced opposing key cutters.

FIG. 63B represents an elevational view of the key and key cutting machine structure illustrated in FIG. 63A showing the related lateral displacements of the paired, interconnected key followers where the lateral displacement of the key cutters results from engagement of the key cutters by the sides of the key blank.

FIGS. 64A, 64B and 64C are coordinated in time and position with FIGS. 61A, 62A and 63B and illustrate the sequential insertion of a master key between paired key followers from an initial insertion point (64A), to an intermediate insertion point (64B), to a final indexed insertion point (FIG. 64C).

FIGS. 65A, 65B and 65C sequentially illustrate the key duplicating process of the present invention involving an initial pass of the key cutter from the left to the right of the key blank followed by final displacement of the key cutter across the key blank from the right to the left creating a fully duplicated bit notch pattern and a new, full height shoulder on the key blank.

FIGS. 66A, 66B and 66C show (at the upper level) a key follower tracing a worn master key shoulder and (at the lower level) a key cutter creating a full height new shoulder on a key blank with an elongated shank.

DESCRIPTION OF THE PREFERRED EMBODIMENT

Figure 1:
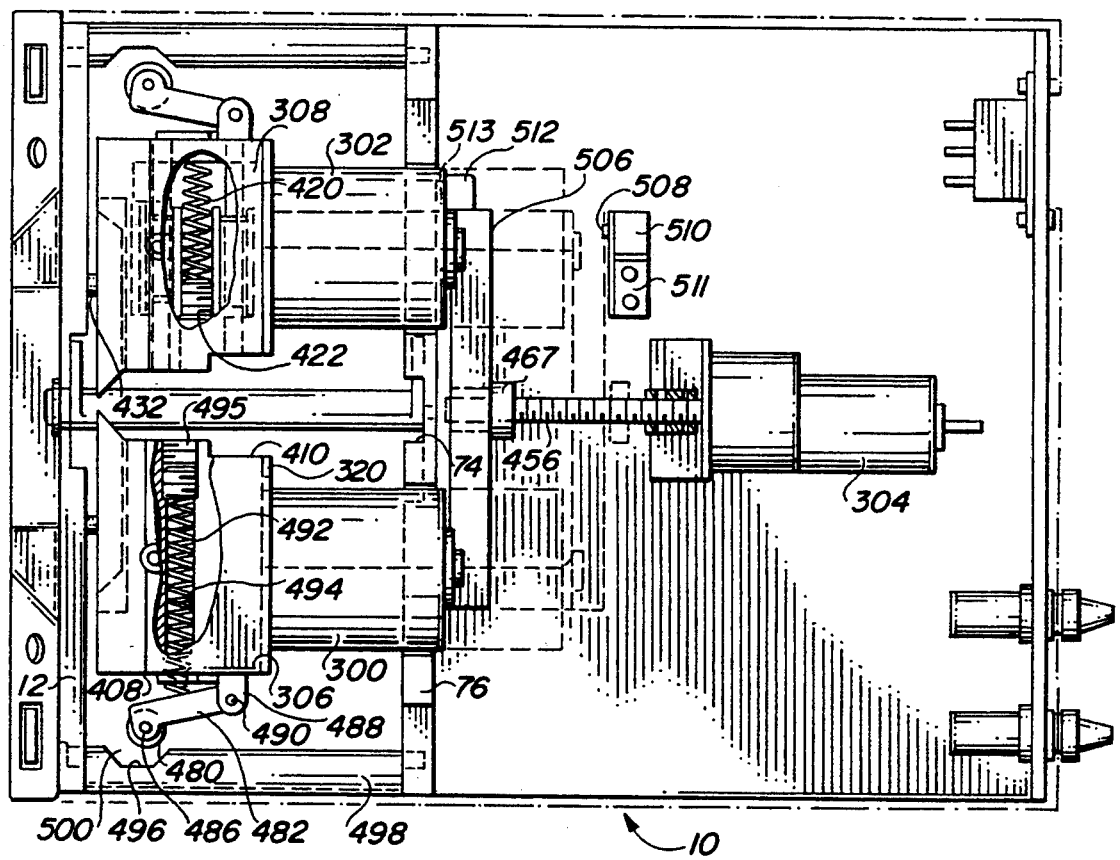
FIG. 1 is a top view of the key cutting machine embodying the principles of the present invention with a housing cover and a key magazine removed to expose the interior components.

In order to better illustrate the advantages of the invention and its contributions to the art, several preferred hardware embodiments of the invention will now be described in detail.

A first embodiment of the present invention provides a key cutting machine shown generally at 10 in FIGS. 1–4 which can be used for duplicating the bit pattern from a pre-cut master key onto a key blank, whether the master key is a single sided key or a double sided key. A front panel 12 of the machine 10 has two vertically arranged windows 14, 16 (FIGS. 3 and 9) for receiving the master key and key blank respectively.

Held on the front panel 12 is a red indicator light 18 with an associated push button 20 and a green indicator light 22 with an associated push button 24. Under normal circumstances, when an operator intends to make a duplicate key, the green light 22 will be lit signaling that the machine is ready for the acceptance of the master key and key blank. The key cutting machine 10 is designed to accept either single sided keys or double sided keys, although since such keys have a different configuration, different receiving apertures are provided for single sided and double sided keys.

On the front panel 12 there is a rotary knob 26 positioned beneath the windows 14, 16 which is manually rotated by the operation to select the apertures for double or single sided keys. Eccentric cams 28, 30 connected by a rod 32 (FIG. 9) are operated by the knob 26 such that as the knob 26 is rotated from a first counter-clockwisemost position to a second clockwisemost position, an upwardly facing portion 34 of the cams 28, 30 is increasingly spaced from an axis of rotation 36 of the knob (FIG. 3). A pin 38 captured in an arcuate slot 40 provides limits of travel for the knob 26 such that the knob 26 is capable of rotating only through 180.

When the cam is in the counter-clockwisemost position, as illustrated in FIG. 3, a key receiving magazine 50, which has a bottom surface 52 supported on the upper surface 34 of the cams, is permitted to drop to a lowest position. In this lowest position the key magazine 50 presents an aperture 54 in window 14 for receiving a single sided master key M1 (FIGS. 3 and 5). Also, the key receiving magazine 50 presents a second aperture 56 in window 16 for receiving a single sided key blank B1. If the knob 26 is rotated clockwise 180°, then the entire key magazine 50 is elevated to an upper position where it presents a third aperture 58 in the window 14 for receiving a double sided master key M2 and presents a fourth aperture 60 in window 16 for receiving a double sided key blank (not shown).

The magazine 50 is vertically removable from the key cutting machine and has a pair of guide rails 70, 71 (FIGS. 10, 12) on the back of a rear wall 72 thereof which are guided in a vertical channel 74 (FIG. 9) in an intermediate wall 76 in the machine 10.

Although the magazine 50 accepts at least 90% of all flat keys having a tooth pattern along one or both opposite edges, the magazine could be removed and replaced by a different magazine capable of receiving other keys not accepted by the disclosed magazine.

The knob 26 is preferably provided with a ridge 62 (FIG. 9) extending diametrically across the knob which includes a pointer 64 at one end. Appropriate indicia 66, 68 are provided on the front panel 12 so that the position of the knob 26 and the pointer end 64 relative to the indicia 66, 68 will advise the operator as to which position, that is single sided or double sided, the key magazine 50 is in. Further, appropriate indicia may be provided adjacent to each of the openings 54, 56, 58 and 60 on the key magazine 50 which may be exposed and viewable through windows 14, 16 to further advise the operator of the positional status of the key magazine 50.

Once the appropriate apertures have been selected by rotation of the knob 26, the key machine will be ready to accept the master key and key blank. To insert the master key in the aperture exposed through window 14, a clamp release lever handle 80 (FIG. 5) is pushed rearwardly to release a fixture member in the form of an upper key receiving clamp 82 (FIGS. 5, 7 and 10). The lever handle 80 is attached to a lever arm 84 which pivots about a pin 86 horizontally secured in the magazine 50. The arm 84 has a slot 88 therein which receives a projecting pin 90 of a cam sliding bar 92. The cam sliding bar 92 has a cylindrical rear portion 94 which is slidingly received in a cylindrical passage 96 (See also FIGS. 8 and 12) such that the cylindrical portion 94 can slide forward and backward within the passage. An abutment surface 98 (FIG. 8) is provided at a forward end of a slot 100 in the wall of the cylindrical passage 96 to be engaged by the pin 90 to prevent the cylindrical portion 94 from moving too far forward in the magazine.

The cylindrical passage 96 has a front opening 102 and the cam sliding bar 92 has a forwardly projecting portion 104 which extends through the opening 102 and projects forwardly thereof. A forward end 106 of the projecting portion 104 is captured in a guide slot 108 formed between two tabs 109 in a front wall 110 of the magazine 50 such that the cam sliding bar 92 may be moved forwardly or rearwardly, but is otherwise captured and prevented from rotating about its longitudinal axis or turning perpendicular to such axis.

Formed on opposing side faces 120, 122 of the projecting portion 104 are cam wedges 124, 126, 128 and 130. The cams 124, 126, 128 and 130 each comprise an open wedge shape having a forward vertex 132 and two rearwardly diverging legs 134, 136 (FIG. 7).

A jaw member 150, being an upper movable jaw, and a lower movable jaw member 152 are engaged by the cams 124, 126, 128, 130 and are caused to move vertically in response to horizontal movement of the cam slide bar 92. The upper movable jaw member 150 has an "h" cross-sectional shape (FIGS. 5 and 15) with two, spaced apart downwardly extending legs 153, 154 connected at a top by a horizontal web 156 thereby leaving a longitudinal vertical slot 158 therebetween. A vertical leg 160 extends upwardly from lower leg 154. Legs 153, 154 are identically shaped in a longitudinal sense and have two, spaced apart, upwardly and rearwardly angled lateral slots 162, 164 (FIGS. 5 and 7) which receive and engage with the upper legs 134 of the cams 124, 126, 128, 130.

The second, and lower movable jaw member 152 has a "U" cross-sectional shape (FIG. 5 and 15) having upwardly projecting legs 166, 168 connected at a bottom by a web 170 and forming a longitudinal slot 172 therebetween. The legs 166, 168 are identically formed and have two downwardly and rearwardly extending lateral slots 174, 178 (FIG. 7) which receive and engage the lower legs 136 of the cams. The slots 158, 170 receive the forward projection 104 of the cam sliding bar. The upper jaw member 150, along a lower edge 180, has a downwardly extending projection 182 adjacent to an upwardly extending lateral slot 184 and the lower jaw member 152, along an upper edge 185, has a downwardly extending lateral slot 186 mating with the downwardly extending projection 182 of the upper jaw member 150, and an upwardly extending projection 188 which extends into and engages the slot 184 of the upper jaw member 150. This interengagement of projections and slots allows the two movable jaw members 150, 152 to move vertically relative to one another but prevents any horizontal motion of the jaw members relative to one another.

As the lever arm 84 is moved rearwardly, its connection to the cam sliding bar 92 through pin 90 at slot 88 causes the cam sliding bar 92 to move rearwardly in the cylindrical passage 96 thus drawing the cams 124, 126, 128 and 130 rearwardly. The legs 134 and 136 slide horizontally relative to the movable jaw members 150, 152, which jaw members abut against an end face 189 of the passage 96 at one end and against the tabs 109 at an opposite end and thus are prevented from moving horizontally. A bottom surface of legs 134 and a top surface of legs 136 cause the upper jaw member 150 to move downwardly and the lower movable jaw member 152 to move upwardly. Spaced above the upper movable jaw member 150 is an upper fixed jaw member 200 and, spaced below the lower movable jaw member 152 is a lower fixed jaw member 202.

Thus, as the lever arm 84 is moved rearwardly, the upper jaw the lower movable jaw member 152 is moved away from the lower fixed jaw member 202.

The aperture 54 in the front of the magazine for receiving the single sided master key M1 aligns with the space between the upper fixed jaw member 200 and upper movable jaw member 150 and the aperture 58 in the front of the magazine for receiving the master double sided key M2 aligns with the space between the lower movable jaw member 152 and the lower fixed jaw member 202. As the lever arm 84 is moved rearwardly, the spacings between the movable jaw members 150, 152 and the fixed jaw members 200, 202 increase thereby permitting a master key to be easily inserted through the selected opening 54 or 58 as determined by the position of the cam knob 26.

In the illustration of FIG. 7, the single sided key opening 54 has been selected and the single sided master key M1 is shown as being inserted through the opening 54 between the upper movable jaw member 150 and the upper fixed jaw member 200. Referring now to FIGS. 7 and 13, as the master single sided key M1 is inserted through the opening and into the space between the jaws 150, 200, a forward edge E of the master single sided key, which, for all such keys is formed at an angle to the length of the key, engages a similarly angled face 220 of a cylindrical plunger member 222 which is caused to move rearwardly against the bias of a spring 224 into a cylindrical passage 226 in the magazine. The angled face 220 causes the key M1 to move toward the upstanding leg 160 of the upper movable jaw member 150 so that a flat back side F of the master single sided key M1 will be urged and positioned against the leg 160 to ensure correct positional alignment of the master single sided key. The master single sided key M1 will be inserted until further insertional movement is no longer possible because a shoulder S on the single sided master key M1 (which all such keys have) abuts against a front face 228 of the magazine 50.

The plunger 222 includes a protruding key portion 230 which extends radially from one side of the plunger and which is received in a rectangular keyway 232 formed in the passage 226 (FIG. 12). This prevents rotation of the plunger 222 within the passage 226. When rearward pressure against the handle 80 of the lever arm 84 is released, the lever arm 84 is urged forwardly by the influence of a spring 240 (FIG. 5) which engages at a first end 242 with the lever arm 84 and at a second end 244 with an arm 246 projecting horizontally from a vertical post 248 formed on a top of the magazine 50. The post 248 and spring 240 are normally enclosed beneath a cover 250 held in place by appropriate fastening members 252 such as threaded screws. The lever arm 84 extends upwardly through an opening 254 in the cover.

As the lever arm 84 moves forwardly, a forward edge 256 thereof engages against a forward end 258 of the opening 254 which acts as a stop. In this position, the slider bar 92 will be moved forwardly causing the cams 124, 126 to slide forwardly relative to the movable jaw members 150, 152, thereby urging the upper jaw member 150 upwardly and the lower movable jaw member 152 downwardly. In this manner, the upper movable jaw member 150 will clamp the master single sided key M1 firmly between the upper movable jaw member 150 and the upper fixed jaw member 200. Thus, the master single sided key M1 will be firmly clamped in place against the upwardly extending leg 160 of the upper jaw member 150 and between the upper movable jaw member 150 and the upper fixed jaw member 200 and will be held in such clamped position by the bias of spring 240.

An identical operation occurs during insertion of the single sided key blank B1 into opening 56 which will be exposed through window 16. For insertion of such key blank, a second lever knob 250 connected to a second lever arm 252 is moved rearwardly to cause an identical upper jaw member 254 and lower jaw member 256 to move apart from an upper fixed jaw member, which is the same structural unit as the lower fixed jaw member 202 (and therefore is also referred to with reference numeral 202) and a lower fixed jaw member 258 respectively. Thus, the single sided key blank B1 can be inserted into the opening 56 to rearwardly displace an identically shaped plunger 260 which causes the single sided key blank B1 to be held against an upper leg of the upper movable jaw member 254 in precise alignment with the single sided master key M1 clamped above it.

Release of the second lever 250 causes forward movement of the lever under bias of a spring 262 mounted in an identical arrangement to spring 240, thus resulting in a firm clamping of the single sided key blank B1 between the upper movable jaw member 254 and the upper fixed jaw 202.

With both the master single sided key M1 and the single sided blank B1 now fully inserted and clamped in place, the cutting operation may begin. This is accomplished by pressing the actuator button 24 adjacent to the green light 22 on the front panel 12 of the key cutting machine 10.

When the button 24 is pressed, switches are latched closed which energize power means in the form of two separate cutter motors 300, 302 as well as a carriage motor 304 (FIGS. 1 and 6). FIG. 6 illustrates the assembly of the cutter motors 300, 302 onto cutter blocks 306, 308.

Cutter motor 300 includes a drive shaft 310 projecting from a forward face thereof which receives a drive gear 312 secured in place by a pin 314. The drive shaft 310 and gear 312 project through an opening 316 in a back plate 320 for cutter block 306 and the cutter motor 300 is secured to the back plate 320 by a plurality of appropriate fasteners (not shown) which extend through openings 322 in the back plate 320 and into openings 324 in the front face of the motor 300.

A cutter wheel 330 is carried on a shaft 332 and is keyed against rotation by means of a pin 334 engaging in a key way 336 in a central opening 338 receiving the shaft 332. A C-ring 340 snaps into place in a groove 342 on the shaft to lock the cutter wheel 330 axially in place on the shaft 332. Thus, the wheel 330 can easily be removed and replaced from the front of the machine upon removal of the C-ring 340. Removal and replacement is facilitated by making at least an upper portion of the front panel 12 removable to expose the wheels 330, 360. The shaft 332 is inserted into a bearing 343 which is held in a front opening 344 in the cutter block 306 and the shaft 332 receives a gear wheel 346 which is keyed to the shaft 332 for co-rotation therewith. The shaft extends through a rear-bearing 348 and a washer 350 is interposed between the gear wheel 346 and a snap ring 352 which snaps into a groove 354 on the shaft to hold the gear wheel 346 in a fixed axial position on the shaft 332. The teeth of the gear 312 mesh with the teeth of gear 346 such that rotation of the drive shaft 310 of cutter motor 300 causes rotation of the cutter wheel 330. The use of the two gears 312, 346 causes a reduction in the speed of rotation of the cutting wheel 330 to assure an effective cutting of the keys. The second cutter motor 302 and a second cutter wheel 360 are mounted on cutter block 308 identically to the description of the first cutter motor 300 and cutter motor 330.

The cutter block 306 includes tracing means in the form of a movable tracing or follower arm 361 which is slidably carried in a slot 362 in a top of the block 306. A threaded fastener 364 and washer 366 engage over a top of the movable follower arm 361 and engage into a threaded aperture 368 in the block 306 to firmly clamp the arm 361 in a selected position in the slot 362. A second threaded fastener 370 with a washer 372 secured thereto is threadingly received in an aperture 374 in the block and the washer 372 is captured in a slot 376 in the follower arm 361 such that rotation of the fastener 370 will cause the fastener to move axially drawing the follower arm 361 with it.

The follower arm 361 has a front face 380 which is in precise longitudinal alignment with a front face 382 of the cutting wheel 330. The follower arm 361 has an angled back face 384 at one end which has a slope identical to an angled face 386 of the cutter wheel 330. The follower arm 361 can be laterally moved into precise vertical alignment with the cutter wheel 330 so that a leftmost edge or finger 388 is in vertical alignment with a leftmost point 390 on the cutting wheel. As seen in FIG. 13, the follower arm 361 engages a bit edge B of the single sided master key M1. The leftmost edge or finger 388 is used to trace the pattern or configuration of the bit side B of the key and to cause the cutting wheel 330 to duplicate the pattern onto the single sided key blank B1 which is clamped in precise alignment below the single sided master key M1. In this manner, precise duplication of the bit pattern is achieved.

The second cutter block 308 is provided with an identical tracing or follower arm 400 with a finger 401 which can be laterally adjusted and secured in place in a manner identical to the first described tracing arm 360.

Figure 2:
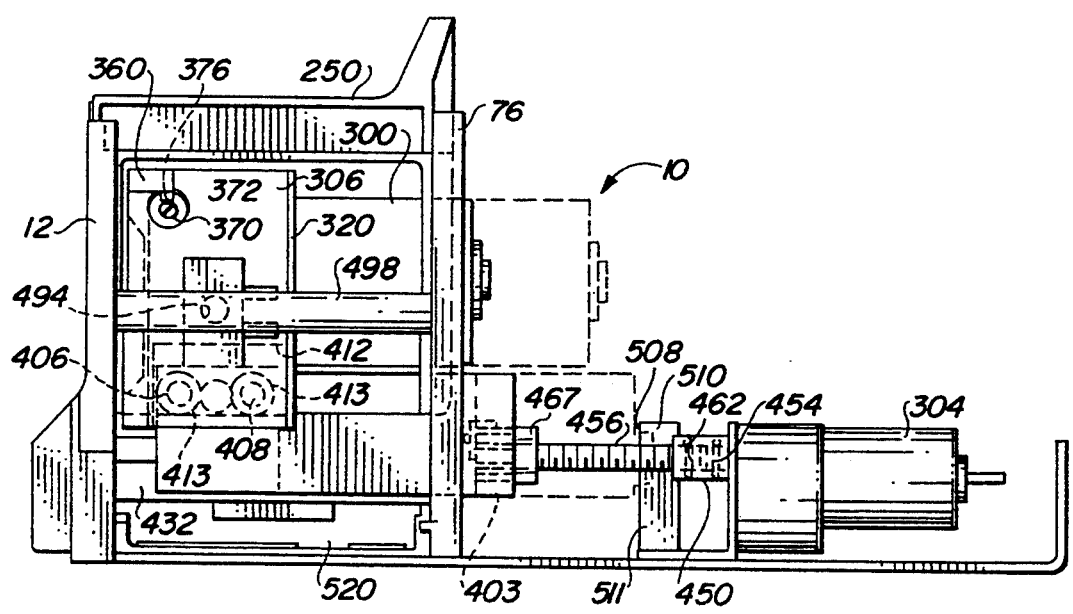
FIG. 2 is a side elevational view of the key cutting machine of FIG. 1 also with the cover removed.

The cutter blocks 306, 308 are independently mounted on a carriage 402 and are mounted to be independently laterally and linearly movable relative to the carriage 402. The cutting block 306 (and the same is true for block 308) has a pair of guide rods 404, 406 secured thereto which extend between lateral side walls 408 and 410 of the guide block in a recessed space 412 (FIG. 2). The guide rods are received in linear bearings 413 captured in bores 414, 416 of the carriage 402 so that the cutting block 306 is laterally and linearly slidable on the carriage.

The cutting blocks 306 and 308 are normally biased towards one another by a first, soft spring 420 (FIG. 1) captured within the blocks 306, 308 by a threadingly adjustable stop 422 by which the inward biasing pressure can be selectively adjusted. The pressure of this soft spring 420 is not so great as to prevent insertion of the master or blank keys by causing the tracing arms 361 and 400 and the cutting wheels 330, 360 to close off the key receiving space between the jaws, however the spring pressure is great enough to cause the cutting blocks 306 and 308 to move toward each other once the keys are fully inserted so that the tracing arms 361 and 400 are in engagement with the keys or upper movable jaw leg as selected.

The carriage 402 is movable itself in a linear longitudinal direction and is carried on guide rods 430, 432 (FIG. 6) which ride in linear bearings 434, 436, 438 and 440 (not seen). The guide rods 430, 432 are secured at a forward end in the front panel 12 of the housing and at a rear end in the intermediate wall 76.

The carriage motor 304 has a drive shaft 444 which protrudes through an opening 446 in a support bracket 448 and is rotatingly received in a collar 450. A pin 452 extends through a 90° slot 454 in the collar to provide a 90° loss motion connection between the drive shaft 444 and the collar 450. A drive screw 456 has a first end 458 which is rotatingly received in the collar 450 and a pin 460 extends through the end 458 of the drive screw 456 and through a 90° slot 462 in the collar to provide a second 90° loss motion connection between the collar 450 and the drive screw 456. A second end 464 of the drive screw is threaded and is received in a threaded opening 466 of a nut 467, in turn threaded into a back wall 468 of the carriage 402 at a threaded opening 470.

As the carriage motor 304 operates the drive shaft 444 in a first direction of rotation, and after the two 90° loss motion connections have been absorbed, the carriage is caused to move rearwardly through the threaded connection between the drive screw 456 and the threaded opening 466. When the motor 304 is reversed, again there is first 180° of loss motion of the drive shaft 444 relative to the drive screw 456 and then the carriage is caused to move in a forward direction.

Thus, when the start button 24 is pressed, the cutter motors 300, 302 are energized causing the cutting wheels 330 and 360 to immediately begin rotating. The tracing arms 361, 400 hold the cutting wheels at a lateral location identical to the edge of the master key. The carriage motor 304 is also energized and begins to rotate, and after 180° of rotation of its drive shaft, the carriage begins to move rearwardly. The 180° of loss motion gives the cutting wheels sufficient time to reach full cutting speed so that the cutting wheels are at full speed before the tracing arms 361, 400 are moved longitudinally toward the cut portion of the key. Also, the tracing arms 361, 400 are pressed lightly towards each other assuring contact of the fingers 388, 401 with the outline of the key to be traced.

As the carriage is moved rearwardly increased inward pressure is applied to the cutting blocks 306, 308. As seen in FIGS. 1 and 6, this is accomplished by means of a roller 480 which is carried on a pair of spaced arms 482, 484 by means of a pin 486, the arms being carried on a bracket 488 by means of a pin 490 so that the arms are free to rotate relative to the bracket 488. A strong spring 492 which is carried in a bore 494 of the cutting block 306, protrudes from the cutting block 306 and engages the arms 482, 484 and presses the roller 480 outwardly. The pressure of the spring 492 can be adjusted by means of a threaded nut 495 carried in the cutting block 306. The roller 480, when the cutting block 306 is in the position closest to the front panel 12 of the key cutting machine 10, is not contacted by any other part of the machine and therefore does not provide a strong inwardly biasing force. However, upon rearward movement of the carriage 402, the roller 480 engages against a slanted face 496 of a rod 498 which extends between the front panel wall 12 and the intermediate wall 76. A pocket 500 which includes the sloped face 496 is provided adjacent the roller 480 in the forwardmost or home position of the carriage 402 so that the strong spring 492 is ineffective in the home position. However, as the carriage moves rearwardly, the roller 480 engages the slope face 496 and causes the strong spring 492 to more forcefully bias the cutting block 306 toward the centerline of the key cutting machine. This assures that during the cutting operation, sufficient force is applied between the tracing arm 360 and the key to assure accurate tracing of the teeth on the key. As the carriage 402 continues rearwardly, the roller 480 rolls on the outer surface of the rod 498 to provide the strong inward bias on the cutting block 306. Cutting block 308 has an identical inward bias arrangement. It should be noted that in FIG. 1, it does not appear that the rollers 480 would engage the rods 498 to any great degree, but this is only because FIG. 1 illustrates the key cutting machine 10 with the magazine 50 removed. When the magazine is inserted, the blocks 306, 308 will be caused to move laterally thereby moving the rollers 480 well into the pockets 500 and assuring compression of the strong spring 492 when the carriage moves rearwardly.

As the carriage 402 moves rearwardly, the tracing arm 360 rides along the bit edge B of the single sided master key M1 and causes the cutting wheel 330 to cut an identical pattern in the single sided key blank B1. The tracing arm 400 rides along an outside surface of the upper leg 160 of the upper movable jaw member 150 to hold the cutting wheel 360 away from the flat side of the key blank and the upper leg of the upper movable jaw 254. The carriage 402 continues to move rearwardly and as it does, a rear edge 502 (FIG. 13) of the cutting block 308 engages a tab 504 on the plunger 222 to move the plunger 222 longitudinally and rearwardly away from the key. This prevents the cutting wheels 330, 360 from engaging the lower plunger 260.

When the carriage 402 reaches a predetermined rearwardmost position, a rear face 506 of the carriage engages an actuator button 508 of a microswitch 510 carried on a support bracket 511 which causes the cutting wheel motors 300, 302 to become deenergized and causes the carriage motor 304 to be reversed. When this occurs, the cutting wheels 330, 360 stop rotating and the carriage begins to move forwardly toward the home position. At this point, the red light 18 on the front panel 12 is illuminated signaling the operator that the keys may be removed. The lever arms 84 and 252 may be pressed rearwardly to release the clamping jaws from engagement with the keys, and the forward movement of the tracing arms and non-rotating cutting wheels will urge the keys forwardly out of the openings 54, 56 in the front panel. The red light will continue to be illuminated until the carriage 402 arrives at the full forward or home position at which time a second microswitch 512 carried on the carriage will be actuated by contact with a stationary stop 513 which causes the carriage motor 304 to become deenergized and causes the green light 22 to become illuminated.

Pressing the button 20 next to the red light 18 anytime during the operation of the machine will have the same effect as actuation of microswitch 510, that is, the cutting wheel motors 300, 302 will be deenergized, stopping the rotation of the cutting wheels 330, 360 and causing the carriage motor 304 to reverse, sending the carriage back to the home position. If power to the machine is removed anytime during the cutting operation, upon resumption of power to the machine, no motors will be energized and only the red indicator light 18 will be illuminated. The button 20 next to the red illuminator light must then be pressed which will cause the carriage motor 304 to operate in a reverse direction sending the carriage back to the home position.

A removable tray 520 is provided which is received beneath the position of the cutting wheels 330, 360 and which receives the grindings from the cutting wheels. The tray can be laterally removed for disposal of the cuttings and laterally replaced permitting easy and complete collection of the cuttings.

If a double-sided master key M2 (FIG. 14) is selected for duplication, then the operator would rotate knob 26 so that the pointer 64 points to the indicia 68 for double sided keys. This will cause the entire magazine 50 to elevate exposing openings 58, 60 through 14, 16 respectively. Double-sided master keys M2 are configured somewhat differently than single-sided keys in that there is no flat edge against which the key can be pressed and longitudinally aligned. However, all double sided keys have a pointed forward end P and thus a plunger 600 to be engaged by the double sided master key M2 has a pair of slanted forward edges 602, 604 which complement the pointed end P of the double sided key. This ensures a centering of the key tip in the space between the lower clamping jaw member 152 and the lower stationary jaw member 202. The double sided master key M2 is inserted until the plunger 600, which has a rearwardly extending portion 630, and which is forwardly biased by a spring 632 bottoms out by the rearwardly extending portion 630 engaging a cover strip 634 at the rear of the magazine 50. By such an arrangement, it will be ensured that an identical length of a double sided master key M2 and a double sided key blank will be presented for tracing and cutting respectively. This is important since double sided keys do not have shoulders like shoulder S on the single sided master key M1.

To ensure a centering of the double sided shank of the key, the opening 58 includes a pair of inwardly biased guides 606, 608 (FIGS. 5 and 11) which each have a gear wheel 610, 612 secured therebelow to the front wall 110 of the magazine 50 by pins 614, 616. The gear wheels 610, 612 ride on a gear racks 618, 619 respectively, on each guide 606, 608 which assures identical rotation of the gear wheels 610, 612 and thus ensures identical lateral movement of the guides 606, 608. The guides 606, 608 are normally biased inwardly by springs 620, 622 such that the guides will engage the edges of the key shank and, due to the identical lateral movement of the guides 606, 608, it is assured that the shank will remain centered as well as the tip, thus providing an accurate centering and longitudinal alignment of the double sided key. When the lever arms are released, an identical clamping action occurs as was described above with respect to single sided keys and thus the double sided keys (both master and blank) will be accurately maintained in place in the magazine 50.

In all other respects, the operation of the key cutting machine is identical for double sided keys as was described for single sided keys with the exception that the tracing arm 400 now does engage against an edge of the key and thus does cause the cutting wheel 360 to in fact cut the key blank positioned in the lower jaw set.

Thus it is seen that the present invention provides a method and apparatus for automatically cutting keys which comprises a pair of cutting wheels each having a cutting edge and with at least one of the wheels being mounted for movement towards and away from the other. Biasing means are provided for biasing the cutting edges of the wheels towards one another. Means are provided for fixing both a key blank and a key to be duplicated and edge tracing means are provided to engage said key to be duplicated which effects movement of at least one of said cutting wheels towards and away from the other in conformity with an edge configuration of the key to be duplicated. A power means having an actuation means moves the key blank relative to the wheels and moves the key to be duplicated relative to the tracing means.

Figure 16:
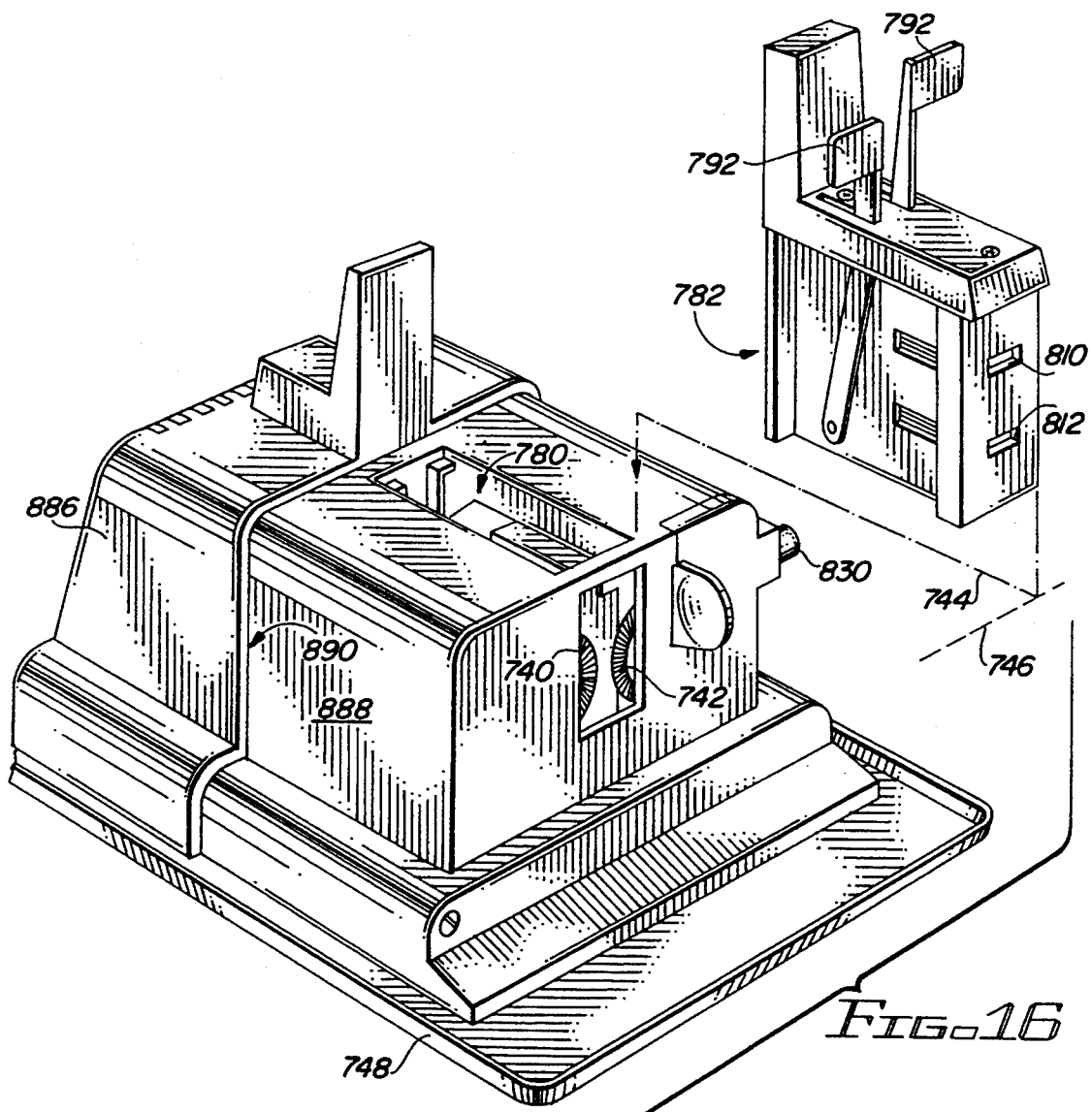
FIG. 16 represents a perspective view of a second embodiment of the key cutting machine of the present invention showing the cassette removed from the key cutting machine.
Figure 17:
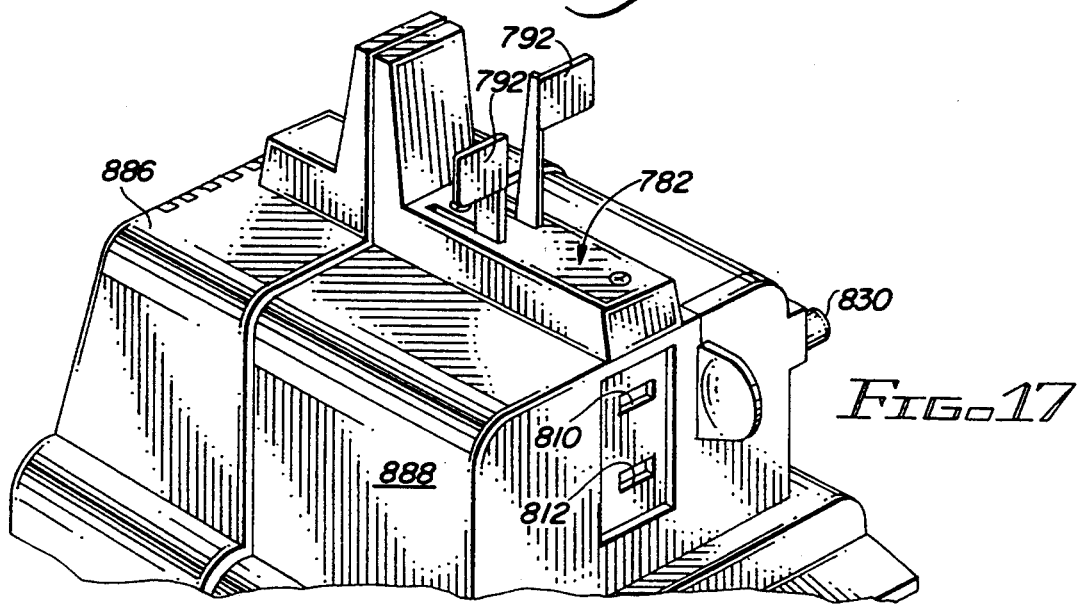
FIG. 17 is a partially cutaway perspective view of the key cutting machine of the present invention showing the cassette as installed.

FIGS. 16, 17 and 19 generally illustrate the key cutting machine of the present invention. In order to more readily appreciate the various features and functions of this key cutting machine, the various types of keys which can be duplicated on this key cutting machine will first be described and identified in connection with FIGS. 31-35.

Figures 31, 31A:
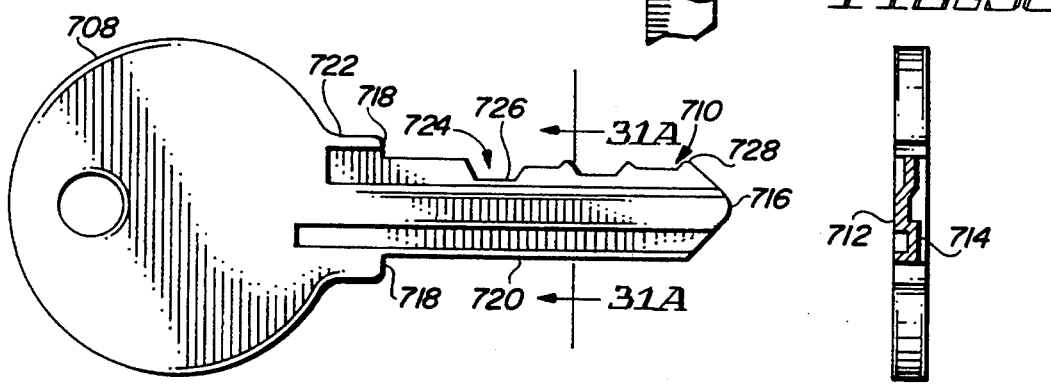
FIGS. 31 and 31A represent elevational and sectional views of a typical one-sided key.

FIG. 31 and sectional view FIG. 31A illustrate a conventional single sided key 708 having a bitted surface 710, an upper surface 712, a lower surface 714, a tip 716, a shoulder 718, a linear root surface 720 and a shank 722. Reference number 724 indicates that first bitted surface 710 of key 708 includes a series of cuts extending laterally between a first lateral position 726 which approaches most closely to key root 720 and a second lateral position 728 which is laterally displaced the greatest distance away from key root 720.

Figures 32, 33:
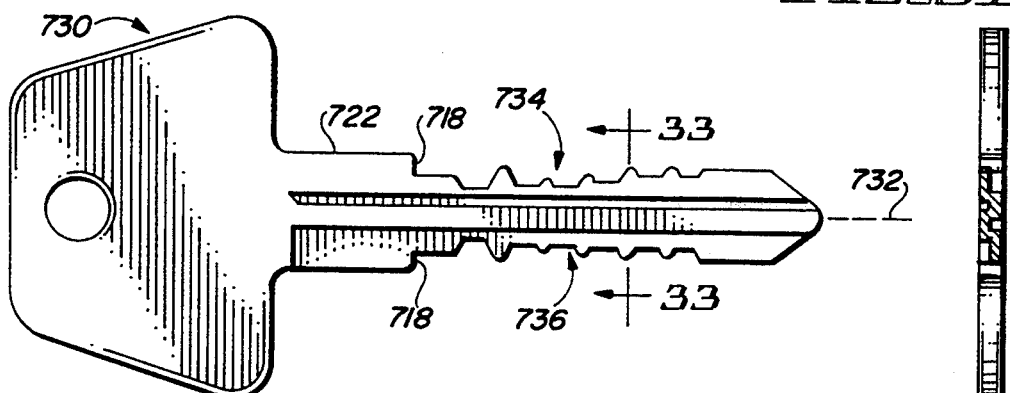
FIG. 32 represents an elevational view of a typical two-sided key having a shoulder.
FIG. 33 is a sectional view of the two-sided key illustrated in FIG. 32, taking along section lines 33—33.

FIGS. 32 and 33 illustrate a conventional two-sided key 730 which includes most of the same elements of those described above in connection with single sided key 708. Two sided key 730 includes a key centerline 732, a first bitted surface 734 and a second bitted surface 736. Double-sided key 730 does not include a root. Double side key 730 includes cuts extending laterally between a first lateral position located in proximity to the key centerline 732 and a second lateral position further displaced from the key centerline on both the first bitted surface 734 and second bitted surface 736. Double-sided key 730 illustrated in FIG. 32 includes paired shoulders 718 as well as a shank 722.

Figures 34, 35:
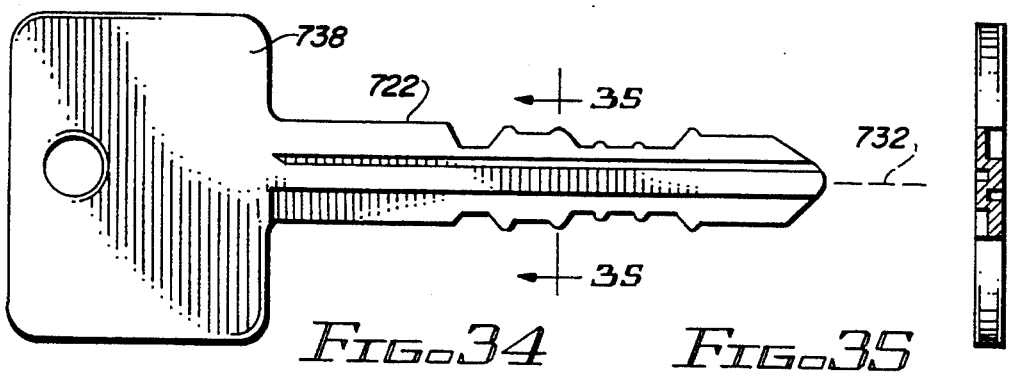
FIG. 34 represents an elevational view of a two-sided key without a shoulder.
FIG. 35 represents a sectional view of the two-sided key illustrated in FIG. 34, taken along section lines 35—35.

FIGS. 34 and 35 illustrate another form of double-sided key 738 which also includes a key centerline 732. As shown in FIG. 34, double-sided key 738 includes a key shank 722 but does not include any shoulder surfaces.

To describe the overall operation of the key cutting machine of the present invention including all of its operational elements, the structure and operation of the key cutting machine will initially be described in connection with the duplication of a two-sided master key onto a two-sided key blank.

As illustrated in FIG. 16, the key cutting machine includes a vertically oriented central plane of symmetry which precisely bisects the machine between first cutting wheel 740 and second cutting wheel 742. The key cutting machine also includes a longitudinal axis which represents a linear horizontal axis line lying in the vertically oriented plane of symmetry. The longitudinal axis is parallel to the line designated by reference number 744 in FIG. 16. The key cutting machine also includes a lateral axis which passes through cutting wheels 740 and 742 and which is parallel to the dotted line designated by reference number 746.

Referring now to FIGS. 16, 17, 19, 22A and 22B, the key cutting machine of the present invention includes a base 748, a first cutter head 750 and a second cutter head 752. First cutter head 750 includes a first key follower 754 positioned at a first elevation and a spaced apart first cutting wheel 756 positioned at a second elevation.

Second cutter head 752 includes a second key follower 756 positioned at the first elevation and a spaced apart second cutting wheel 742 positioned at the second elevation.

Drive means is coupled to the first and second cuter heads for rotating first cutting wheel 740 in a first direction and for rotating second cutting wheel 742 in a second direction opposite to the first direction as shown by the arrows in FIG. 22. In the preferring embodiment of the invention, the drive means takes the form of a first electric motor 758 (see FIG. 19) and a second electric motor 760 (see FIG. 21). Motors 758 and 760 typically take the form of DC energized permanent magnet motors having an unloaded operating speed of about 4000 RPM. Such motors are commercially available from Colman Motor Products, Inc. of Darlington, Wis. and include a gear speed reduction unit designated by reference number 762 which provides the desired 2200 RPM cutter wheel speed. This motor/gear reduction assembly is designated as Colman Motor Products, Inc. Part No. D44-2401-1.

Figure 21:
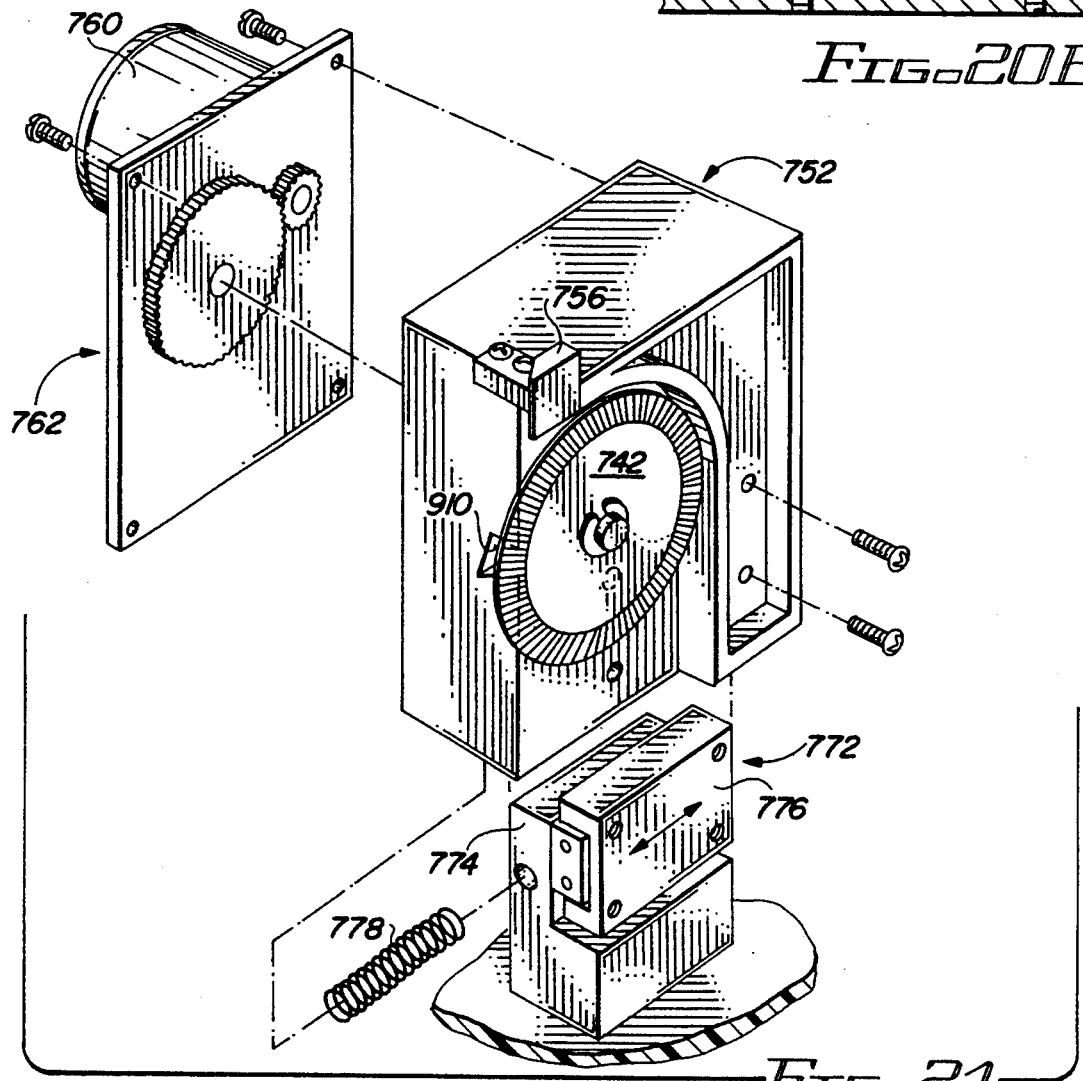
FIG. 21 is an exploded perspective view illustrating the linear bearing system and the cutting head of the present invention.
Figure 22A:
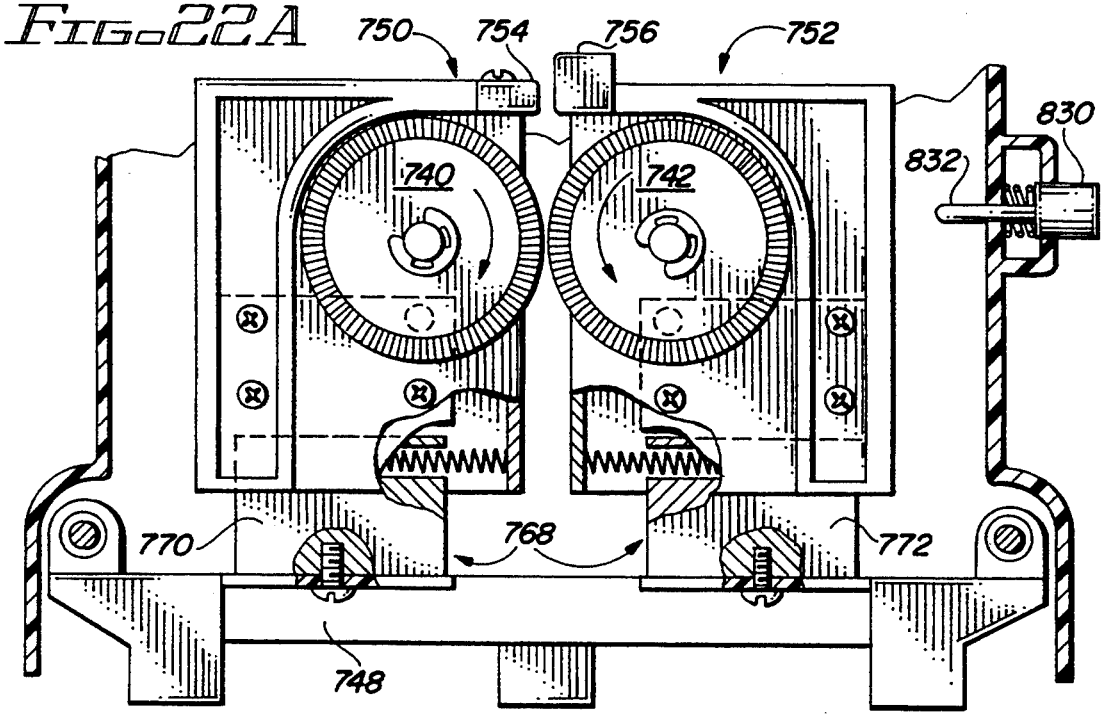
FIGS. 22A and 22B represent partially cutaway elevational views of the key cutting machine of the present invention particularly illustrating the linear bearing means of the present invention and the first and second cutter heads.
Figure 22B:
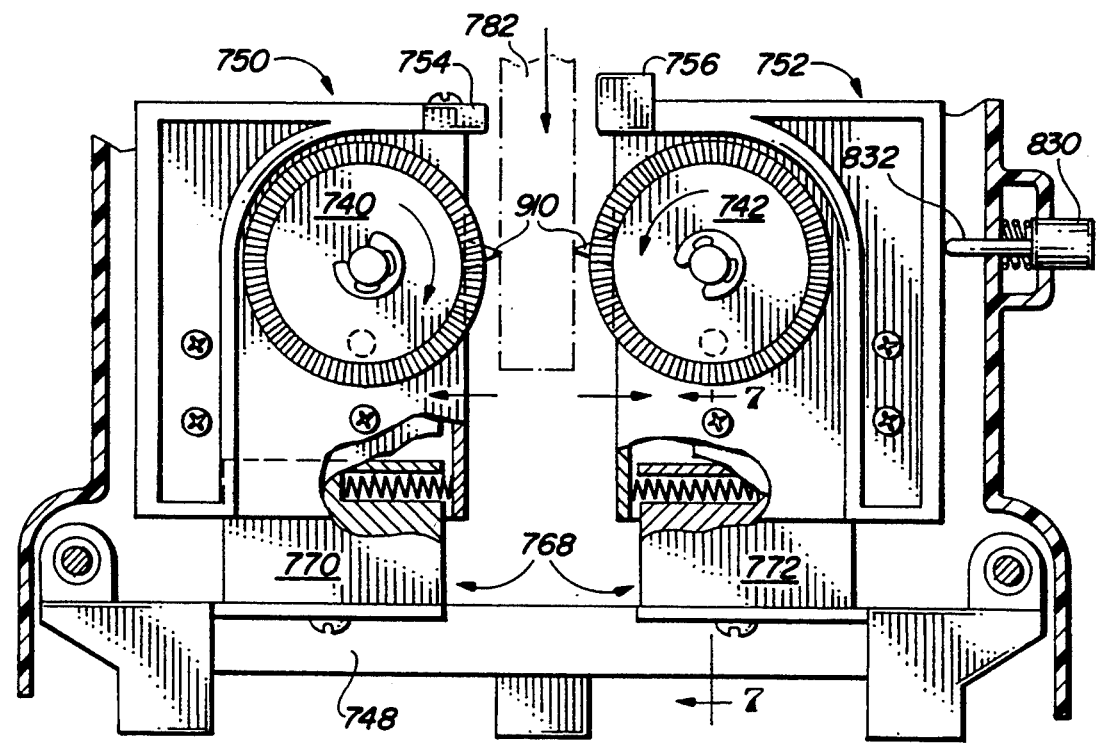

The key cutting machine of the present invention also includes first linear displacement means which is illustrated in FIGS. 19, 21 and 22 and is designated by reference number 768. First linear displacement means in the preferred embodiment of the invention takes the form of a linear bearing means including a first linear bearing 770 and a second linear bearing 772. First linear bearing 770 is coupled between base 748 and the lower surface of first cutter head 750 while second linear bearing 772 is coupled between base 748 and the lower surface of second cutter head 752. As is most fully illustrated in FIG. 21, each linear bearing includes a fixed bearing element 774, a laterally displaceable bearing element 776 and a spring-actuated biasing device 778 which operates on each linear bearing element to bias the first and second cutter heads toward the centerline of the key cutting machine as well as the centerlines of master key 764 and key blank 766.

Figure 38:
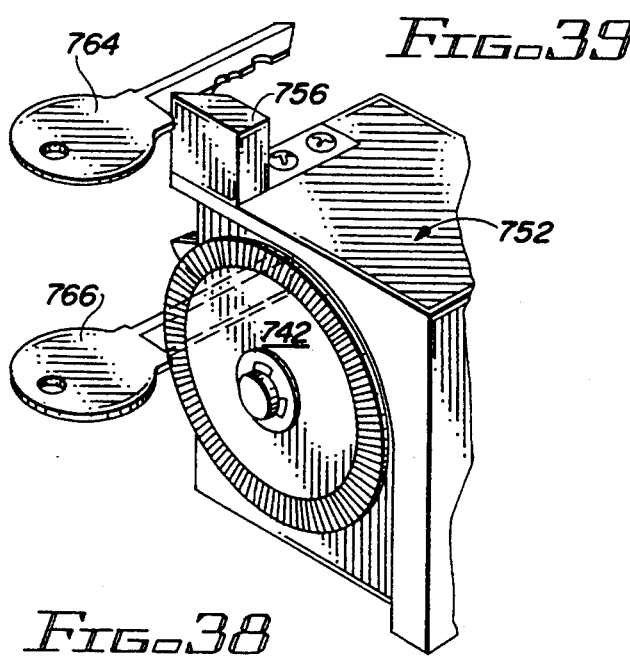
FIG. 38 is a partially cutaway perspective view solely for the purpose of illustrating the relative relationship between the master key, the key blank, the key follower and the cutting wheel elements of the present invention to illustrate the manner in which key duplication is accomplished by the key cutting machine of the present invention.

First linear displacement means 768 is coupled to base 748, first cutter head 750 and second cutter head 752 to simultaneously laterally displace first key follower 754 and first cutter wheel 740 toward and away from the first bitted surfaces of the two sided master key 764 and the two sided key blank 766. FIGS. 19 and 38 illustrate the relative positions of master key 764 and key blank 766 relative to the overall elements of the key cutting machine. The structure and function of the cassette key alignment fixture which receives, aligns and longitudinally displaces master key 764 and key blank 766 will be described below.

As illustrated in the drawings, base 748 of the key cutting machine is horizontally oriented as are the bearing surfaces of first linear bearing 770 and second linear bearing 772. This specific configuration of the linear bearings of the present invention enables first and second cutter heads 750 and 752 to be laterally displaced in a horizontal plane such that gravitational forces do not alter the effect of or force exerted on the keys by the spring biasing devices 778. In other words, the lateral biasing forces exerted on cutting heads 750 and 752 toward the machine centerline are controlled exclusively by biasing springs 778. The lateral biasing forces (on the order of about fourteen ounces to as low as about eight ounces) exerted on cutter heads 750 and 752 are therefore both relatively constant and completely independent of gravitational forces.

Due to the comparatively weak forces exerted by the spring biasing devices 778 on cutter head 750 and 752, tilting the base 748 of the key cutting machine positioned as shown in FIG. 22 clockwise to the right to an angle on the order of thirty to forty-five degrees would cause gravitational forces to readily overcome the counteracting spring biasing forces on cutter head 752 and would cause that cutter head to drop off to the right and out of contact with keys 764 and 766. The opposite effect would occur with respect to cutter head 752 where gravitational forces would add to and substantially increase the lateral biasing forces exerted on keys 764 and 766 by the spring biasing device 778.

It is thus important to the proper operation of the present invention that the base 748 be oriented into a substantially horizontal position such that the controlled inward biasing forces exerted by biasing springs 778 operate substantially independently of gravitational forces.

In order to ensure faithful reproduction of the bitted surfaces of master key 764 onto key blank 766, it is important that first linear displacement means 768 provide for exclusively linear lateral axis displacements of cutter head 750 and 752 relative to master key 764 and key blank 766. It is therefore important to avoid utilizing a lateral displacement device which provides for curved or non-linear lateral displacements of the cutter heads relative to the keys.

The first linear displacement means 768 described above enables first cutter head 750 to laterally follow and duplicate the first bitted surface of master key 764 onto the first bitted surface of key blank 766 and enables cutter head 752 to laterally and follow and duplicate the second bitted surface of master key 764 onto the second bitted surface of key blank 766.

A unique interchangeable cassette system for accomplishing the key position and alignment functions of the present invention will now be described in detail.

The key cutting machine of the present invention includes a cassette-receiving aperture 780 illustrated in FIG. 16 for receiving a cassette key alignment fixture 782. FIG. 17 illustrates the cassette key alignment fixture 782 after it has been installed in the key cutting machine. The function and operation of the cassette key alignment fixture 782 of the present invention will first be described in connection with a cassette for aligning a single-sided key as shown in FIG. 31 and will subsequently be described in connection with a cassette of a different design for aligning a two-sided key as shown in FIG. 32.

As illustrated in FIG. 16, the general structure of cassette 782 is the same for both the single-sided and double-sided key applications. As illustrated in FIGS. 24, 25 and 26, each cassette 782 includes a first key alignment device 794 for receiving and aligning master key 764 at a first elevation and a second key alignment device 786 for receiving and aligning a key blank 766 at a second elevation. The structure and operation of each of the master key and key blank key alignment devices is essentially identical. The structure and function of the key alignment device will therefore be explained only in connection with the second key alignment device 786.

Figures 30B, 36:
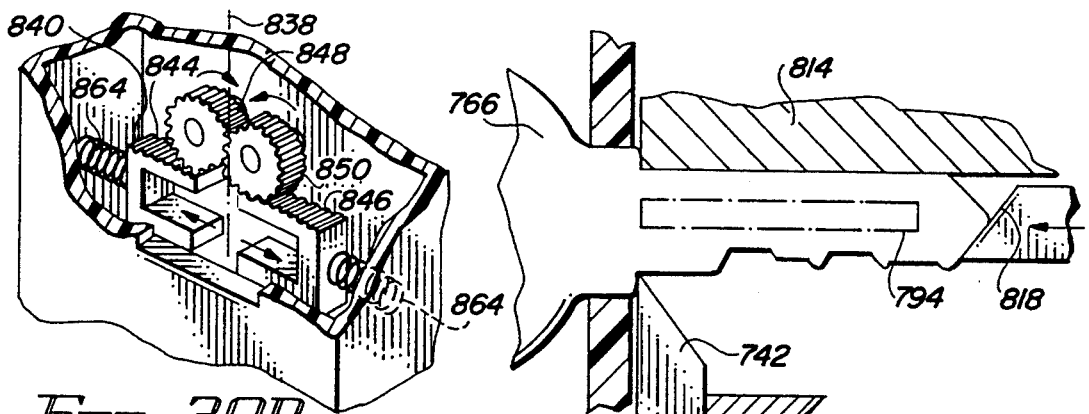
FIG. 36 represents a partially cut away elevational view of the single-sided key alignment device.

Key alignment device 786 includes an upper clamping surface 788 and a lower clamping surface 790. An actuator arm 792 can be displaced into a first or locked position as illustrated in FIGS. 24 and 26A where upper clamping surface 788 and lower clamping surface 790 move to a closed position to engage the upper and lower surfaces of master key 764 or key blank 766 to maintain the master key or key blank in a fixed lateral position with a horizontal orientation. In FIG. 36, the rectangular dotted line area designated by reference number 774 illustrates the area on which the clamping surfaces operate to maintain proper alignment of the master key and key blank.

An actuator arm 792 may be moved into a second or open position as illustrated in FIG. 26B. The camming action between upper clamping surface 788 and lower clamping surface 790 caused by the inclined male grooves in lower clamping surface 790 and the mated female grooves 798 in upper clamping surface 788 as best illustrated in FIG. 25 convert the longitudinal displacements of the upper and lower clamping surfaces caused by actuator arm 792 into vertically oriented opening and closing movements of the clamping surfaces thereby causing the clamping surfaces to move between an open position for receiving a master key or key blank and a closed position for clamping the key into a fixed lateral position with a horizontal orientation.

As illustrated in FIGS. 16 and 19, the vertically oriented, front surface of each cassette includes a rectangular aperture 810 for receiving a master key and a similar aperture 812 for receiving the key blank. This particular vertical relationship with the master key located above the key blank is completely optional in that the key cutting machine of the present invention could be readily adapted to follow a master key positioned below a key blank.

Figure 48:
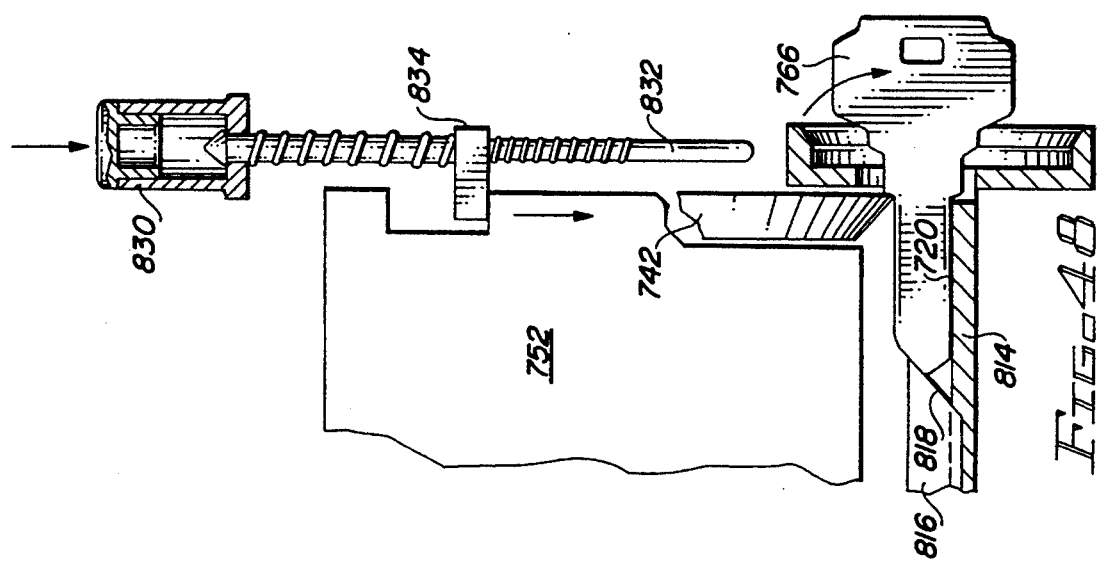

The single sided cassette also includes a root alignment surface which will now be described in connection with FIGS. 24, 27, 29, 40, 41, 48, 49A and 49B. Root alignment surface 814 is laterally offset to the left side of clamping surfaces 788 and 790 and receives the linear root surface 720 of either a master key or key blank. Root alignment surface 814 includes an essentially linear surface which is oriented parallel to the longitudinal axis of the key cutting machine. Root alignment surface 814 includes an upper surface which extends above lower clamping surface 790. As shown in the drawings, root alignment surface 814 extends along substantially the entire length of the key root after key blank 766 has been fully seated into cassette 782 as illustrated in FIGS. 41 and 48.

The key alignment device 784 also includes tip alignment means which in the preferred embodiment of the invention takes the form of a tip alignment plunger 816. Since single-sided keys always possess a linear root surface 720 and a bevelled tip, the engagement end of tip alignment plunger 816 for single-sided keys will always have bevelled end surface 818 as illustrated in FIGS. 29, 40, 41, 48 and 49. The indented or forked end surface 820 for tip alignment plunger 816 as illustrated in FIGS. 27 and 28 is used to provide compatibility with double-sided keys which lack a linear root surface.

As illustrated in FIG. 27, the cylindrical mid section of plunger 816 includes a biasing spring 822. The first end 824 of spring 822 engages and operates against a fixed surface within the rear of cassette 892 as illustrated in FIG. 24. The second end 826 of spring 822 abuts and operates against a larger diameter section of plunger 816 as illustrated in FIG. 27.

As illustrated in FIGS. 24 and 49B, biasing spring 822 maintains tip alignment plunger 816 fully extended along the longitudinal axis of the cassette to a location near key entry aperture 812.

FIG. 49B shows the operation of tip alignment plunger 816 as a key initially enters cassette 792. FIG. 49A shows that key blank 766 has been fully inserted into cassette 782 until shoulder 718 engages and stops against the outer periphery of cutting wheel 742.

Because an untrained operator of a key cutting machine might insert a key into cassette 782 with a significant lateral misalignment as illustrated in FIGS. 40 and 49A, the key cutting machine of the present invention includes lateral alignment means to eliminate such lateral misalignment.

One embodiment of the invention as illustrated in FIGS. 40, 41, 42, 43, 48 and 49, operates on the bitted surface of a single-sided key to laterally align the key. One extremely unique aspect of the lateral alignment system of the present invention is that it is designated to operate on a single-sided key at a time after the key has been firmly clamped within cassette 782 by operation of actuator arm 792 into the closed or clamped position. As illustrated in FIG. 24, actuator arm 792 is maintained in the closed or clamping position by a biasing spring 828. The tension force provided by this spring is designed to impose a vertical clamping force on the upper and lower surfaces of the single-sided key of on the order of about five pounds. The area of engagement of the upper and lower clamping surfaces 788 and 790 on the single-sided key is illustrated in FIG. 36. The laterally misaligned keys illustrated in FIGS. 40 and 49A are therefore maintained or "locked" into a laterally misaligned position by approximately twenty pounds of vertically oriented clamping forces.

Figure 47:
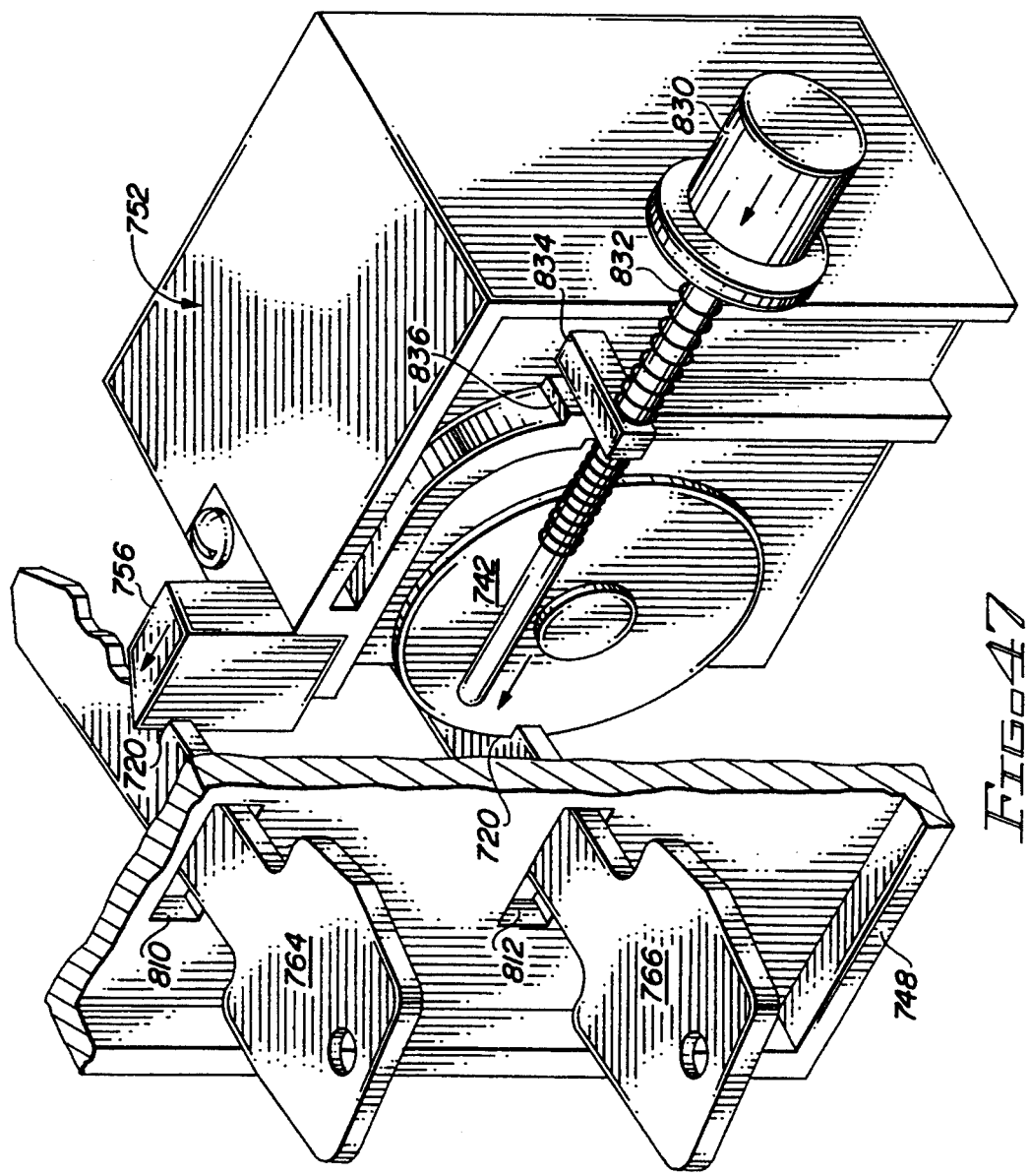
FIG. 47 represents an enlarged, partially cutaway perspective view illustrating the function of the key alignment device for laterally aligning single-sided keys.

The lateral alignment means of the present invention is illustrated in FIG. 47 and shows that master key 764 is engaged at a first position displaced along the length of the key at a location away from the key tip. As a result of the lever action created between the tip of the key which is maintained in a fixed position by tip alignment plunger 816, the exertion of a lateral force of approximately five pounds by an operator on key set button 830 laterally displaces key set plunger 832 causing arm 834 to engage and displace the adjacent, vertically oriented surface 836 of cutter head 752. The resulting inward lateral displacement of cutter head 752 forces key follower 756 against the bitted surface of master key 764 at a longitudinal location aligned with shoulder 720 of the key. Exertion of a comparatively nominal lateral force by the operator on button 830 readily overcomes the vertical clamping forces of clamping surfaces 788 and 790 and permits the master key 764 to pivot about its tip and to be laterally aligned with root alignment surface 814.

Simultaneously with the lateral alignment of master key 764, the lateral displacement of cutting wheel 742 against the bitted surface of key blank 766 permits the cutter wheel to laterally displace key blank 766 fully against root alignment surface 814. This lateral realignment of key blank 766 is shown occurring between FIGS. 40 and 49A and FIGS. 41 and 48.

By simultaneously aligning the root surfaces of master key 764 and key blank 766, the root surfaces of these two keys are simultaneously aligned with each other, thereby aligning the key blank precisely with respect to the master key.

FIGS. 42 and 43 show yet another partially cutaway view from the front of the operation of the lateral alignment means of the present invention. FIG. 42 shows that key blank 766 is laterally misaligned to the right. FIG. 43 illustrates the manner in which the operation of key set plunger 830 causes the perimeter of cutting wheel 742 to engage the right hand surface of key blank 766 and laterally reposition it to the left so that it abuts against the root alignment surface.

A completely different type of key alignment device must be provided for a double-sided key since all double-sided keys lack a linear root surface which served as the lateral alignment or indexing surface for a single-sided key. For double-sided keys, a more complex and substantially different key alignment device is provided to achieve alignment of the master key relative to the key blank as well as alignment of both keys relative to the key alignment device itself.

Referring now to FIGS. 30A, 30B, 37 and 50, a key alignment device capable of aligning a two sided master key and key blank includes a longitudinal axis and a lateral axis comparable to the related axes described in connection with FIG. 16. The key alignment device laterally aligns a first key or master key relative to a first defined, fixed centerline such as centerline 838 illustrated in FIGS. 30A and 30B. Centerline 838 is essentially defined as representing the midpoint of key aperture 810 when in the closed position as illustrated in FIG. 38.

Figure 37:
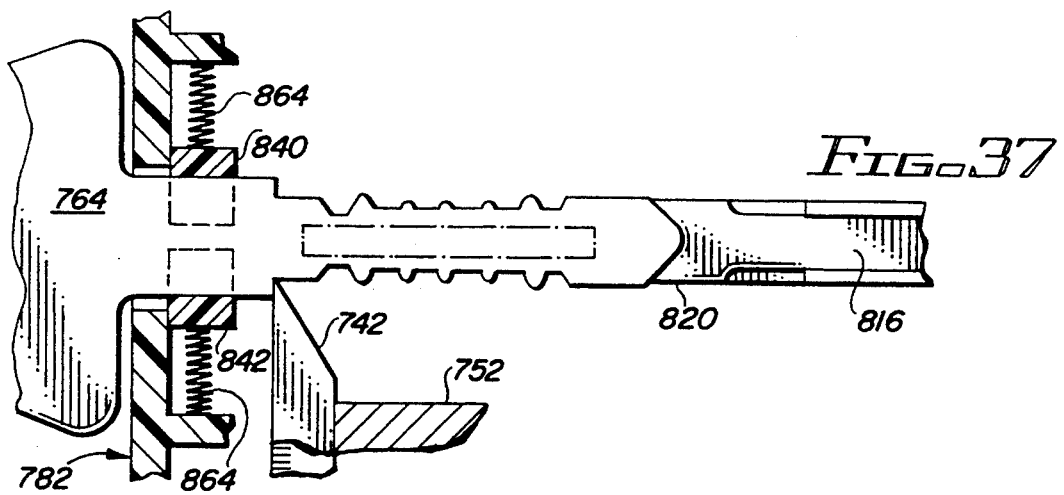
FIG. 37 represents a partially cutaway elevational view showing a two-sided key being laterally aligned within one embodiment of the key alignment device of the present invention.

The key alignment device includes a first laterally displaceable jaw 840 which is located on a first side of the first defined centerline 838 at a variable distance D1 from the first defined centerline. As shown in FIGS. 37 and 50, first jaw 840 engages a first side of key 764.

A second laterally displaceable jaw 842 is located on a second side of the first defined centerline 838 at a variable distance D2 from the first defined centerline and engages the second side of key 764.

Jaw position control means is coupled to first and second jaws 840 and 842 to maintain distance D1=D2 as jaws 840 and 842 are laterally displaced toward or away from first defined centerline 838. In the embodiment of the invention illustrated in FIGS. 30A, 30B, 37, 50 and 51, the jaw position control means takes the form of rack and opinion centering means. This rack and pinion centering means includes a first rack 844 which is formed on a horizontally oriented surface of first jaw 840 as well as a second rack 846 which is formed on a horizontally oriented surface of second jaw 842.

The rack and pinion centering means also includes pinion means which engages the first and second racks. As shown in the drawings discussed above, the pinion means of the invention may include a first pinion gear 48 which engages first rack 844 and a second pinion gear 850 which engages second rack 846. Pinion gears 848 and 850 also engage each other as shown for example in FIG. 50.

In another embodiment of the invention illustrated in FIG. 54, the pinion means of the present invention can take the form of a single pinion gear 852 operating in combination with a specifically configured first rack 844 and second rack 846 forming a part of a first jaw 840 and a second jaw 842. A set of jaw alignment pins 854 may be provided in the FIG. 54 embodiment of the invention to prevent rotational misalignment of jaws 840 and 842 as they are laterally translated back and forth.

Figure 55:
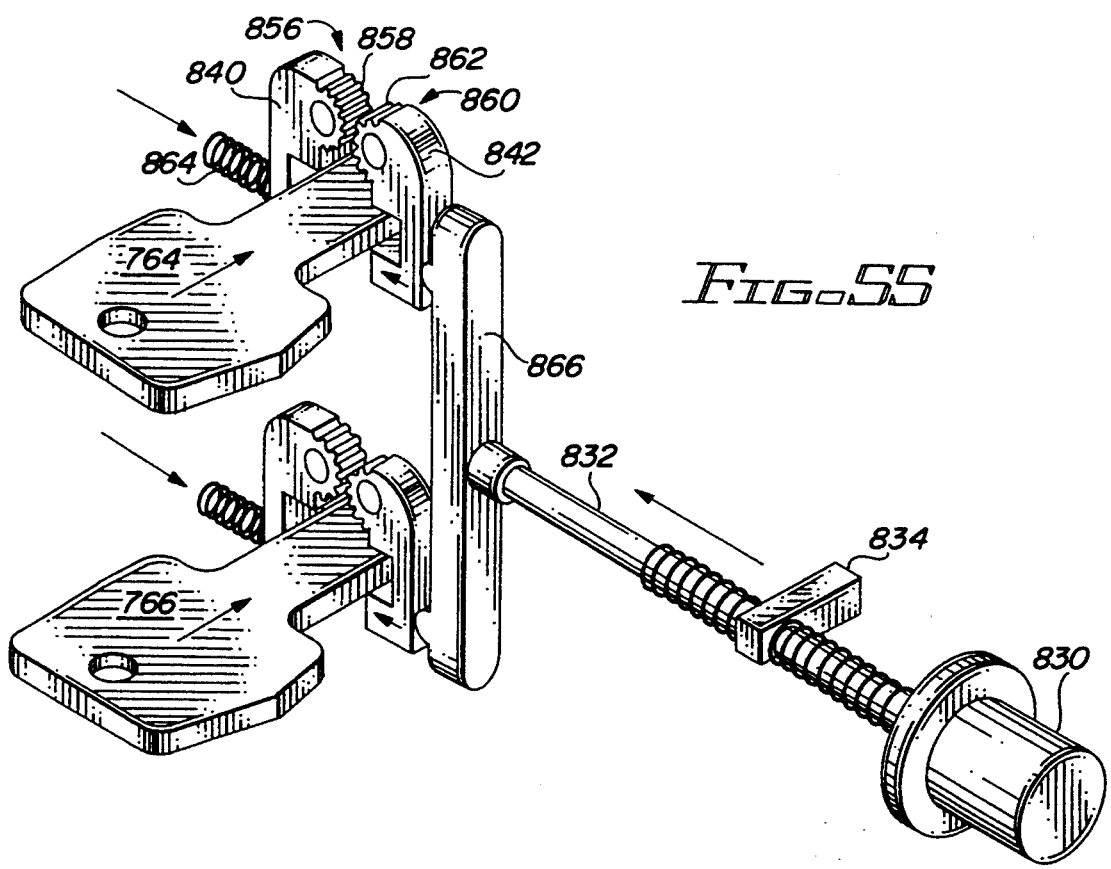
FIG. 55 illustrates another embodiment of the key aligning device of the present invention for aligning a two-sided key.

In yet another embodiment of the invention as illustrated in FIG. 55, the jaw position control means includes first gear means 856 having a first geared surface 858 and a second gear means 860 having a second geared surface 862. As shown in FIG. 55, first and second gear means 856 and 860 are symmetrically positioned with respect to the first defined centerline. In addition, first geared surface 858 of first gear means 856 is positioned to contact and engage the second geared surface 862 of the second gear means 860.

The gear-interconnected relationship between jaws 840 and 842 enables the jaw position control means of the invention to maintain distance D1=D2 as jaws 840 and 842 are laterally displaced toward or away from centerline 838.

The key alignment device further includes jaw biasing means which in the various embodiments of the invention as described above take the form of a biasing spring 864 which serves to bias jaws 840 and 842 toward centerline 838 with a specified lateral biasing force. The jaw biasing means in addition permits jaws 840 and 842 to be laterally displaced away from centerline 838 in response to an opposing lateral force greater than the lateral biasing force, such as, for example, lateral biasing forces exerted during insertion and removal of the keys from the key alignment device.

In the FIG. 54 embodiment of the invention, jaw biasing means may take the form of a spring, torque tube or equivalent device which rotationally biases the drive shaft of pinion 852 to force jaws 840 and 842 toward the centerline 838.

For all of the two-sided key alignment devices described above, the key centering mechanism for master keys 764 is faithfully reproduced or duplicated within a single cassette 792 to accomplish lateral alignment or centering of key blank 766.

Since cassette 782 is fabricated with key receiving apertures 810 and 812 such that the centerlines of the two apertures are mechanically fixed and aligned with each other, the lateral alignment or centering of master key 764 with respect to the centerline of aperture 812 coupled with the centering or lateral alignment of key blank 766 with respect to the centerline of key receiving aperture 812 simultaneously functions to align the centerline of master key 764 precisely with the centerline of key blank 766.

To eliminate even the most remote potential for lateral misalignment of a two-sided master key with respect to a two-sided key blank, FIGS. 50, 51, 52, 54 and 55 shows how lateral alignment means compatible with the lateral alignment means of the single-sided key key alignment device described above can readily be provided to function with the key alignment device for two-sided keys.

As best illustrated in FIG. 51, the remote end of key set plunger 832 is connected to a vertically oriented push bar 866 which engages the outer, vertically oriented surfaces of jaws 842 of both the master key alignment device as well as the key blank alignment device. The length of key set plunger 832, the configuration of push bar 866 and other related structure is designed such that push bar 866 will engage and laterally displace jaws 840 and 842 of both two-sided key key alignment devices before either cutter wheel 742 or key follower 756 engages the bitted surfaces of either key.

The imposition of such lateral biasing forces onto the jaws of the key alignment devices guarantees complete actuation of the jaw position control means toward the centerline to accurately center the master key relative to the key blank. Under normal circumstances, actuation of the key set button 830 will not be necessary for the two-sided key alignment device described immediately above.

As illustrated in FIG. 51, appropriate contouring and placement of surface 836 of cutter head 752 permits push bar 866 to contact jaw 842 before key set plunger arm 834 contacts surface 836. This geometric relationship of the various components of key set plunger 832 enables the key set plunger assembly illustrated in FIG. 51, including push bar 866, to be interchangeably utilized in connection with a cassette 782, whether it includes a key alignment device for a single-sided key as illustrated in FIG. 47 or a key alignment device for a two-sided key as illustrated in FIG. 51.

The slightly modified embodiment of the two-sided key alignment fixture illustrated in FIGS. 52 and 53 is intended for operation with certain types of European keys in which the first and second bitted surfaces extends along the length of the key to a distance very close to the head of the key. For such keys, it is necessary to insert the key further into the key alignment device to permit accurate and complete key duplication. The FIG. 52/FIG. 53 embodiment of the invention solves this problem by providing jaws 840 and 842 which engage and center the key shank at a location outboard of key receiving apertures 810 and 812. In addition, the use of very thin jaws 840 and 842 enables keys to be inserted a greater distance into cassette 782 so that the key followers and cutting wheels are able to approach to a distance closer than normal to the head of the key.

Figure 56:
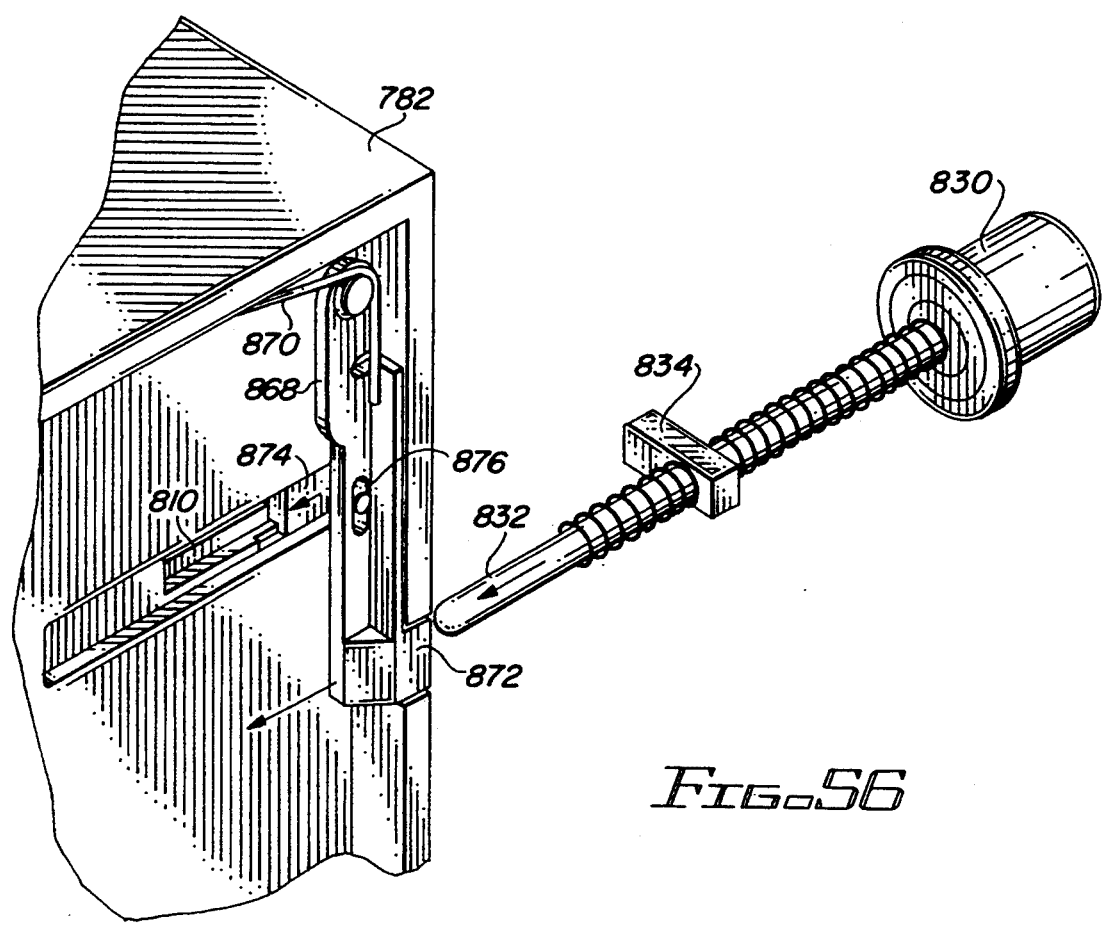

FIGS. 56 and 57 illustrate two views of yet another embodiment of the lateral alignment means of the present invention. This embodiment of the invention includes a pivotable lever arm 868 which is spring biased by spring 870 away from the key as shown in the figures. Lateral movement of key set plunger 832 against the end surface 872 of lever arm 868 laterally displaces a slider 874 within a groove which provides a guide track for slider 874. An oval-shaped aperture is provided in the mid-portion of aperture 876 to accommodate relative vertical movement between lever arm 868 and slider 874.

For certain key cutting applications where lateral alignment of the master key is required but lateral alignment of the key blank is not required, this particular configuration of lateral alignment means renders a satisfactory lateral alignment function.

Referring now to FIGS. 19, 18, 20A and 20B, the second linear displacement means of the present invention will now be described in detail. A permanent magnet DC motor 878 includes a gear reduction unit of the type described above in connection with motors 858 and 860. The reduced rotational output velocity of the motor drive shaft is coupled to rotate a constant velocity cam 880. The profile of constant velocity cam 880 is accurately illustrated in FIG. 20 and is well known to one of ordinary skill in the cam field.

A cam follower 882 includes a first end which is coupled to engage and be displaced by cam 880. The second end of cam follower 882 is coupled by a shaft 884 and related structure to longitudinally reciprocate an entire subframe assembly of the key cutting machine to thereby longitudinally displace the cassette including master key 764 and key blank 766 with respect to longitudinally fixed cutter heads 750 and 752.

In FIG. 16, the rear housing 886 of the key cutting machine is directly and rigidly coupled to base 748. The front-housing 888 of the key cutting machine is separated from rear housing 886 at the point designated by reference number 890.

In FIG. 19, the arrow designated by reference number 92 illustrates the relative movement to the right of front housing 888 as well as cassette 792 and cassette actuator arms 792 relative to the fixed and immovable rear housing 886 of the key cutting machine. As clearly illustrated in FIG. 19, the cutter head assembly 750 and drive motor 758 as well as linear bearing 770 remain fixed as cassette 792 and keys 764 and 766 are displaced first to the right (outward) and then to the left (inward) during the key cutting operation.

Figure 20A:
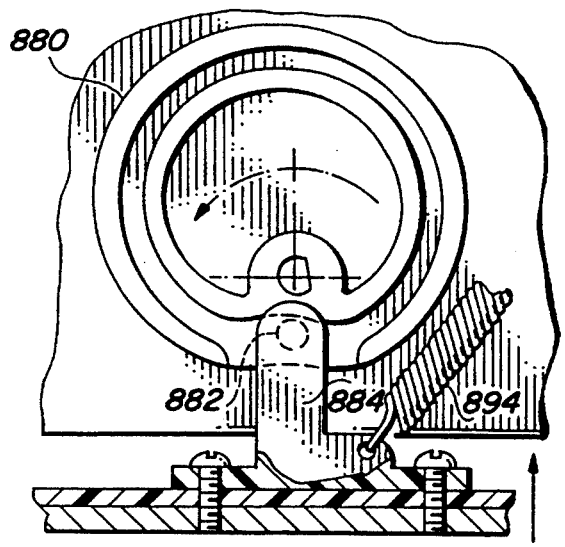
FIG. 20A represents a partially cutaway elevational view of the cam drive system of the present invention at the beginning of its cycle.
Figure 20B:
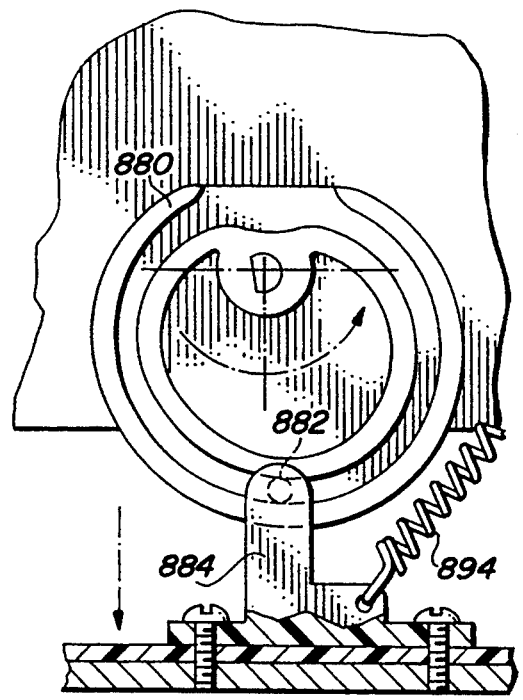
FIG. 20B represents a second view of the cam drive system of the present invention showing the cam creating the maximum outward displacement of the front section of the key cutting machine.

A biasing spring 894 as provided as illustrated in FIGS. 20A and 20B to provide a reverse biasing force on the movable front housing 888/cassette assembly and to facilitate the return to the closed or resting position upon completion of the cycle.

Figure 39:
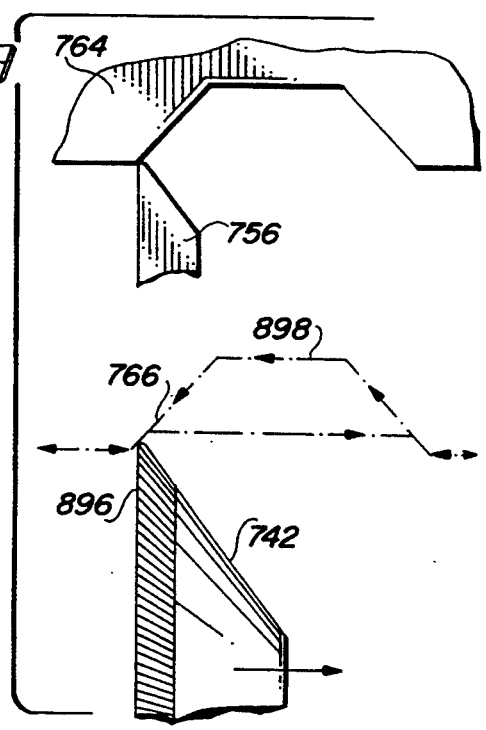
FIG. 39 illustrates the manner in which the cuts of a master key are duplicated on a key blank by repetitive passes of a cutting wheel back and forth along the key blank.

Referring now to FIG. 39, the movement of cassette 792 relative to fixed key follower 756 is illustrated.

During a single out and back key cutting cycle, the master key and key blank are drawn outward away from the longitudinally fixed key follower 756 and cutting wheel 742. Because the laterally inward biasing force exerted by the lateral biasing springs on linear bearings 770 and 772 are configured to each equal approximately eight to fourteen ounces of force operating against the surfaces of the key blank, a very gentle cutting action takes place at all times.

As illustrated in FIG. 39, the first pass of the key blank 766 past cutting wheel 742 results in cutting away only approximately thirty percent of the depth of the ultimate cut. Upon completion of the first outward displacement of the moveable front housing 888 past the cutting wheels, continuing motion of cam 880 in combination with biasing spring 894 pulls the cassette including the master key and key blank back across the cutting wheels in the reverse direction for a second cutting pass. During this reverse pass of a single cutting cycle, the ninety degree or unbevelled edge 896 of the cutting wheels as illustrated in FIG. 39 travels along the second or reverse dotted line designated by reference number 898 and results in a harder or more aggressive cutting action. During this second, reverse pass of the cutting wheel over the key blank, the balance or about seventy percent of the key cut is accomplished.

If the rate of longitudinal displacement of the key blank past the cutting wheel is decreased to a comparatively slow velocity, the cuts of the master key can be faithfully reproduced on the key blank in a single outward pass. For faster travel velocities, a single cycle including an outbound and an inbound pass over the cutting wheels will be necessary to faithfully reproduce the master and the key blank. At still faster relative velocities, more than a single out and back cutting cycle may be required to accomplish accurate key duplication.

As the key cutting machine is used over and over to duplicate many keys, the cutting wheels gradually lose sharpness and ultimately become dull enough that they are not capable of faithfully reproducing the cuts of a master key on a key blank during a single out and back cutting pass. For this reason, the main power switch 900 of the key cutting machine is configured as a three position switch. In the center position, the power source is completely disconnected from the key cutting machine as illustrated in the FIG. 18 electrical schematic diagram. In the second position, the key cutting machine is enabled to accomplish a single out and back cutting cycle and then stop. In the third position, the key cutting machine is actuated to produce more than one cycle or to operate the key cutting machine continuously resulting in continuous out and back cutting cycles.

The appropriate selection of the main power switch into the third position can readily compensate for worn cutting wheels which are still able to accomplish accurate key duplication, but which require more than a single out and back cutting cycle. As a direct result of this feature of this invention, key cutting wheels can be used to reliably duplicate a substantially increased number of keys than has been the case with any known prior art device.

As illustrated in FIGS. 18 and 19, a power supply is provided to convert a conventional AC power input into the appropriate DC voltage for energizing the three DC motors which drive the cutter wheels and the cam drive assembly. The FIG. 18 schematic has been simplified to eliminate the AC to DC conversion described above. The design of such power supplies is well known to those of ordinary skill in the electronics field.

As illustrated in FIG. 18, a variety of power safety interlocks are provided to disable the key cutting machine if its case is removed. In addition, a pair of micro switches 902 are illustrated in FIGS. 18 and 19 and include actuation buttons 904 which are depressed by the opposite ends of the tip alignment plungers 816. As is most clearly illustrated in FIG. 18, if a master key 764 and a key blank 766 have not been fully and equally inserted into cassette 794, tip alignment plungers 816 will not extend out the rear of the cassette housing to a distance sufficient to actuate the switch actuation buttons 904 of micro switches 902. In this case, the entire key cutting machine will be disabled until the operator properly positions both the master key and key blank in cassette 782.

As illustrated in FIG. 34, some double-sided keys lack a shoulder to provide for proper longitudinal registration of the key with respect to either the cutting wheel or key follower of the key cutting machine. For such shoulderless, two-sided keys, the master key and key blank are longitudinally registered within a cassette by designing the tip alignment plunger 816 to function as a longitudinal stop equally for both the master key and key blank.

When shoulderless two-sided keys of a shorter than normal length are encountered, a shimming device of the type illustrated in FIG. 46 and designated by reference number 906 can be inserted into the rear vertical surface of cassette 782 to stop the longitudinal insertion of the tip alignment plunger 816 at a shorter distance.

Various dimensions of the tip alignment plunger 816 are critical to the proper operation of the key cutting machine of the present invention. For example, the upper or master key plunger is designated to be wider than the lower or key blank plunger. With this plunger configuration, operation of the key cutting machine without keys in either cassette key receptacle will cause the upper key followers to displace the cutter wheels safely away from the sides of the lower plunger. Were the plunger width design otherwise, the sides of the lower plunger would be cut away under such circumstances.

Figure 44:
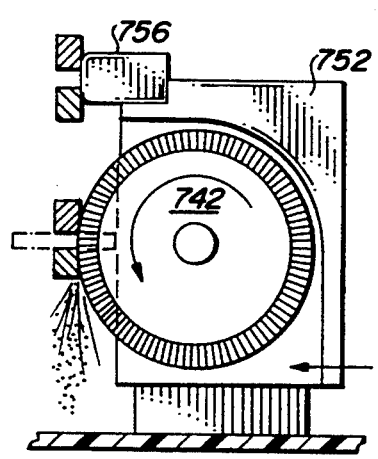
FIG. 44 is a simplified elevational view showing one potential form of damage which can occur to the key cutting mechanism under certain circumstances.
Figure 45:
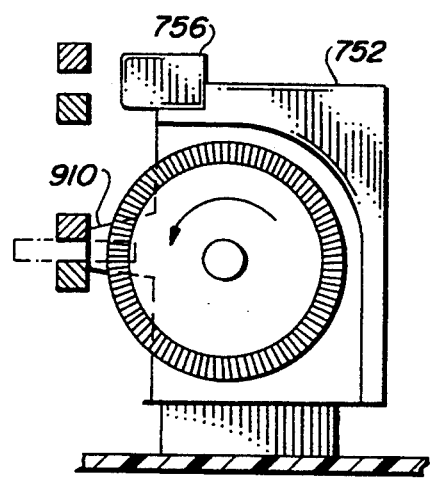
FIG. 45 is related to FIG. 44 and shows a protective mechanism for preventing the damage illustrated in FIG. 44.

Additional safety features of the invention may be described in connection with FIGS. 21, 44 and 45. A safety follower 910 is provided as shown at a location slightly above the point at which cutter wheel 742 would normally contact a key blank were it present. When both the key blank and the master key are missing from the cassette and the key cutting machine is operated, the safety follower will immediately engage the upper edge of the tip alignment plunger 816 and will laterally deflect cutting wheel 742 away from the plunger. The operation of safety follower 910 thus prevents the cutter wheels from cutting away the sides of the plunger and the upper and lower clamping surfaces 788 and 790. A similar protective function occurs when a narrow master key is installed in the upper cassette fixture without having a blank key in the key blank fixture.

In order to better illustrate the advantages of another embodiment of the invention and its contributions to the art, preferred hardware embodiments of that invention will now be described in some detail.

Figure 58:
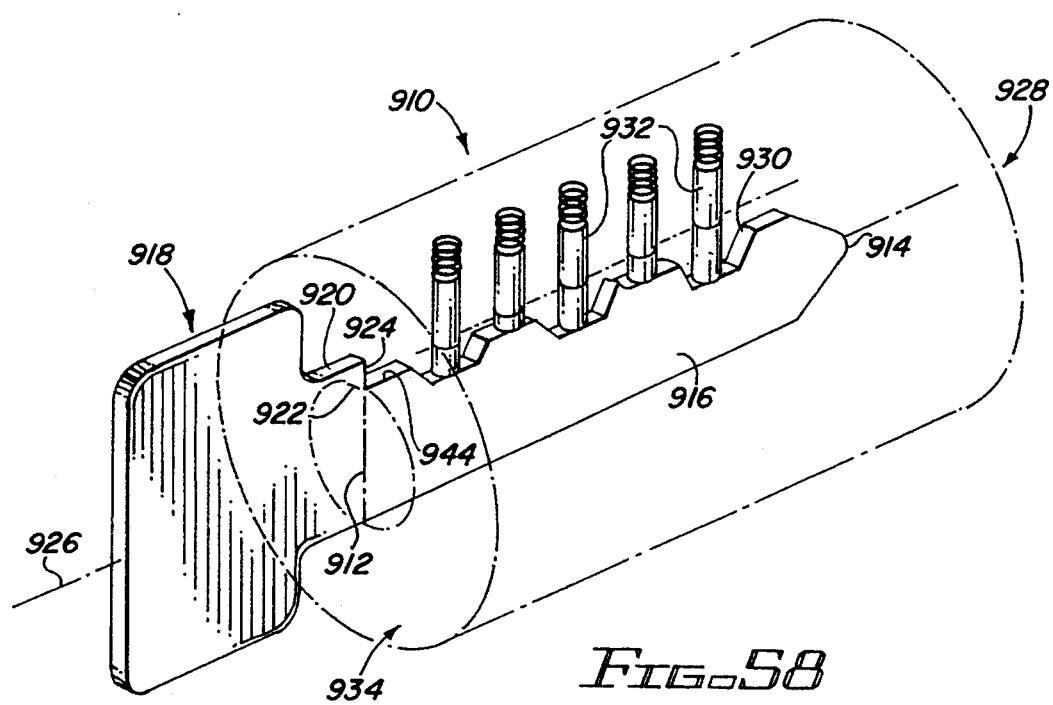
FIG. 58 represents a partially cutaway perspective view illustrating the manner in which a typical single-sided key interfaces with a typical pin tumbler lock.

Referring to FIG. 58, a typical pin tumbler lock 910 includes a rectangular lock entrance slot 912 through which the key tip 914 and blade 916 are inserted. Typical single sided keys 918 include an increased width or height section generally referred to as a key shank 920. The vertical surface formed between the edge of key shank 922 and the adjacent full height, uncut section 944 of key blade 916 defines a vertically extending key shoulder 924.

One or more longitudinal key alignment grooves are typically formed in one or both side surfaces of key 918 to longitudinally align key 918 with respect to the longitudinal axis 926 of lock 910.

Because typical pin tumbler locks of the type illustrated in FIG. 58 include a gap or a space between the end surface of the lock cylinder designated by reference number 928 and the tip 914 of key 918, the necessary longitudinal alignment between the key bit notch pattern 930 and the longitudinally spaced apart series of pin tumblers 932 must be established by another form of structural interface between lock 910 and key 918. In most pin tumbler locks, this required longitudinal alignment is established by longitudinally indexing the key shoulder 924 against the flat lock face 934 which is typically oriented perpendicular to lock longitudinal axis 926. If the longitudinal location of key shoulder 924 is improperly placed during the original key manufacture or during subsequent key duplication, or if the longitudinal position of shoulder 924 is relocated as a result of long term use with resulting shoulder erosion, the key bit notch pattern 930 will not align with the lock pin tumblers 932 and the key will not operate the lock.

Figure 60:
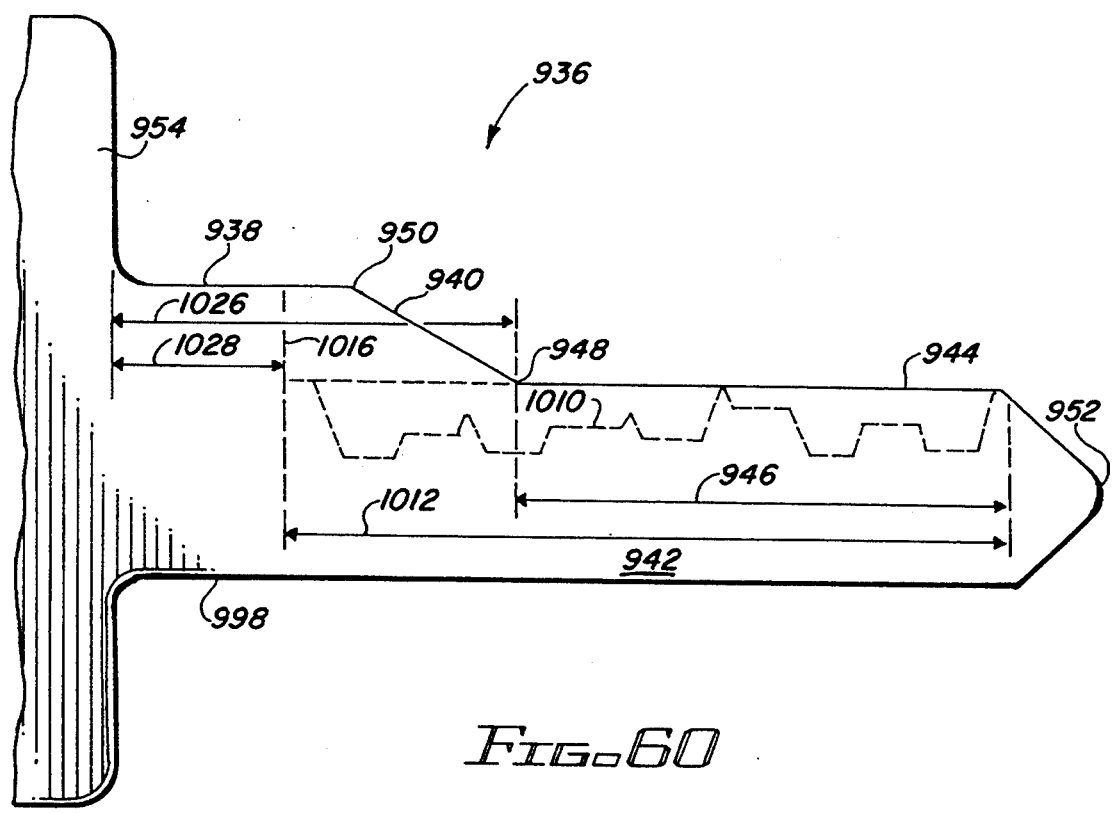
FIG. 60 is an elevational view of a single-sided key including a sloped shoulder.
Figure 59:
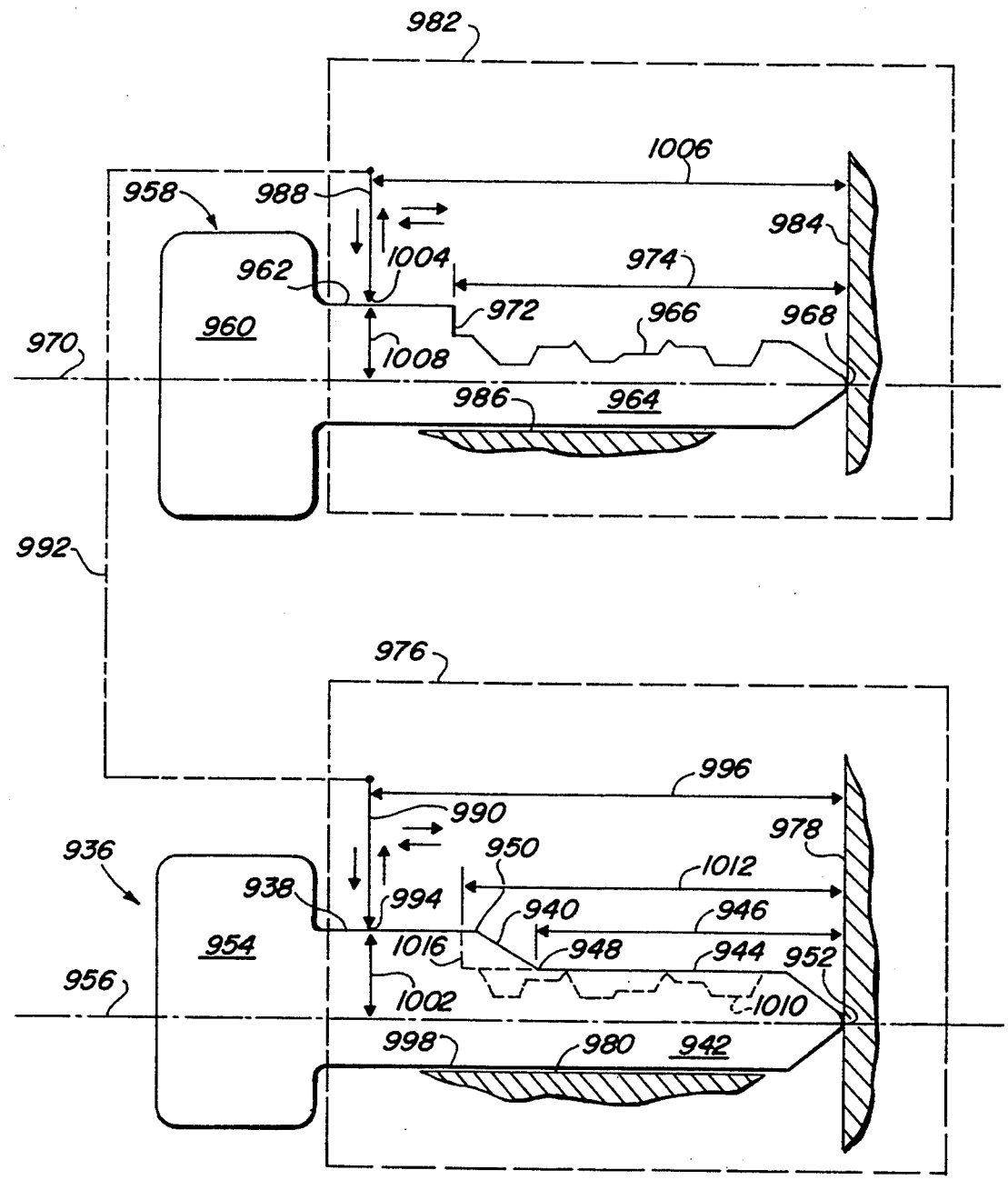
FIG. 59 generally illustrates the structure and function of the method and apparatus for duplicating keys using tip-referenced alignment between the key blank and the master key. The master key is shown at the top of FIG. 59 while the key blank is shown at the bottom of FIG. 59.
Figure 67:
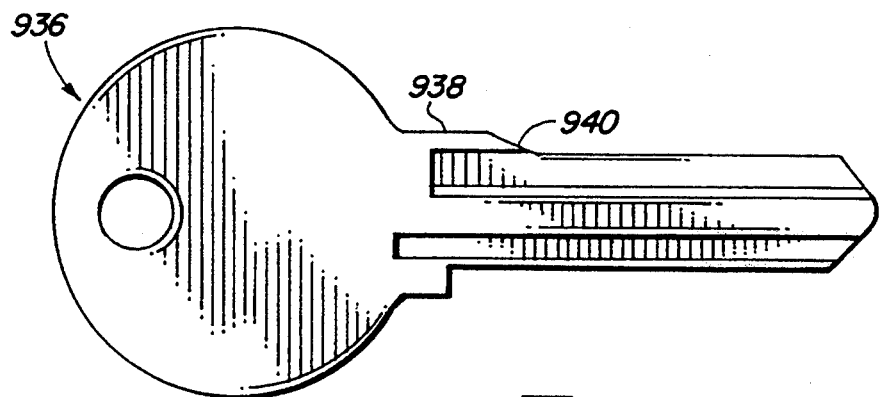
FIG. 67 illustrates a single sided key blank having paired upper and lower sloped shoulders.

Referring now to FIGS. 58, 59 and 60, a unique method and apparatus for simultaneously duplicating both the bit notch pattern and the longitudinal shoulder position and configuration of a master key onto a key blank will now be described in detail.

In FIG. 59, a generic embodiment of the method and apparatus will be described initially to illustrate that the inventive method and structure is not limited to any particular operating sequence or to any particular structural embodiment. For simplicity of description, duplication of a single sided key having only a single bit notch pattern on the key blade surface will initially be described. Subsequently, the invention will be described in connection with the simultaneous duplication of the two bit notch patterns of a typical double sided key.

In FIG. 59, a key blank 936 includes a shank 938, a sloped shoulder 940 and a blade 942 with an uncontoured surface 944. Blade 942 includes an original blade length designated by the measurement line indicated by reference number 946. As shown in FIG. 59, the original blade length 946 terminates at the longitudinal position where a first edge 948 of sloped shoulder 940 joins key blade 942. Similarly, the key blank shank 938 terminates where a second edge 950 of sloped shoulder 940 intersects key shank 938. As will be explained below, shoulder 940, illustrated as a having a sloped surface defined by first edge 948 and second edge 950, will during the key duplication process, be longitudinally cut and displaced away from key tip 952 toward the head 954 of key 936 and angularly reoriented to be perpendicular to a first longitudinal axis 956.

A master key 958 (the key to be duplicated) includes a head 960, a key shank 962, a key blade 964 with a contoured surface forming a bit notch pattern 966 and a key tip 968. The overall structure of master key 958 is aligned with respect to a second longitudinal axis 970 as illustrated in FIG. 59.

The end of key shank 962 and the beginning of key blade 964 is defined by a key shoulder 972 which is typically oriented perpendicular to longitudinal axis 970. As explained in connection with FIG. 58, shoulder 972 longitudinally indexes master key 958 and its bit notch pattern 966 with respect to the tumblers 932 of pin tumbler lock 910. In FIG. 59, the master key blade length represents the distance between key tip 968 and key shoulder 972 and is designated by reference number 974.

Before the key duplicating process can be commenced, key blank 936 and master key 958 must be laterally and longitudinally aligned with respect to each other. The term "lateral alignment" refers to the up and down direction in the two-dimensional FIG. 59 diagram while the term "longitudinal alignment" represents left and right displacements relative to longitudinal axes 956 and 970 as shown in FIG. 59.

Key blank alignment means or fixture 976 and master key alignment means or fixture 982 as used in the preferred embodiment of the invention, referenced in FIGS. 59 and described below take the form of the key retaining cassettes illustrated in FIGS. 16-51 above and designated generally by reference number 782.

Key blank alignment means or fixture 976 includes a longitudinal alignment means or fixture 978 and a lateral alignment means or fixture 980. Corresponding structure in the form of master key alignment means or fixture 982 is provided to longitudinally and laterally align master key 958 relative to key blank 936. Master key alignment means or fixture 982 includes longitudinal alignment means 984 and lateral alignment means or fixture 986.

A key follower 988 is displaceable in both the lateral and longitudinal directions and traces the contour of the master key shank 962 and its bit notch pattern 966. A key cutter 990 is similarly laterally and longitudinally displaceable and is either mechanically or electronically interconnected with key follower 988 as indicated by dotted interconnect line 992 to enable key cutter 990 to reproduce the traced contour of the master key shank, shoulder and bit notch pattern onto key blank 936. The several bi-directional sets of arrows juxtaposed near key follower 988 and key cutter 990 illustrate the direction of the lateral and longitudinal displacements accomplished by key follower 988 and key cutter 990.

Key blank 936 is longitudinally aligned relative to key cutter 990 at a longitudinal index position 994 which is spaced apart from key tip 952 by a first distance designated by measurement line 996. This longitudinal alignment process may be generally referred to as tip indexing or tip gauging in that the longitudinal location of key cutter 990 relative to key blank 936 is set by referencing the key cutter relative to the tip 952 of the key blank.

Key blank 936 is then laterally aligned by engaging a key reference surface such as key root 998 relative to lateral alignment means 980 as shown in FIG. 59. Lateral alignment could also be accomplished by engaging a longitudinal key alignment groove. Key cutter 990 is laterally displaced to engage the shank 938 of key blank 936 at the longitudinal index position 994 to thereby define a lateral reference distance designated by reference line 1002 which extends between the upper surface of key shank 938 and first axis 956.

Master key 958 is laterally and longitudinally aligned relative to longitudinal alignment fixture 984 and lateral alignment fixture 986. The interconnection 992 between key cutter 990 and key follower 998 ensures that master key longitudinal index position 1004 is spaced apart from master key tip 968 by a first distance as indicated by reference line 1006 as was the case with the longitudinal index position 998 of key blank 936 and that the master key lateral reference distance 1008 coincides with the key blank lateral reference distance 1002.

At this point in the key duplication process, key blank 936 and master key 958 as well as key cutter 990 and key follower 998 have been correctly laterally and longitudinally aligned and the key tracing and cutting can begin.

The actual structure of master key longitudinal alignment fixture 984 and key blank longitudinal alignment fixture 978 in the preferred embodiment of the invention takes the form of key retaining cassette 782 specifically illustrated in FIGS. 24–30. A stop is provided along the length of plungers 816 to provide equal tip indexing of the key blank 936 and master key 958 at the desired longitudinal index positions 994 and 962.

In many key duplication applications, key follower 988 and key cutter 990 will be mechanically interconnected by linkage 992. The key follower 988 will include a relatively pointed, well-defined edge surface for contacting and tracing the relevant surfaces of the master key to accurately reproduce the lateral bit notch pattern excursions as a function of key follower longitudinal position. Similarly, the key cutter 990 will typically take the form of a rotating, circular cutting blade having a fairly fine cutting point for faithfully reproducing the lateral excursions of key follower 988 as a function of position along the longitudinal axis.

Alternatively, the key following operation could be accomplished by optical means such as an optical key follower including a laser. The key cutting operation could be implemented in many different embodiments to reproduce the traced contour of the master key shank, shoulder and bit notch pattern. For example, a laser key cutting system could be either mechanically or electronically deflected to reproduce the traced contour of the master key bit notch pattern. Numerous other alternative embodiments of the key follower and key cutter would be readily apparent to one of ordinary skill in the art.

To commence the actual key duplication process, key follower 998 and key cutter 990 are simultaneously displaced along the longitudinal axis in a first direction enabling key follower 988 to trace the contour of the shank, shoulder and bit notch pattern of master key 958. Key cutter 990 is simultaneously displaced relative to key blank 938 in an identical manner to that of key follower 988 to reproduce the traced contour of the master shank shoulder and bit notch pattern on the key blank.

Typically the key tracing and key cutting operations are accomplished using a double pass beginning with a left to right displacement followed by a right to left displacement. When using a circular cutting wheel 742 as shown in FIG. 39, with cutting facets located both on the vertically oriented face as well as on the opposing, inclined face, and with the vertically oriented cutting face oriented relative to the key blank as shown in FIG. 37, only between about five percent to about twenty percent of the depth of the uncontoured surface 944 of key blank blade 942 is cut away during the initial left to right pass. Eighty to ninety-five percent of the actual cutting and bit notch pattern reproduction occurs during the second right to left pass where the vertical cutting face of the cutting wheel is displaced with a significant longitudinally oriented force toward the head 954 of key blank 936.

In FIG. 59, the dotted contour line 1010 illustrates the configuration of the bit notch pattern and shoulder of key blank 936 at the completion of the key duplicating process. The manner in which the key blank shoulder 940 is longitudinally displaced to the left and the manner in which the original key blank blade length 946 is increased to the longer cut blade length designated by reference number 1012 will now be described by referring to FIGS. 60, 61, 62, 63 and 64. In these figures, the structure of the key cutting machine and key retaining cassette is quite closely related to the structure illustrated in patent drawing FIGS. 16–51, except for significant structural differences in the way that longitudinal alignment as tip indexing of the master key and key blank are accomplished.

In the preferred embodiment of the invention, a special key blank includes a sloped shoulder, an excessive shank length and a key blank blade length less than the blade length of the master key to be duplicated. As is evident from FIG. 59, the shank 938 of sloped shoulder key blank 936 is longer than the shank 962 of master key 958; the shoulder 940 of key blank 936 is displaced to the right of the shoulder 972 of master key 958; and the length of the blade 942 of key blank 936 is less than the length of blade 964 of master key 958.

FIGS. 61A, 62A and 63A represent views from above sequentially illustrating insertion of key blank 936 into the key blank alignments fixture 976 including key cutters 990. FIGS. 61B, 62B and 63B represent cutaway views from the front of the key cutting machine key follower 988 and key cutter 990 elements, showing the effect of key blank insertion on the lateral position of key cutters 990 and the resulting lateral displacements of key followers 988. In this particular sequence of drawings, both key blank 936 and master key 958 as shown in FIGS. 64A, 64B and 64C are two sided keys and are shown as being duplicated in a key cutting machine having paired key followers 988 and paired key cutters 990 as is generally described in FIGS. 16–51 above.

FIGS. 61A and 61B illustrate the tip 952 of key blank 936 being inserted into key blank alignment fixture 976 but at a longitudinal position just prior to the point where contact is established between key tip 952 and key cutters 990.

As explained above in connection with the FIG. 16 embodiment of the invention, a biasing device in the form of springs laterally bias the first and second cutter heads toward central axis 1014. The first cutter head houses the left key cutter in the form of a rotary cutting wheel 990 and the left key follower 998. The second cutter head houses the right key cutter in the form of a rotary cutting wheel 990 and the right key follower 988. The key follower 988 and the key cutter 990 in each cutter head are mechanically interconnected and are laterally biased relative to lateral centerline 1014. As shown in FIGS. 61A and 61B, neither the left nor the right cutter head has been laterally displaced due to contact between key blank 942 and key cutters 990.

As illustrated in FIGS. 62A and 62B, key blank 936 has been inserted along the longitudinal axis into the key blank alignment fixture such that the uncontoured surface 944 of blade 942 has laterally displaced both the key cutters 990 as well as the interconnected key followers 988.

As illustrated in FIGS. 63A and 63B, further longitudinal penetration of key blank 936 relative to longitudinal alignment means 984 and key cutters 990 causes the key cutters 990 to engage and ramp up the inclined plane or sloped surface of key blank shoulders 940 to provide an inclined plane transition between the first level uncontoured surface 944 of the key blank blade 942 and the laterally displaced second level surface of key shank 938. FIG. 62B illustrates key cutters 990 and key followers 988 laterally displaced to the first level. FIG. 63B illustrates key cutters 990 and key followers 988 laterally displaced to the second level by the sides of key shank 938.

Referring now to FIGS. 64A, 64B and 64C, insertion of master key 958 into the master key alignment fixture 982 is illustrated. The master key alignment step for the particular embodiment of the invention illustrated in FIG. 64 should take place second in time relative to insertion of the key blank 936 into the key blank alignment means 976. If the master key 958 were to be inserted first without first manually laterally displacing the two cutter heads of the key cutting machine, the shoulder 972 of the master key would engage the interior edges of key followers 988 and improperly longitudinally index master key 958 with key shoulders 972 rather than with key tip 968 as is necessary with this tip indexed embodiment of the invention. If improper shoulder indexing were to occur, the master key 958 would be longitudinally offset relative to key blank 936, the duplicated bit notch pattern on the key blank would be offset relative to the desired longitudinal alignment, and proper key duplication would not take place.

As illustrated in FIG. 63A, the lateral distance between opposing shank surfaces 938 of key blank 936 laterally spaces apart the two key cutters 990 by a distance designated by reference letter "X." As similarly illustrated in FIG. 63B, key followers 988 are also spaced apart by this same distance "X" due to their placement in the same cutter heads with the related key cutters 990. As a result, as shown by FIGS. 64B and 64C, master key 958 can readily be displaced between the spaced apart key followers 988 until the master key tip 968 longitudinally indexes with master key longitudinal alignment means 984 as illustrated in FIGS. 59 and 64C. During the longitudinal alignment of master key 958, including the step shown in FIG. 64C, the spaced apart key followers 988 do not contact either the bit notch pattern 966 or the key shoulder 972. The master key 958 can therefore be inserted into the master key alignment fixture until correct tip indexing occurs where key followers 988 contact the opposing shank surfaces 962 of master key 958 at the desired master key longitudinal index position 1004 and establish the desired master key lateral reference distance 1008.

After key blank 936 has been aligned as shown in FIGS. 61–63 during the initial key blank alignment process and after master key 958 has been longitudinally aligned during a subsequent master key alignment process as illustrated in FIG. 64, key blank 936 and master key 958 have assumed the aligned positions illustrated in FIG. 59 and the key duplication process can commence. From this point forward, the key duplication process is closely related to the key duplication process described above in connection with FIGS. 16–51. Referring now to FIGS. 65A, 65B and 65C, a significant difference in the operation of this tip indexed embodiment of the invention in comparison to the FIGS. 16–51 shoulder indexed embodiment of the invention will now be explained.

During the initial left to right displacement of key cutter 990 relative to key blank 936, only a comparatively minor percentage of the edge surface of key blank 936 is cut away by key cutter 990. This differential cutting process was explained above in connection with FIG. 39, specifically with reference to the dotted line segments designated by reference numbers 766 and 898.

During the first left to right pass as illustrated in FIG. 65A, only a very small part of the sloped shoulder 940 is cut away and only a small part of the uncontoured surface of blade 944 is cut away. However, as shown in FIG. 65B, during the second pass from the right to the left, the perpendicularly oriented file surface face of key cutter 990 aggressively engages blade 942 and cuts the fully contoured bit notch pattern 1010 into the blade.

As illustrated in FIG. 65C, at the completion of the second pass of the key follower 988 along master key 958, key follower 988 directly contacts the vertical shoulder 972 of master key 958 and terminates further longitudinal displacement of the key follower 988 relative to master key 958. As a result, further longitudinal displacement of key cutter 990 relative to key blank 936 is terminated, forming a similar perpendicular or vertically oriented new shoulder 1016 on key blank 936. As clearly shown in FIGS. 59, 60 and 65C, this new shoulder 1016 has a different longitudinal location and different angular configuration in comparison to the original sloped shoulder 940 provided on uncut key blank 936.

As a direct result of this unique sequential key following and key cutting operation, the key duplication process of the present invention (1) relocates the key blank shoulder to the left, (2) shortens the length of the key blank shank 938, and (3) increases the length of the key blank blade 942, enabling bit notch patterns of varying lengths to be reproduced onto a single elongated shank key blank 936 to thereby permit a single elongated shank key blank to be used to duplicate a variety of different master keys with different blade and bit notch pattern lengths.

For example, some single-sided house keys are manufactured with either a long master key blade capable of accommodating six bit notches or with a shorter master key blade capable of accommodating only five bit notches. With prior art key reproduction techniques, a locksmith was required to utilize a key blank having a shoulder location and a blade length identical to the master key to be duplicated. For a master key with six notches for activating a lock with six tumblers, a key blank with a long blade was required. For a master key with five notches for activating a lock with five tumblers, a different key blank with a shorter blade was required. With the present invention, a single key blank 936 can be provided with sufficient excess shank length as illustrated in FIG. 60 to accommodate duplication of a master key having either five or six notches for actuating a house lock having either five or six tumblers.

Referring now to FIGS. 66A, 66B and 66C, a dramatic additional benefit of the unique lock duplication process of the present invention will now be described in detail. In FIG. 66A, master key 658 includes an eroded shoulder where a significant amount of metal has been worn away due to long term use in comparison to the original squared-off shoulder configuration 1018. As illustrated and explained in connection with FIG. 65B and as shown in FIG. 66B, rightward displacement of key follower 988 along the eroded shoulder 972 of master key 958 during the first left to right pass of the key cutter 990 over the key blank does not remove a significant amount of the edge surface of the uncut key shank 938 of key blank 936.

As illustrated in FIG. 66C, the small, vertically oriented remainder of the original master key shoulder (designated by reference number 1020) readily terminates further leftward longitudinal displacement of key follower 988 and results in the production on key blank 936 of a full height shoulder 1016 which precisely reproduces the original full height shoulder 1018 of master key 988 as illustrated by dotted line in FIG. 66A.

Due to this unique characteristic of the invention, the key duplicating method and apparatus of the present invention does not reproduce the worn away shoulder of the master key, but instead creates a new, square-edged shoulder at precisely the correct longitudinal location and with the exact full height shoulder contour of a new master key. To accomplish this unique function, the displacement force setting on the second linear displacement means of the key cutting machine, illustrated schematically in FIG. 18 and designated by reference numbers 878 and 880, must be set to an appropriately low level such that key follower 988 does not at the end of the right to left tracing and cutting pass ride up the worn face of the eroded shoulder 972 of master key 958. In addition, the contour of the contour tracing edge of key follower 988 should also be selected to properly engage and terminate key follower longitudinal displacement at the residual master key shoulder as designated by reference number 1020 in FIG. 66C.

Figure 68:
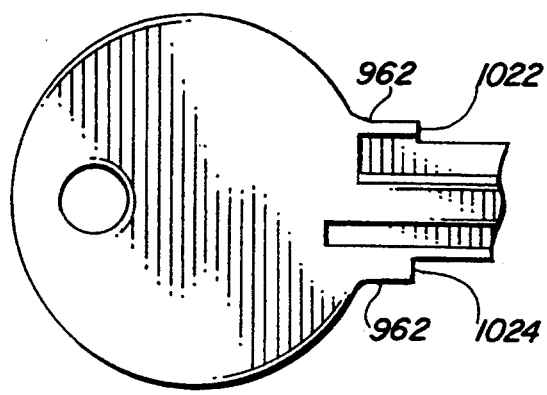
FIG. 68 represents a prior art single sided key blank capable of being replaced by the sloped shoulder key blank illustrated in FIG. 67.

FIGS. 67-70 illustrate two different embodiments of the slope shoulder key blank of the present invention and compare those slope shoulder key blanks with conventional perpendicular shoulder key blanks. FIG. 68 illustrates a prior art single-sided key including both a perpendicular upper shoulder 1022 and a perpendicular lower shoulder 1024. In the corresponding sloped shoulder key blank embodiment of the present invention illustrated in FIG. 67, key blank 936 includes both upper and lower sloped shoulders 940 in combination with extended length key shanks 938.

Figure 69:
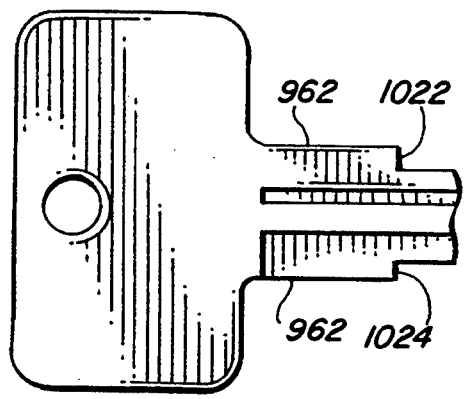
FIG. 69 represents a conventional double sided key blank including paired, perpendicular shoulders.
Figure 70:
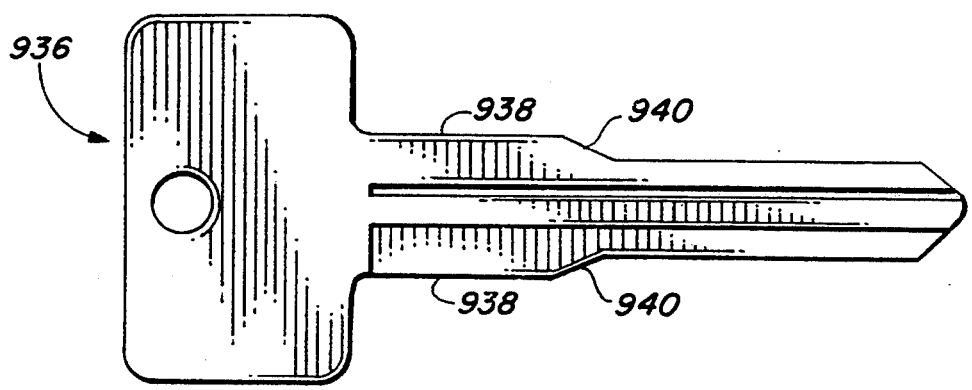
FIG. 70 illustrates a double sided key blank including paired upper and lower sloped shoulders.

FIG. 69 illustrates a conventional two-sided key which typically includes both a perpendicular upper shoulder 1022 as well as a perpendicular lower shoulder 1024. FIG. 70 illustrates the corresponding sloped shoulder key blank of the present invention which includes both upper and lower sloped shoulders 940 as well as extended length key shanks 938.

Referring to FIG. 60, reference number 1026 illustrates the uncut length of shank 938 in comparison to the cut shank length 1028 resulting from duplication of the bit notch pattern and shoulder location of a master key onto the slope shoulder key blank of the present invention. FIG. 60 readily demonstrates the manner in which the original shoulder location designated by reference number 948 in FIG. 60 has been significantly displaced to the left along the longitudinal axis to the new location designated by reference number 1016. Similarly, FIG. 60 readily illustrates the significant increase in blade length designated by length reference line 1012 resulting from the longitudinal repositioning of the key shoulder during the key duplication process.

Although in FIG. 59 the longitudinal index position is illustrated as falling within the lateral confines of the shank 962 of master key 958 and the shank 938 of key blank 936, this initial longitudinal indexing and the relative longitudinal location of the longitudinal index position could take place nearly anywhere along the length of either the shank or blade sections of the keys. The critical requirement is that the first distance 1006 referenced relative to the tip 968 of the master key and the tip 952 of the key blank must be precisely equalized between the key blank 936 and the master key 958 so that the longitudinal index position as measured from the tip of each key falls at the same point along the longitudinal axis of each key. If desired, the longitudinal index position could fall within the blade of the master key and key blank. With that alternative embodiment of the invention, longitudinal displacements of the key follower and key cutter might initially commence to the right and return fully to the left, stopping at the shoulder 972 of the master key. If the bit notch pattern of the master key had not been fully reproduced on the key blank, the balance of the second pass could be completed by returning the key follower and key cutter to the original index position starting location.

In embodiments of the invention with different lateral tracing/cutting forces and different longitudinal axis displacement speeds, two passes of the key follower and key cutter over the master key and key blank may not be necessary, while in other embodiments of the invention more than two tracing and cutting passes may be required to achieve full, accurate reproduction of the master key shoulder and bit notch pattern on the key blank.

In another alternative embodiment of the invention, the height of the key blank shank may be grater than the height of the master key shank. During the key duplication process, the shank height of the key blank, to the extent it is positioned to the right of the longitudinal index position as defined in FIG. 59, will be cut down to equal the height of the master key shank. In many applications, the specific height of the key blank shank will not be important, the primary and important factor being the relative longitudinal location of the shoulder along the length of the key blank.

In view of the teachings above, it would be readily apparent to one of ordinary skill in the art that certain conventional prior art key cutting machines could be modified to perform the inventive method described above and could also be rendered compatible with the unique sloped shoulder key blank embodiment of the invention. The generic description of the invention provided in connection with the FIG. 59 diagram of the invention readily teaches one of ordinary skill in the art that many different structural embodiments of a key cutting machine could be created or adapted to perform the inventive method.

Conventional key blanks, either metal or plastic, can also be duplicated using cassette 782 modified to tip index since tip indexing establishes the requisite longitudinal alignment between key blank 936 and master key 958. When such a tip indexing cassette is used with conventional, non-sloped shoulder key blanks, the shoulder of the conventional key blank will no longer index with the key cutter 742 as illustrated in FIG. 37. Instead, both the master key and key blank will tip index in the manner illustrated and described in connection with FIG. 59.

Accordingly, it is intended by the appended claims to cover all such modifications of the invention which fall within the true spirit and scope of the invention.

We claim:

1. A key alignment device having a longitudinal axis and a lateral axis for laterally aligning a first key including a length, upper and lower surfaces, a tip, a shoulder, a root, and a bitted surface opposite the root, the key alignment device comprising:
   a. upper and lower clamping surfaces displaceable between an open position for receiving the first key between the clamping surfaces and a closed position for engaging the upper and lower surfaces of the first key and retaining the first key in a fixed lateral position with a horizontal orientation;
   b. a root alignment surface laterally offset on a first side of the clamping surfaces for receiving the key root and for aligning the key root parallel to the longitudinal axis;
   c. a tip alignment element for engaging the key tip and for aligning the key tip against the root alignment surface; and
   d. a lateral alignment element for engaging the first key at a first position displaced along the length of the key away from the key tip after the clamping surfaces have been displaced into the closed position and for laterally displacing the first key toward the root alignment surface with a lateral force sufficient to overcome the clamping forces exerted on the first key by the clamping surfaces until the key root contacts the root alignment surface to thereby align the key root with the root alignment surface and with the longitudinal axis of the key alignment device.

2. The key alignment device of claim 1 wherein the key alignment device includes a first key alignment device located at a first elevation for laterally aligning the first key and a second key alignment device located at a second elevation for laterally aligning a second key including a length, upper and lower surfaces, a tip, a shoulder, a root and a bitted surface opposite the root, the second key alignment device having a longitudinal axis and a lateral axis and including:
   a. upper and lower clamping surfaces displaceable between an open position for receiving the second key between the clamping surfaces and a closed position for engaging the upper and lower surfaces of the second key and retaining the second key in a fixed lateral position with a horizontal orientation;
   b. a root alignment surface laterally offset on a first side of the clamping surfaces for receiving the key root and for aligning the key root parallel to the longitudinal axis;
   c. a tip alignment element for engaging the key tip and for aligning the key tip against the root alignment surface; and
   d. a lateral alignment element for engaging the second key at a first position displaced along the length of the second key away from the key tip after the clamping surfaces have been displaced into the closed position and for laterally displacing the second key toward the root alignment surface with a lateral force sufficient to overcome the clamping forces exerted on the second key by the clamping surfaces until the key root contacts the root alignment surface to thereby align the key root with the root alignment surface and with the longitudinal axis of the key alignment device;
   whereby the first key alignment device laterally aligns the root of the first key relative to the longitudinal axis and the second key alignment device laterally aligns the root of the second key relative to the longitudinal axis to thereby laterally align the first key with the second key.

3. The key alignment device of claim 2 wherein the lateral position of the first key root is laterally aligned and coincident with the second key root.

4. The key alignment device of claims 2 or 3 wherein the tip alignment element further includes longitudinal axis displacement means for initially engaging the key tip and maintaining contact with the key tip as the key is displaced along the longitudinal axis into the key alignment device.

5. The key alignment device of claim 4 wherein the tip alignment element includes a spring biased plunger displaceable along the longitudinal axis of the key alignment device and including a tip configured to engage the key tip.

6. The key alignment device of claim 1 wherein the lateral alignment element includes a laterally displaceable key set plunger displaceable toward and away from the first key.

7. The key alignment device of claim 6 further including a biasing element for biasing the key set plunger away from the first key.

8. The key alignment device of claim 1 further including a cassette for housing the key alignment device.

9. The key alignment device of claim 2 further including a cassette for housing the first and second key alignment devices.

10. The key alignment device of claim 1 further including a first actuator handle coupled to the upper and lower clamping surfaces and displaceable between first and second positions for displacing the clamping surfaces between the open and closed positions.

11. The key alignment device of claim 2 further including:
   a. a first actuator handle coupled to the upper and lower clamping surfaces of the first key alignment device for displacing the clamping surfaces of the first key alignment device between the open and closed positions; and
   b. a second actuator handle coupled to the upper and lower clamping surfaces of the second key alignment device for displacing the clamping surfaces of the second key alignment device between the open and closed positions.

12. The key alignment device of claim 1 wherein the root alignment surface includes a linear surface parallel to the longitudinal axis and including an upper surface extending above the lower clamping surface.

13. The key alignment device of claim 12 wherein the root alignment surface extends along substantially the entire length of the key root.

14. The key alignment device of claim 1 wherein the upper and lower clamping surfaces are configured to maintain unobstructed access along the entire length of the bitted surface of the first key after the first key has been inserted into the key alignment device.

15. A key alignment device having a longitudinal axis and a lateral axis for laterally aligning a first key relative to a first defined, fixed centerline, the first key including a length, upper and lower surfaces, a tip, a shank, first and second side surfaces and a centerline, the key alignment device comprising:
   a. a first laterally displaceable jaw located on a first side of the first defined centerline at a variable distance D1 from the first defined centerline for engaging the first side of the first key;
   b. a second laterally displaceable jaw located on a second side of the first defined centerline at a variable distance D2 from the first defined centerline for engaging the second side of the key;
   c. a jaw position control system coupled to the first and second jaws for maintaining distance D1 equal to distance D2 as the first and second jaws are laterally displaced toward or away from the first defined centerline; and
   d. a jaw biasing element for laterally biasing the first and second jaws toward the first defined centerline with a lateral biasing force and for permitting the first and second jaws to be laterally displaced away from the first defined centerline in response to an opposing lateral force greater than the lateral biasing force.

16. The key alignment device of claim 15 wherein the key alignment device includes a first key alignment device located at a first elevation for laterally aligning the first key and a second key alignment device located at a second elevation for laterally aligning a second key relative to a second defined, fixed centerline, the second key alignment device having a longitudinal axis and a lateral axis aligned with the longitudinal and lateral axes of the first key alignment device and including:
   a. a first laterally displaceable jaw located on a first side of the second defined centerline at a variable distance D1 from the second defined centerline for engaging the first side of the second key;
   b. a second laterally displaceable jaw located on a second side of the second defined centerline at a variable distance D2 from the second defined centerline for engaging the second side of the second key;
   c. a jaw position control system coupled to the first and second jaws for maintaining distance D1 equal to distance D2 as the first and second jaws are laterally displaced toward or away from the second defined centerline; and
   d. a jaw biasing element for laterally biasing the first and second jaws toward the second defined centerline with a lateral biasing force and for permitting the first and second jaws to be laterally displaced away from the second defined centerline in response to an opposing lateral force greater than the lateral biasing force;

whereby the first key alignment device laterally aligns the first key with the first defined centerline and the second key alignment device laterally aligns the second key with the second defined centerline to thereby laterally align the centerline of the first key with the centerline of the second key.

17. The key alignment device of claim 16
   a. wherein the first key alignment device further includes upper and lower clamping surfaces displaceable between an open position for receiving the first key between the clamping surfaces and a closed position for engaging the upper and lower surfaces of the first key to thereby exert clamping forces on the first key to retain the first key in a fixed lateral position with a horizontal orientation; and
   b. wherein the second key alignment device further includes upper and lower clamping surfaces displaceable between an open position for receiving the second key between the clamping surfaces and a closed position for engaging the upper and lower surfaces of the second key to thereby exert clamping forces on the second key to retain the second key in a fixed lateral position with a horizontal orientation.

18. The key alignment device of claim 15 further including a tip alignment element for engaging the tip of the first key and for laterally aligning the key tip with the first defined centerline of the key alignment device.

19. The key alignment device of claim 18 wherein the first and second jaws engage and laterally center the shank of the first key.

20. The key alignment device of claim 19 wherein the first defined centerline is aligned with the longitudinal axis of the key alignment device and wherein the tip alignment element includes a longitudinal axis displacement system for engaging and centering the key tip as the key tip is initially displaced along the longitudinal axis between the first and second jaws and for maintaining continuing contact with the key tip as the key extends further along the longitudinal axis until the first and second jaws grip the key shank.

21. The key alignment device of claim 15 wherein the jaw position control system further includes rack and pinion centering system.

22. The key alignment device of claim 21 wherein the rack and pinion centering system further includes a first rack formed on a surface of the first jaw and a second rack formed on a surface of the second jaw.

23. The key alignment device of claim 22 wherein the rack and pinion centering system further includes a pinion element for engaging the first and second racks.

24. The key alignment device of claim 23 wherein the pinion element includes a first pinion gear for engaging the first rack and a second pinion gear for engaging the second rack and wherein the first and second pinion gears engage each other.

25. The key alignment device of claim 23 wherein the pinion element includes a single pinion gear for simultaneously engaging both the first and second racks.

26. The key alignment device of claim 15 wherein the jaw position control system includes a first gear element having a first geared surface forming a part of the first jaw and second gear element having a second geared surface forming a part of the second jaw, the first and second gear elements being symmetrically positioned with respect to the first defined centerline with the first geared surface of the first gear element contacting the second geared surface of the second gear element.

27. The key alignment device of claims 15 or 16 wherein the key shank includes first and second side surfaces, wherein the longitudinal axis is coincident with the first defined centerline and wherein the first and second jaws engage and operate on the first and second side surfaces of the key shank to align the centerline of the first key with the first defined centerline.

28. The key alignment device of claim 27 further including a tip alignment element for engaging the tip of the first key and for laterally aligning the key tip with the first defined centerline.

29. The key alignment device of claim 28 wherein the tip alignment element further includes a longitudinal axis displacement system for engaging and centering the key tip as the key tip initially engages and is displaced along the longitudinal axis between the first and second jaws and for maintaining continuing contact with the key tip as the key is further displaced along the longitudinal axis until the first and second jaws engage the first and second sides of the key shank.

30. The key alignment device of claim 28 wherein the key alignment device is housed in a cassette assembly.

31. A key alignment device having a longitudinal axis and a lateral axis for laterally aligning first and second two-sided keys, each key including a length, upper and lower surfaces, a tip, a shank, first and second side surfaces and a centerline, the key alignment device comprising:
   a. a first key alignment fixture located at a first elevation for laterally aligning the first key, including
      i. a first laterally displaceable jaw located on a first side of a first defined centerline laterally aligned with the longitudinal axis at a variable distance D1 from the first centerline for engaging the first side of the first key;
      ii. a second laterally displaceable jaw located on a second side of the first defined centerline at a variable distance D2 from the first centerline for engaging the second side of the first key;
      iii. a jaw position control system coupled to the first and second jaws for maintaining distance D1 equal to distance D2 as the first and second jaws are laterally displaced toward or away from the first defined centerline;
      iv. a jaw biasing element for laterally biasing the first and second jaws toward the first defined centerline with a lateral biasing force and for permitting the first and second jaws to be laterally displaced away from the first defined centerline in response to an opposing lateral force greater than the lateral biasing force;
      v. upper and lower clamping surfaces displaceable between an open position for receiving the first key between the clamping surfaces and a closed position for engaging the upper and lower surfaces of the first key and retaining the first key in a fixed lateral position with a horizontal orientation;
   b. a second key alignment fixture located at a second elevation spaced apart from the first elevation for laterally aligning the second key, including
      i. a first laterally displaceable jaw located on a first side of a second defined centerline laterally aligned with the longitudinal axis at a variable distance D1 from the defined second centerline for engaging the first side of the second key;
      ii. a second laterally displaceable jaw located on a second side of the second defined centerline at a variable distance D2 from the second defined centerline for engaging the second side of the second key;
      iii. a jaw position control system coupled to the first and second jaws for maintaining distance D1 equal to distance D2 as the first and second jaws are laterally displaced toward or away from the second defined centerline;
      iv. a jaw biasing element for laterally biasing the first and second jaws toward the second defined centerline with a lateral biasing force and for permitting the first and second jaws to be laterally displaced away from the second defined centerline in response to an opposing lateral force greater than the lateral biasing force; and
      v. upper and lower clamping surfaces displaceable between an open position for receiving the second key between the clamping surfaces and a closed position for engaging the upper and lower surfaces of the second key and retaining the second key in a fixed lateral position with a horizontal orientation;
   whereby the first key alignment fixture laterally aligns the centerline of the first key with the first defined centerline and the second key alignment fixture laterally aligns the centerline of the second key with the second defined centerline to thereby laterally align the centerline of the first key with the centerline of the second key.

32. The key alignment device of claim 31 further including a longitudinal axis wherein the first key includes a two-sided master key and the second key includes a two-sided key blank.

33. A method for laterally aligning a first key relative to a first defined, fixed centerline within a first key alignment device having a longitudinal axis and a lateral axis, the first key including a length, upper and lower surfaces, a tip, a shank, first and second side surfaces and a centerline, comprising the steps of:
   a. engaging the first side of the first key with a first laterally displaceable jaw located on the first side of the first defined centerline at a variable distance D1 from the first defined centerline;
   b. engaging the second side of the first key with a second laterally displaceable jaw located on a second side of the first defined centerline at a variable distance D2 from the first defined centerline;
   c. maintaining the distance D1 equal to the distance D2 as the first and second jaws are laterally displaced toward or away from the first defined centerline; and
   d. laterally biasing the first and second jaws toward the first defined centerline with a lateral biasing force while simultaneously permitting the first and second jaws to be laterally displaced away from the first defined centerline in response to an opposing lateral force greater than the lateral biasing force to laterally align the first key centerline with the first defined centerline.

34. The method of claim 33 wherein the clamping forces are exerted on the first key by upper and lower clamping surfaces displaceable between an open position for receiving the first key between the clamping surfaces and a closed position for engaging and clamping the upper and lower surfaces of the first key.

35. The method of claim 33 including the further step of maintaining unobstructed access to the first and second side surfaces of the first key while the clamping forces are being exerted on the first key.

36. The method of claims 33 including the further step of laterally aligning a second key relative to a second defined, fixed centerline within a second key alignment device having a longitudinal axis and a lateral axis, the second key including a length, upper and lower surfaces, a tip, a shank, first and second side surfaces and a centerline, comprising the steps of:
   a. engaging the first side of the second key with a first laterally displaceable jaw located on the first side of the second defined centerline at a variable distance D1 from the second defined centerline;
   b. engaging the second side of the second key with a second laterally displaceable jaw located on a second side of the second defined centerline at a variable distance D2 from the second defined centerline;
   c. maintaining the distance D1 equal to the distance D2 as the first and second jaws are laterally displaced toward or away from the second defined centerline;
   d. laterally biasing the first and second jaws toward the second defined centerline with a lateral biasing force while simultaneously permitting the first and second jaws to be laterally displaced away from the second defined centerline in response to an opposing lateral force greater than the lateral biasing force for laterally aligning the second key centerline with the second defined centerline.

37. The method of claim 36 wherein the first key alignment device is located at a first elevation, wherein the second key alignment device is located at a second elevation, wherein the longitudinal axis of the first key alignment device is laterally aligned with the longitudinal axis of the second key alignment device, wherein the first defined centerline is laterally aligned with the second defined centerline, and wherein lateral alignment of the first key relative to the first defined centerline and lateral alignment of the second key relative to the second defined centerline laterally aligns the centerline of the first key with the centerline of the second key.

38. The method of claim 37 wherein the first key includes a master key and wherein the second key includes a key blank.

39. The method of claim 37 including the further steps of:
   a. exerting clamping forces on the upper and lower surfaces of the first key to retain the first key in a fixed lateral position; and
   b. exerting clamping forces on the upper and lower surfaces of the second key to retain the second key in a fixed lateral position.

40. The method of claim 39 wherein the clamping forces are exerted on the first and second keys by upper and lower clamping surfaces displaceable between an open position for receiving the first and second keys between the clamping surfaces and a closed position for engaging the upper and lower surfaces of the first and second keys.

41. The method of claim 39 including the further step of maintaining unobstructed access to the first and second side surfaces of the first and second keys while the clamping forces are being exerted on the first and second keys.

42. A key cutting machine having a longitudinal axis and a horizontally oriented lateral axis for duplicating a master key onto a key blank, the master key and key blank each including a length, an upper surface, a lower surface, a tip, a shoulder, and a first bitted surface, the bitted surface of the master key including cuts extending laterally between a first lateral position and a second lateral position, the key cutting machine comprising:
   a. a base;
   b. a laterally displaceable but longitudinally fixed first cutter head including a first key follower positioned at a first elevation, a spaced apart first cutting wheel positioned at a second elevation, and a first motor coupled to rotate the first cutting wheel in a first direction;
   c. a first linear displacement element coupled to the base and to the first cutter head for simultaneously laterally displacing the first key follower relative to a first horizontal plane and the first cutting wheel relative to a second horizontal plane toward and away from the first bitted surfaces of the master key and the key blank between the first and second lateral positions to enable the first cutter head to laterally follow and duplicate the first bitted surface of the master key onto the first bitted surface of the key blank without increasing or decreasing the elevation of the first cutter head;
   d. a key positioning fixture including
      i. a first key positioning fixture for positioning the master key to engage the first key follower at an indexed position where the first key follower initially engages the beginning of the first bitted surface and for maintaining unobstructed access to the first bitted surface of the master key as the key positioning fixture is longitudinally translated relative to the first key follower;
      ii. a second key positioning fixture for positioning the key blank to engage the first cutting wheel at an indexed position with the first cutting wheel initially engaging the key blank where the beginning of the first bitted surface of the master key is to be reproduced and for maintaining unobstructed access to the first bitted surface of the key blank as the key positioning fixture is longitudinally translated relative to the first cutting wheel; and
   e. second linear displacement element coupled to the base and to the key positioning fixture for longitudinally displacing the key positioning fixture to thereby longitudinally displace the first bitted surface of the master key relative to the first key follower along the longitudinal axis at the first elevation and to longitudinally displace the first bitted surface of the key blank relative to the first cutting wheel along the longitudinal axis at the second elevation to reproduce the first bitted surface of the master key on the first bitted surface of the key blank.

43. The key cutting machine of claim 42 wherein the first linear displacement element includes a linear bearing element.

44. The key cutting machine of claim 43 wherein the linear bearing element includes a laterally fixed bearing element coupled to the base and a laterally displaceable bearing element coupled to the first cutter head.

45. The key cutting machine of claim 43 wherein the linear bearing element further includes a biasing element for biasing the first cutter head toward the master key and key blank.

46. The key cutting machine of claim 45 wherein the biasing element includes a biasing spring.

47. The key cutting machine of claim 42 wherein the first electric motor includes a DC energized permanent magnetic motor.

48. The key cutting machine of claim 47 further including a power supply for receiving an alternating current input and for generating a reduced voltage DC output for energizing the first motor.

49. The key cutting machine of claim 42 wherein the first key positioning fixture includes a first key alignment device having a longitudinal axis and a lateral axis for laterally aligning the master key, the master key including a root located opposite to the first bitted surface.

50. The key cutting machine of claims 42 or 49 wherein the second key positioning fixture includes a second key alignment device having a longitudinal axis and a lateral axis for laterally aligning the key blank, the key blank including a root located opposite to the first bitted surface.

51. The key cutting machine of claim 50 wherein:
  a. the first key alignment device includes
    i. upper and lower clamping surfaces displaceable between an open position for receiving the master key between the clamping surfaces and a closed position for engaging the upper and lower surfaces of the master key and retaining the master key in a fixed lateral position with a horizontal orientation;
    ii. a root alignment surface laterally offset on a first side of the clamping surfaces for receiving the key root and for aligning the key root parallel to the longitudinal axis;
    iii. a tip alignment element for engaging the key tip and for aligning the key tip against the root alignment surface; and
    iv. a lateral alignment element for engaging the master key at a first position displaced along the length of the master key away from the key tip after the clamping surfaces have been displaced into the closed position and for laterally displacing the master key toward the root alignment surface with a lateral force sufficient to overcome the clamping forces exerted on the master key by the clamping surfaces until the key root contacts the root alignment surface to thereby align the key root with the root alignment surface and with the longitudinal axis of the key alignment device; and
  b. wherein the second key alignment device includes:
    i. upper and lower clamping surfaces displaceable between an open position for receiving the key blank between the clamping surfaces and a closed position for engaging the upper and lower surfaces of the key blank and retaining the key blank in a fixed lateral position with a horizontal orientation;
    ii. a root alignment surface laterally offset on a first side of the clamping surfaces for receiving the key root and for aligning the key root parallel to the longitudinal axis;
    iii. a tip alignment element for engaging the key tip and for aligning the key tip against the root alignment surface; and
    iv. a lateral alignment element for engaging the key blank at a first position displaced along the length of the key blank away from the key tip after the clamping surfaces have been displaced into the closed position and for laterally displacing the key blank toward the root alignment surface with a lateral force sufficient to overcome the clamping forces exerted on the key blank by the clamping surfaces until the key root contacts the root alignment surface to thereby align the key root with the root alignment surface and with the longitudinal axis of the key alignment device.

52. The key cutting machine of claim 42 wherein the second linear displacement element includes:
  a. a cam;
  b. a cam follower having a first end coupled to engage and be displaced by the cam and a second end coupled to the key positioning fixture; and
  c. a cam rotating system.

53. The key cutting machine of claim 52 wherein the cam rotating system includes an electric motor.

54. The key cutting machine of claim 53 wherein the electric motor includes a DC powered, permanent magnet motor.

55. The key cutting machine of claim 42 wherein the master key is longitudinally indexed by registering the first bitted surface of the master key with the first key follower.

56. The key cutting machine of claim 42 wherein:
  a. the master key includes a centerline and a second bitted surface including cuts extending laterally between a third lateral position and a fourth lateral position, the first bitted surface located on a first side of the centerline with the second bitted surface located on a second side of the centerline; and
  b. the key blank includes a centerline and a second bitted surface, the first bitted surface located on a first side of the centerline with the second bitted surface located on a second side of the centerline.

57. The key cutting machine of claim 56 further including
  a. a laterally displaceable but longitudinally fixed second cutter head including a second key follower positioned at the first elevation, a spaced part second cutting wheel positioned at the second elevation, and a second motor coupled to rotate the second cutting wheel in a second direction;
  b. wherein the first linear displacement element is coupled to the second cutter head for simultaneously laterally displacing the second key follower relative to the first horizontal plane and the second cutting wheel relative to the second horizontal plane toward and away from the second bitted surfaces of the master key and the key blank between the third and fourth lateral positions to enable the second cutter head to laterally follow and duplicate the second bitted surface of the master key onto the second bitted surface of the key blank without increasing or decreasing the elevation of the second cutter head;
  c. wherein the first key positioning fixture positions the master key to engage the second key follower at an indexed position where the second key follower initially engages the beginning of the second bitted surface and maintains unobstructed access to the second bitted surface of the master key as the key positioning fixture is longitudinally translated relative to the second key follower;

d. wherein the second key positioning fixture positions the key blank to engage the second cutting wheel at an indexed position with the second cutting wheel initially engaging the key blank where the beginning of the second bitted surface of the master key is to be reproduced and maintains unobstructed access to the second bitted surface of the key blank as the key positioning fixture is longitudinally translated relative to the second cutting wheel; and e. wherein the second linear displacement element longitudinally displaces the second bitted surface of the master key relative to the second key follower along the longitudinal axis at the first elevation and longitudinally displaces the second bitted surface of the key blank relative to the second cutting wheel along the longitudinal axis at the second elevation to reproduce the second bitted surface of the master key on the second bitted surface of the key blank.

58. The key cutting machine of claim 57 wherein the first key positioning fixture includes:

a. a first key alignment device having a longitudinal axis and a lateral axis for laterally aligning the master key relative to a first defined, fixed centerline; and b. a second key alignment device having a longitudinal axis and a lateral axis for laterally aligning the key blank relative to a second defined, fixed centerline.

59. The key cutting machine of claim 42:

a. wherein the first key positioning fixture laterally and longitudinally indexes the master key to define the indexed position; and b. wherein the second key positioning fixture laterally and longitudinally indexes the key blank to define the indexed position.

60. The key cutting machine of claim 59 wherein the master key is longitudinally indexed by registering the first bitted surface of the master key with the first key follower.

61. The key cutting machine of claim 60 wherein the key blank is longitudinally indexed by registering the first bitted surface of the key blank with the first cutting wheel.

62. The key cutting machine of claim 61 wherein the master key is further longitudinally indexed by registering the second bitted surface of the master key with the second key follower.

63. The key cutting machine of claim 62 wherein the key blank is longitudinally indexed by registering the second bitted surface of the key blank with the second cutting wheel.

64. A key cutting machine having a longitudinal axis and a horizontally oriented lateral axis for duplicating a two-sided master key onto a two-sided key blank, the master key and key blank each including a length, a centerline, an upper surface, a lower surface, a tip, a shoulder, a first bitted surface and an opposing second bitted surface, each bitted surface of the master key including cuts extending laterally between a first lateral position located in proximity to the key centerline and a second lateral position further displaced from the key centerline, the key cutting machine comprising:

a. a base;

b. a laterally displaceable first cutter head including a first key follower positioned at a first elevation, a spaced apart first cutting wheel positioned at a second elevation and a first motor coupled to rotate the first cutting wheel in a first direction;

c. a laterally displaceable second cutter head including a second key follower positioned at the first elevation, a spaced apart second cutting wheel positioned at the second elevation and a second motor coupled to rotate the second cutting wheel in a second direction;

d. a first linear displacement element for simultaneously laterally displacing the first key follower relative to a first horizontal plane and the first cutting wheel relative to a second horizontal plane toward and away from the first bitted surfaces of the master key and the key blank between the first and second lateral positions and for simultaneously laterally displacing the second key follower relative to the first horizontal plane and the second cutting wheel relative to the second horizontal plane toward and away from the second bitted surfaces of the master key and the key blank between the first and second lateral positions to enable the first cutter head to laterally follow and duplicate the first bitted surface of the master key onto the first bitted surface of the key blank and to enable the second cutter head to laterally follow and duplicate the second bitted surface of the master key onto the second bitted surface of the key blank without increasing or decreasing the elevation of the first or second cutter heads;

e. a key positioning fixture including i. a first key positioning fixture for positioning the master key to engage the first and second key followers at an indexed position where the first and second key followers initially engage the beginning of the first and second bitted surfaces and for maintaining unobstructed access to the first and second bitted surfaces of the master key as the key positioning fixture and the first and second key followers are longitudinally translated relative to each other;

ii. a second key positioning fixture for positioning the key blank to engage the first and second cutting wheels at an indexed position with the first and second cutting wheels initially engaging the key blank where the beginning of the first and second bitted surfaces of the master key are to be reproduced and for maintaining unobstructed access to the first and second bitted surfaces of the key blank as the key positioning fixture and the first and second cutting wheels are longitudinally translated relative to each other; and f. a second linear displacement element for longitudinally displacing the first and second bitted surfaces of the master key and the first and second key followers relative to each other along the longitudinal axis at the first elevation and for simultaneously longitudinally displacing the first and second bitted surfaces of the key blank and the first and second cutting wheels relative to each other along the longitudinal axis at the second elevation to reproduce the first and second bitted surfaces of the master key on the first and second bitted surfaces of the key blank.

65. The key cutting machine of claim 64 wherein a. the first key positioning fixture includes
  i. a first laterally displaceable jaw located on a first side of a first defined centerline at a variable distance D1 from the first defined centerline for engaging the first side of the master key;
  ii. a second laterally displaceable jaw located on a second side of the first defined centerline at a variable distance D2 from the first defined centerline for engaging the second side of the master key;
  iii. a jaw position control system coupled to the first and second jaws for maintaining distance D1 equal to distance D2 as the first and second jaws are laterally displaced toward or away from the first defined centerline; and
  iv. a jaw biasing element for laterally biasing the first and second jaws toward the first defined centerline with a lateral biasing force and for permitting the first and second jaws to be laterally displaced away from the first defined centerline in response to an opposing lateral force greater than the lateral biasing force; and
b. wherein the second key positioning fixture includes
  i. a first laterally displaceable jaw located on a first side of a second defined centerline at a variable distance D1 from the second defined centerline for engaging the first side of the key blank;
  ii. a second laterally displaceable jaw located on a second side of the second defined centerline at a variable distance D2 from the second defined centerline for engaging the second side of the key blank;
  iii. a jaw position control system coupled to the first and second jaws for maintaining distance D1 equal to distance D2 as the first and second jaws are laterally displaced toward or away from the second defined centerline; and
  iv. a jaw biasing element for laterally biasing the first and second jaws toward the second defined centerline with a lateral biasing force and for permitting the first and second jaws to be laterally displaced away from the second defined centerline in response to an opposing lateral force greater than the lateral biasing force.

66. The key cutting machine of claim 64 wherein the second linear displacement element includes:
a. a cam;
b. a cam follower having a first end coupled to engage and be displaced by the cam and a second end coupled to the key positioning fixture; and
d. a system for rotating the cam.

67. The key cutting machine of claim 66 wherein the cam rotating system includes an electric motor.

68. A method for duplicating a two-sided master key onto a two-sided key blank, the master key and key blank each including a length, a centerline, an upper surface, a lower surface, a tip, a shoulder, and a first bitted surface and an opposing second bitted surface, each bitted surface of the master key including cuts extending laterally between a first lateral position located in proximity to the key centerline and a second lateral position further displaced from the key centerline, comprising the steps of:
a. providing a laterally displaceable first cutter head including a first key follower positioned at a first elevation, a spaced apart first cutting wheel positioned at a second elevation, and a first motor coupled to rotate the first cutting wheel in a first direction;
b. providing a laterally displaceable second cutter head including a second key follower positioned at the first elevation, a spaced apart second cutting wheel positioned at the second elevation and a second motor coupled to rotate the second cutting wheel in a second direction;
c. laterally displacing the first key follower relative to a first horizontal plane and the first cutting wheel relative to a second horizontal plane toward and away from the first bitted surface of the master key and the key blank between the first and second lateral positions while simultaneously laterally displacing the second key follower relative to the first horizontal plane and the second cutting wheel relative to the second horizontal plane toward and away from the second bitted surfaces of the master key and the key blank between the first and second lateral positions to enable the first cutter head to laterally follow and duplicate the first bitted surface of the master key onto the first bitted surface of the key blank and to enable the second cutter head to laterally follow and duplicate the second bitted surface of the master key onto the second bitted surface of the key blank without increasing or decreasing the elevation of the first and second cutter heads;
d. positioning the master key to engage the first and second key followers at an indexed position where the first and second key followers initially engage the beginning of the first and second bitted surfaces while maintaining unobstructed access to the first and second bitted surfaces of the master key as the master key and the first and second key followers are longitudinally translated relative to each other;
e. positioning the key blank to engage the first and second cutting wheels at an indexed position with the first and second cutting wheels initially engaging the key blank where the beginning of the first and second bitted surfaces of the master key are to be reproduced while maintaining unobstructed access to the first and second bitted surfaces of the key blank as the key blank and the first and second cutting wheels are longitudinally translated relative to each other; and
f. simultaneously longitudinally displacing the first and second bitted surfaces of the master key and the first and second key followers relative to each other at the first elevation and simultaneously longitudinally displacing the first and second bitted surfaces of the key blank and the first and second cutting wheels relative to each other at the second elevation to reproduce the first and second bitted surfaces of the master key on the first and second bitted surfaces of the key blank.

69. A method for duplicating a master key onto a key blank, the master key and key blank each including a length, an upper surface, a lower surface, a tip, a shoulder, and a first bitted surface, the bitted surface of the master key including cuts extending laterally between a first lateral position and a second lateral position, comprising the steps of:
a. providing a laterally displaceable first cutter head including a first key follower positioned at a first elevation, a spaced apart first cutting wheel positioned at a second elevation and a first motor coupled to rotate the first cutting wheel in a first direction;

b. positioning the master key at the first elevation with a horizontal orientation to engage the first key follower at an indexed position where the first key follower initially engages the beginning of the first bitted surface while maintaining unobstructed access to the first bitted surface of the master key as the master key and the first key follower are longitudinally translated relative to each other;

c. positioning the key blank at the second elevation with a horizontal orientation to engage the first cutting wheel at an indexed position with the first cutting wheel initially engaging the key blank where the beginning of the first bitted surface of the master key is to be reproduced while maintaining unobstructed access to the first bitted surface of the key blank as the key blank and the first cutting wheel are longitudinally translated relative to each other;

d. laterally biasing the first cutter head toward the master key and key blank without the assistance of gravitational forces such that the first key follower engages the first bitted surface of the master key and the first cutting wheel engages the first bitted surface of the key blank;

e. laterally displacing the first key follower relative to a first horizontal plane and the first cutting wheel relative to a second horizontal plane toward and away from the first bitted surfaces of the master key and the key blank between the first and second lateral positions to enable the first cutter head to laterally follow and duplicate the first bitted surface of the master key onto the first bitted surface of the key blank without increasing or decreasing the elevation of the first cutter head; and f. simultaneously longitudinally displacing the first bitted surface of the master key and the first key follower relative to each other at the first elevation and simultaneously longitudinally displacing the first bitted surface of the key blank and the first cutting wheel relative to each other at the second elevation to reproduce the first bitted surface of the master key on the first bitted surface of the key blank.

70. A key cutting machine having a longitudinal axis and a horizontally oriented lateral axis for duplicating a master key onto a key blank, the master key and key blank each including a length, upper and lower surfaces, a tip, a shoulder, a root, and a bitted surface opposite the root, the bitted surface of the master key including cuts extending laterally toward the root between a first lateral position located in proximity to the key root and a second lateral position further displaced away from the key root, the key cutting machine comprising:

a. a base;

b. a laterally displaceable first cutter head including a first key follower positioned at a first elevation, a spaced apart first cutting wheel positioned at a second elevation and a first motor coupled to rotate the first cutting wheel in a first direction;

c. a first linear displacement element coupled to the first cutter head for simultaneously laterally displacing the first key follower relative to a first horizontal plane and the first cutting wheel relative to a second horizontal plane toward and away from the first bitted surfaces of the master key and the key blank between first and second lateral positions to enable the first cutter head to laterally follow and duplicate the first bitted surface of the master key onto the first bitted surface of the key blank without increasing or decreasing the elevation of the first cutter head;

d. a key positioning fixture including i. a first positioning fixture for positioning the master key to engage the first key follower at an indexed position where the first key follower initially engages the beginning of the first bitted surface of the master key and for maintaining unobstructed access to the first bitted surface of the master key as the key positioning fixture and the first key follower are longitudinally translated relative to each other, the first positioning fixture including A. upper and lower clamping surfaces displaceable between an open position for receiving the master key between the clamping surfaces and a closed position for engaging the upper and lower surfaces of the master key and retaining the master key in a fixed lateral position with a horizontal orientation;

B. a root alignment surface laterally offset on a first side of the clamping surfaces for receiving the key root and aligning the key root parallel to the longitudinal axis;

ii. a second positioning fixture for positioning the key blank to engage the first cutting wheel at an indexed position with the first cutting wheel initially engaging the key blank where the beginning of the first bitted surface of the master key is to be reproduced and for maintaining unobstructed access to the first bitted surface of the key blank as the key positioning fixture and the first cutting wheel are longitudinally translated relative to each other, the second positioning fixture including A. upper and lower clamping surfaces displaceable between an open position for receiving the key blank between the clamping surfaces and a closed position for engaging the upper and lower surfaces of the key blank and retaining the key blank in a fixed lateral position with a horizontal orientation;

B. a root alignment surface laterally offset on a first side of the clamping surfaces for receiving the key root and aligning the key root parallel to the longitudinal axis; and e. a second linear displacement element for longitudinally displacing the first bitted surface of the master key and the first key follower relative to each other along the longitudinal axis at the first elevation and for simultaneously longitudinally displacing the first bitted surface of the key blank and the first cutting wheel relative to each other along the longitudinal axis at the second elevation to reproduce the first bitted surface of the master key on the first bitted surface of the key blank.

* * * * *